United States Patent
Sim et al.

(10) Patent No.: US 10,341,442 B2
(45) Date of Patent: Jul. 2, 2019

(54) DEVICE AND METHOD OF CONTROLLING THE DEVICE

(71) Applicant: Samsung Electronics Co., Ltd., Suwon-si, Gyeonggi-do (KR)

(72) Inventors: Dae-hyun Sim, Seoul (KR); Arleta Staszuk, Warsaw (PL); Jakub Ksiezniak, Pulawy (PL); Pawel Kies, Warsaw (PL); Rafal Foltyniewicz, Warsaw (PL); Remigiusz Barbachowski, Warsaw (PL); Wojciech Kusmierek, Warsaw (PL); Krzysztof Szarzynski, Poznań (PL); Piotr Klos, Płock (PL); Mateusz Ziemek, Ostrołęka (PL); Radoslaw Antoniewicz, Warsaw (PL); Marcin Dusza, Warsaw (PL); Roman Fraczek, Warsaw (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 4 days.

(21) Appl. No.: 14/991,559

(22) Filed: Jan. 8, 2016

(65) Prior Publication Data
US 2016/0205246 A1 Jul. 14, 2016

(30) Foreign Application Priority Data
Jan. 12, 2015 (KR) .......................... 10-2015-0004446

(51) Int. Cl.
*H04M 3/436* (2006.01)
*H04L 29/08* (2006.01)
(Continued)

(52) U.S. Cl.
CPC ............ *H04L 67/125* (2013.01); *H04L 67/12* (2013.01); *H04M 1/72569* (2013.01);
(Continued)

(58) Field of Classification Search
CPC ............ H04L 67/125; H04M 1/72569; H04M 1/72577; H04M 2250/12; H04W 4/027; H04W 4/028; H04W 4/16; H04W 4/046
See application file for complete search history.

(56) References Cited

U.S. PATENT DOCUMENTS 4,401,852 A 8/1983 Noso et al.
4,450,545 A 5/1984 Kishi et al.
(Continued)

FOREIGN PATENT DOCUMENTS

EP 1211873 A3 12/2002
EP 0906686 B1 2/2006
(Continued)

OTHER PUBLICATIONS

H.L. Chu et al., "Poster: You Driving? Talk to You Later", MobiSys'11, Bethesda, Maryland, USA.
(Continued)

*Primary Examiner* — Kamran Afshar
*Assistant Examiner* — Minjung Kim
(74) *Attorney, Agent, or Firm* — Jefferson IP Law, LLP

(57) ABSTRACT

A device is provided. The device includes a detection unit configured to detect driving conditions of a vehicle, and a control unit configured to limit notifications with respect to events that occur in the device during a section according to the detected driving conditions and provide the limited notifications during the section if the driving conditions are changed, wherein the section is determined in real time according to the driving conditions of the vehicle.

21 Claims, 59 Drawing Sheets

(51) Int. Cl.
*H04W 68/00* (2009.01)
*H04W 4/02* (2018.01)
*H04W 4/04* (2009.01)
*H04W 4/16* (2009.01)
*H04M 1/725* (2006.01)
*H04W 4/029* (2018.01)

(52) U.S. Cl.
CPC ....... *H04M 1/72577* (2013.01); *H04W 4/027* (2013.01); *H04W 4/029* (2018.02); *H04W 4/046* (2013.01); *H04W 4/16* (2013.01); *H04M 2250/12* (2013.01)

(56) References Cited

U.S. PATENT DOCUMENTS

| | | |
|---|---|---|
| 4,493,100 A | 1/1985 | Moriyama et al. |
| 4,501,012 A | 2/1985 | Kishi et al. |
| 4,506,377 A | 3/1985 | Kishi et al. |
| 4,506,378 A | 3/1985 | Noso et al. |
| 4,516,207 A | 5/1985 | Moriyama et al. |
| 4,528,687 A | 7/1985 | Noso et al. |
| 4,532,648 A | 7/1985 | Noso et al. |
| 4,538,295 A | 8/1985 | Noso et al. |
| 4,558,459 A | 12/1985 | Noso et al. |
| 4,827,520 A | 5/1989 | Zeinstra |
| 5,301,227 A | 4/1994 | Kamei et al. |
| 5,794,189 A | 8/1998 | Gould |
| 6,285,924 B1 | 9/2001 | Okamoto et al. |
| 6,502,022 B1 | 12/2002 | Chastain et al. |
| 6,584,439 B1 | 6/2003 | Geilhufe et al. |
| 6,690,956 B2 | 2/2004 | Chua et al. |
| 7,113,867 B1 | 9/2006 | Stein |
| 7,188,012 B2 | 3/2007 | Salmeen et al. |
| 7,369,845 B2 | 5/2008 | Keohane et al. |
| 7,566,851 B2 | 7/2009 | Stein et al. |
| 7,848,863 B2 | 12/2010 | Kwon et al. |
| 7,898,428 B2 | 3/2011 | Dietz et al. |
| 8,223,038 B2 | 7/2012 | Bauer et al. |
| 8,301,108 B2 | 10/2012 | Naboulsi |
| 8,370,023 B2 | 2/2013 | Maass |
| 8,428,973 B1* | 4/2013 | Hopkins, III ........ G06Q 40/08 705/2 |
| 8,442,490 B2 | 5/2013 | Haley |
| 8,452,055 B2 | 5/2013 | Stein et al. |
| 8,466,806 B2 | 6/2013 | Schofield |
| 8,493,446 B2 | 7/2013 | Li et al. |
| 8,553,088 B2 | 10/2013 | Stein et al. |
| 8,676,236 B1 | 3/2014 | Gautam et al. |
| 8,706,143 B1 | 4/2014 | Elias |
| 2003/0036405 A1 | 2/2003 | Hijii |
| 2004/0020698 A1 | 2/2004 | Gehrke et al. |
| 2005/0275514 A1* | 12/2005 | Roberts ................ B60Q 5/00 340/436 |
| 2007/0213905 A1 | 9/2007 | Funk et al. |
| 2007/0230792 A1 | 10/2007 | Shashua et al. |
| 2008/0137908 A1* | 6/2008 | Stein ................ G06K 9/00818 382/103 |
| 2009/0021581 A1 | 1/2009 | Sun et al. |
| 2010/0063649 A1 | 3/2010 | Wu et al. |
| 2010/0157061 A1 | 6/2010 | Katsman et al. |
| 2010/0250045 A1* | 9/2010 | Miura ................. B60W 40/09 701/31.4 |
| 2010/0297929 A1 | 11/2010 | Harris |
| 2011/0054892 A1 | 3/2011 | Jung et al. |
| 2011/0144988 A1 | 6/2011 | Choi et al. |
| 2011/0173001 A1 | 7/2011 | Guy, III et al. |
| 2011/0285850 A1 | 11/2011 | Lu et al. |
| 2012/0027255 A1 | 2/2012 | Endo |
| 2012/0078509 A1* | 3/2012 | Choi ................ G01C 21/3415 701/423 |
| 2012/0287276 A1 | 11/2012 | Dwivedi et al. |
| 2012/0310651 A1 | 12/2012 | Saino |
| 2013/0016209 A1 | 1/2013 | Taylor et al. |
| 2013/0072237 A1 | 3/2013 | Ramdeo |
| 2013/0090103 A1 | 4/2013 | Kim et al. |
| 2013/0135444 A1 | 5/2013 | Stein et al. |
| 2013/0137404 A1* | 5/2013 | Kuo ...................... H04W 4/046 455/413 |
| 2013/0177237 A1 | 7/2013 | Schamp |
| 2013/0194419 A1 | 8/2013 | Bhowmick et al. |
| 2013/0303106 A1* | 11/2013 | Martin .................. H04W 4/12 455/404.2 |
| 2014/0024334 A1 | 1/2014 | Berry et al. |
| 2014/0024347 A1 | 1/2014 | Carter |
| 2014/0303842 A1* | 10/2014 | Boelter ................ B60K 35/00 701/36 |
| 2015/0056973 A1* | 2/2015 | Efrati ................ H04W 76/064 455/418 |
| 2015/0373666 A1* | 12/2015 | Malahy ................ H04W 68/00 455/414.1 |
| 2016/0050315 A1* | 2/2016 | Malhotra ............... H04M 3/436 455/414.1 |

FOREIGN PATENT DOCUMENTS

| | | |
|---|---|---|
| EP | 1876829 A1 | 1/2008 |
| EP | 2128841 A1 | 5/2008 |
| EP | 2068269 A3 | 10/2009 |
| EP | 2246232 A1 | 11/2010 |
| EP | 2448251 A2 | 5/2012 |
| EP | 2463843 A2 | 6/2012 |
| KR | 10-2007-0080157 | 8/2007 |
| WO | 1993-013518 A1 | 7/1993 |
| WO | 2002-054738 A1 | 7/2002 |
| WO | 2003-079308 A1 | 9/2003 |
| WO | 2008-052178 A2 | 5/2008 |
| WO | 2008-103455 A2 | 8/2008 |
| WO | 2008134715 A1 | 11/2008 |
| WO | 2009-105666 A1 | 8/2009 |
| WO | 2013-029258 A1 | 3/2013 |
| WO | 2014/173189 A1 | 10/2014 |

OTHER PUBLICATIONS

J. Marin et al., "Random Forests of Local Experts for Pedestrian Detection", International Conference on Computer Vision (ICCV), Sydney, Australia, 2013.
D. Ponsa et al. "Multiple Vehicle 3D Tracking Using an Unscented Kalman Filter", International IEEE Conference on Intelligent Transportation Systems (ITSC), Vienna, Austria, 2005.
Mobileye, http://www.mobileye.com/.
OnRoad, http://www.ionroad.com/.
VoiceAssist, http://www.voiceassist.com/.
Drivea, https://play.google.com/store/apps/details?id=com.driveassist.experimental&hl=pl.
Voice-To-Text Apps Offer No Driving Safety Benefit; As With Manual Texting, Reaction Times Double.
Hands-Free Talking, Texting are Unsafe.

* cited by examiner

FIG. 25

| TYPE | INFORMATION TO BE TRANSFERRED | EXAMPLES |
|---|---|---|
| TYPE1 | CURRENT SITUATION | I'M DRIVING NOW |
| TYPE2 | CURRENT SITUATION AND FUTURE SITUATION | I'M DRIVING AND I'LL CALL BACK IN AN HOUR |
| TYPE3 | FUTURE SITUATION | I'LL CALL BACK IN AN HOUR |
| TYPE4 | -- | I'M NOT AVAILABLE |

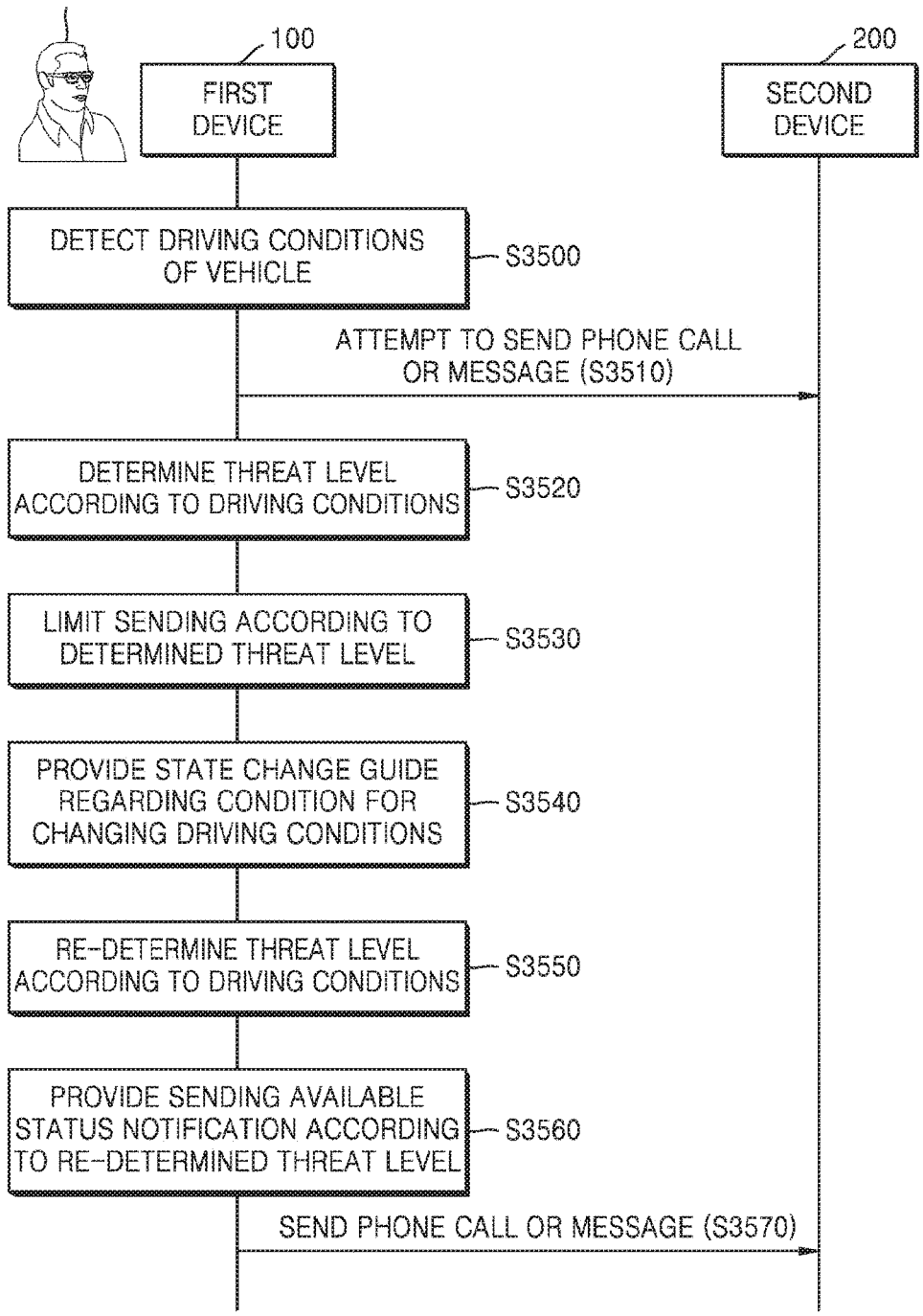

DEVICE AND METHOD OF CONTROLLING THE DEVICE

CROSS-REFERENCE TO RELATED APPLICATION(S)

This application claims the benefit under 35 U.S.C. § 119(a) of a Korean patent application filed on Jan. 12, 2015 in the Korean Intellectual Property Office and assigned Serial number 10-2015-0004446, the entire disclosure of which is hereby incorporated by reference.

TECHNICAL FIELD

The present disclosure relates to devices and methods of controlling the devices.

BACKGROUND

Since there are many vehicle accidents due to a rapid increase in vehicles, a measure for safe driving is required. More particularly, since drivers increasingly use smart phones while driving owing to popularity and development of smart phones, use of smart phones while driving may interrupt safe driving of drivers and cause traffic accidents. However, in a case where communication through smart phones while driving is completely restricted, autonomy and convenience of users are extremely limited. Thus, solution for promoting the balance between safety and user convenience is required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide devices capable of supporting safe driving of drivers by selectively limiting notification of the device according to driving conditions and methods of controlling the devices.

In accordance with an aspect of the present disclosure, a device is provided. The device includes a detection unit configured to detect driving conditions of a vehicle, and a control unit configured to limit notifications with respect to events that occur in the device during a section according to the detected driving conditions and provide the limited notifications during the section if the driving conditions are changed, wherein the section is determined in real time according to the driving conditions of the vehicle.

The device may further include a communication unit configured to receive a phone call or a message from a counterpart, wherein the control unit limits a receiving notification with respect to the phone call or the message during the section.

The control unit may determine a threat level according to the driving conditions and limit or provide the notifications adaptively to the determined threat level, an occurrence frequency of the events, or the counterpart.

The control unit, if the phone call or the message is received during the section, may provide a state change guide regarding a condition for changing the driving conditions.

The control unit may control the communication unit to provide a response message, including a current situation based on the driving conditions, to the counterpart.

The control unit may predict a future situation based on the driving conditions and controls the communication unit to provide the response message, further including the predicted future situation, to the counterpart.

The control unit may control the communication unit to provide an automatic message including state change information of a user to the counterpart if the driving conditions are changed.

The communication unit may receive information regarding the driving conditions from a camera, a microphone, or a navigation that is installed in the vehicle.

The detection unit may detect the driving conditions including outer conditions of the vehicle, inner conditions of the vehicle, conditions of the vehicle itself, or conditions of the user.

In a case where a user attempts to transmit a phone call or a message during the section, the control unit may provide a current threat level or a transmission available time according to the driving conditions.

In a case where the user attempts to transmit the phone call or the message during the section, the control unit may provide a state change guide regarding a condition for changing the driving conditions.

The control unit may provide a notification informing a transmission available state to the user if the driving conditions are changed.

The control unit may provide a reminder with respect to the events if an operation of the vehicle ends.

The communication unit may be able to communicate with the vehicle, and the control unit controls a speaker closer to a threat element to output the notifications, the speaker being selected among at least two speakers installed in the vehicle according to a position of the threat element.

In accordance with another aspect of the present disclosure, a method of controlling a device is provided. The method includes detecting driving conditions of a vehicle, limiting notifications with respect to events that occur in the device during a section according to the detected driving conditions, and providing the limited notifications during the section if the driving conditions are changed, wherein the section is determined in real time according to the driving conditions of the vehicle.

The method may further include receiving a phone call or a message from a counterpart, wherein the limiting of the notifications includes limiting a receiving notification with respect to the phone call or the message during the section.

The limiting of the notifications may include determining a threat level according to the driving conditions, and limiting the notifications adaptively to the determined threat level, an occurrence frequency of the events, or the counterpart.

The method may further include if the phone call or the message is received during the section, providing a state change guide regarding a condition for changing the driving conditions.

The method may further include providing a response message including a current situation based on the driving conditions to the counterpart.

The method may further include predicting a future situation based on the driving conditions, wherein the providing of the response message includes providing the response message further including the predicted future situation to the counterpart.

The method may further include providing an automatic message including state change information of a user to the counterpart if the driving conditions are changed.

The method may further include, in a case where a user attempts to transmit a phone call or a message during the section, providing a current threat level or a transmission available time according to the driving conditions.

The method may further include, in a case where the user attempts to transmit the phone call or the message during the section, providing a state change guide regarding a condition for changing the driving conditions.

The method may further include providing a notification informing a transmission available state to the user if the driving conditions are changed.

The method may further include providing a reminder with respect to the events if an operation of the vehicle ends.

In accordance with another aspect of the present disclosure, a non-transitory computer readable recording medium storing one or more programs is provided. The non-transitory computer readable recording medium includes commands for executing a method of controlling a device, the method including detecting driving conditions of a vehicle, limiting notifications with respect to events that occur in the device during a section according to the detected driving conditions, and providing the limited notifications during the section if the driving conditions are changed, wherein the section is determined in real time according to the driving conditions of the vehicle.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 25 is a table showing types of a response message generated by a first device according to an embodiment of the present disclosure;

FIG. 35 is a flowchart illustrating operations of first and second devices performed by using a device control method according to an embodiment of the present disclosure;

Throughout the drawings, like reference numerals will be understood to refer to like parts, components, and structures.

DETAILED DESCRIPTION

Figure 1:
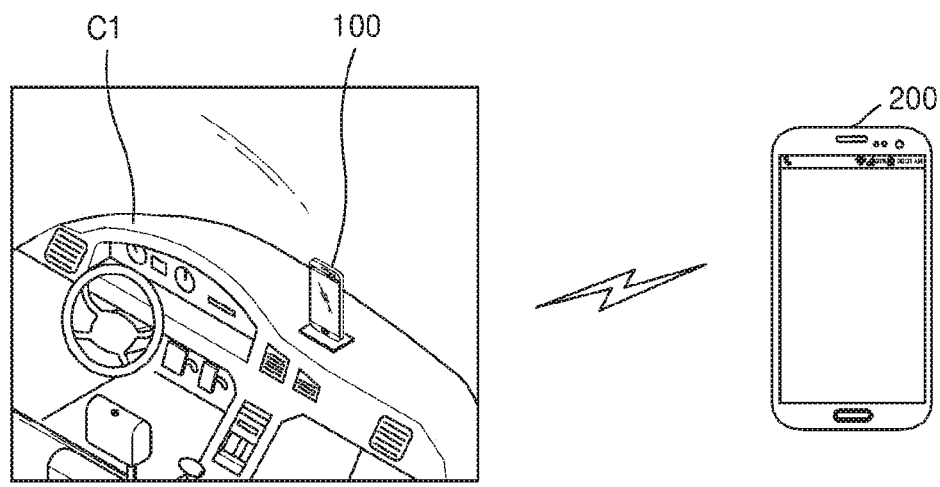
FIG. 1 illustrates a system providing a smart driving mode according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless explicitly described to the contrary, the word "comprise" and variations, such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

Reference will now be made to various embodiments of the present disclosure, examples of which are illustrated in the accompanying drawings, wherein like reference numerals refer to like elements throughout. In this regard, the present embodiments of the present disclosure may have different forms and should not be construed as being limited to the descriptions set forth herein. Accordingly, the various embodiments of the present disclosure are merely described below, by referring to the figures, to explain aspects of the present disclosure. In the accompanying drawings, a portion irrelevant to a description of the present disclosure will be omitted for clarity. As used herein, the term "and/or" includes any and all combinations of one or more of the associated listed items.

FIG. 1 illustrates a system providing a smart driving mode according to an embodiment of the present disclosure.

Referring to FIG. 1, the system providing the smart driving mode may include a first device 100 and a second device 200. The first device 100 may be positioned in a first vehicle C1. In an embodiment of the present disclosure, the first device 100 may be mounted in a cradle of the first vehicle C1. However, the various embodiments of the present disclosure are not limited thereto. The first device 100 may be positioned in an arbitrary space of the first vehicle C1.

The first and second devices 100 and 200 may be electronic devices supporting a voice call function, a video call function, or a message transmission/reception function. For example, the first and second devices 100 and 200 may be smart phones, tablet personal computers (PCs), PCs, smart televisions (TVs), mobile phones, personal digital assistants (PDAs), laptop PCs, media players, micro servers, global positioning system (GPS) devices, e-book terminals, digital broadcasting terminals, navigation devices, kiosks, moving picture experts group (phase 1 or phase 2) (MPEG-1 or MPEG-2) audio layer 3 (MP3) players, digital camera, and other mobile or non-mobile computing devices, but are not limited thereto. Furthermore, the first and second devices 100 and 200 may include various devices capable of receiving touch inputs, such as electronic blackboards and touch tables.

According to the present embodiment of the present disclosure, the first device 100 may be a device that executes software and performs particular functions via the software. Software may be executed by one from among an application, an operating system (OS), and a middleware or a combination thereof. More particularly, a function of providing a smart driving mode according to the present embodiment may be performed by one from among an application, an OS, and a middleware. Software may be executed not only by the first device 100, but also by other devices connected to the first device 100, e.g., a wearable device, a server, a navigation device, and the like.

The term "application" refers to a set of a series of computer programs designed to perform a particular task. The present specification may include various applications. For example, examples of applications may include a web browser, a camera application, a dictionary application, a translator application, a data transmission application, a music player application, a movie player application, a phone application, a message application, a social communicator application, a map application, a picture folder application, a broadcasting application, a game application, a fitness application, a payment application, a memo application, a calendar application, and a phone book application, but are not limited thereto.

"Middleware" may include a plurality of modules that are prepared in advance to provide functions that are commonly demanded by various applications. Middleware may provide functions via application program interfaces (APIs), such that applications may efficiently utilize resources in a device. For example, middleware may include at least one of a plurality of modules including an application manager, a window manager, a multimedia manager, a resource manager, a power manager, a database manager, a package manager, a connection manager, a notification manager, a location manager, a graphic manager, and a security manager. Detailed descriptions of middleware will be given below with reference to FIG. 43.

In the present embodiment of the present disclosure, a first user USER1 of the first device 100 may be a driver driving the first vehicle C1. In an embodiment of the present disclosure, the first device 100 may receive a call or a message from the second device 200. In an embodiment of the present disclosure, the first device 100 may transmit a call or a message to the second device 200. Accordingly, the first device 100 may be defined as a user device or a driver device, the second device 200 may be defined as a counterpart device, and the first vehicle C1 may be defined as a user vehicle.

In a case where a communication function is performed through the first device 100 while driving the first vehicle C1, safe driving of the first user USER1 may be interrupted according to driving conditions of the first vehicle C1. Thus, in the present embodiment of the present disclosure, the first device 100 may detect the driving conditions of the first vehicle C1, limit notifications with respect to events that occur in the first device 100 during a section according to the detected driving conditions, and, if the driving conditions are changed, provide the notifications limited during the section at a time.

Figure 2:
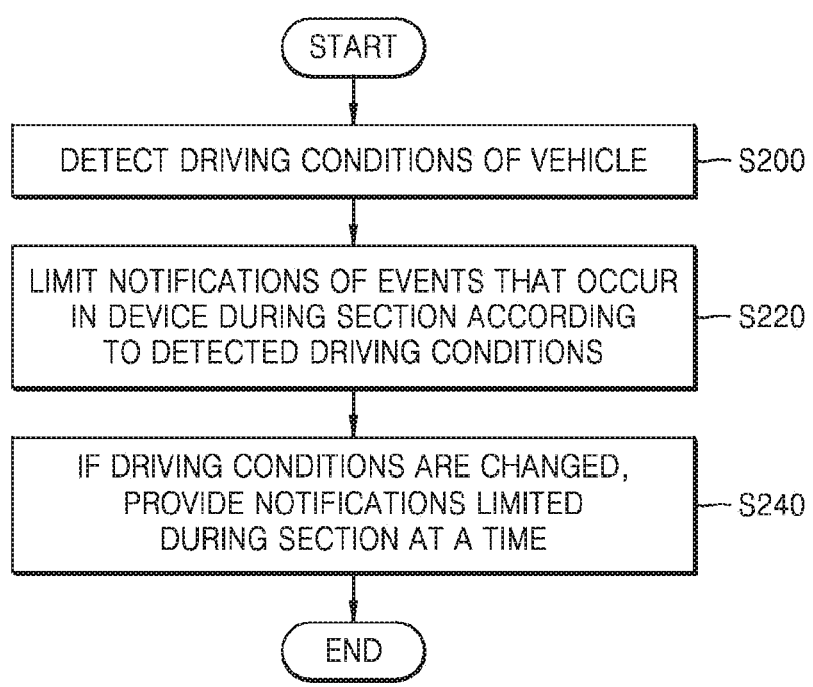
FIG. 2 is a flowchart of a device control method according to an embodiment of the present disclosure.

FIG. 2 is a flowchart of a device control method according to an embodiment of the present disclosure.

Referring to FIG. 2, the device control method according to the present embodiment of the present disclosure is a method for processing a phone call or a message received by a user device or a driver device and includes the following operations that are performed on the user device. For example, the device control method according to the present embodiment may include operations that are time-serially performed by the first device 100 of FIG. 1.

In operation S200, driving conditions of a vehicle may be detected. In this regard, the driving conditions of the vehicle may include at least one of outer conditions of the vehicle, inner conditions of the vehicle, conditions of the vehicle itself, and conditions of a driver. The outer conditions of the vehicle may include, for example, road conditions, such as other vehicles, pedestrians, lanes, traffic, road pavement status, and the like, or weather, and the like. The inner conditions of the vehicle may include noise inside the vehicle, and the like. The conditions of the vehicle itself may include a speed of the vehicle, and the like. The conditions of the driver may include an emotional state of the first user USER1, fatigue, attention, a driving experience, a driving concentration, and the like.

In operation S220, notifications of events that occur in a device are limited during a section according to the detected driving conditions. In this regard, the section may be determined in real time according to the driving conditions. In an embodiment of the present disclosure, an event may be a communication event, such as a phone call or a message received by the device during the section. In an embodiment of the present disclosure, the event may be a notification event provided through an application installed in the device during the section. Accordingly, as a result of determining the detected driving conditions, it may prevent the driver from being interrupted due to notifications of the device while concentration of the driver is required.

In operation S240, if the driving conditions are changed, the notifications limited during the section may be provided at a time. In this regard, the expression that the "driving conditions have been changed" indicates that the driver has entered a safe state in which the device may be used. In this regard, the expression that "notifications are provided at a time" indicates that communication events or notification events received by the device during the section are provided at a time. In the present embodiment of the present disclosure, the limited notifications may be provided as a notification packet at a time.

Figure 3:
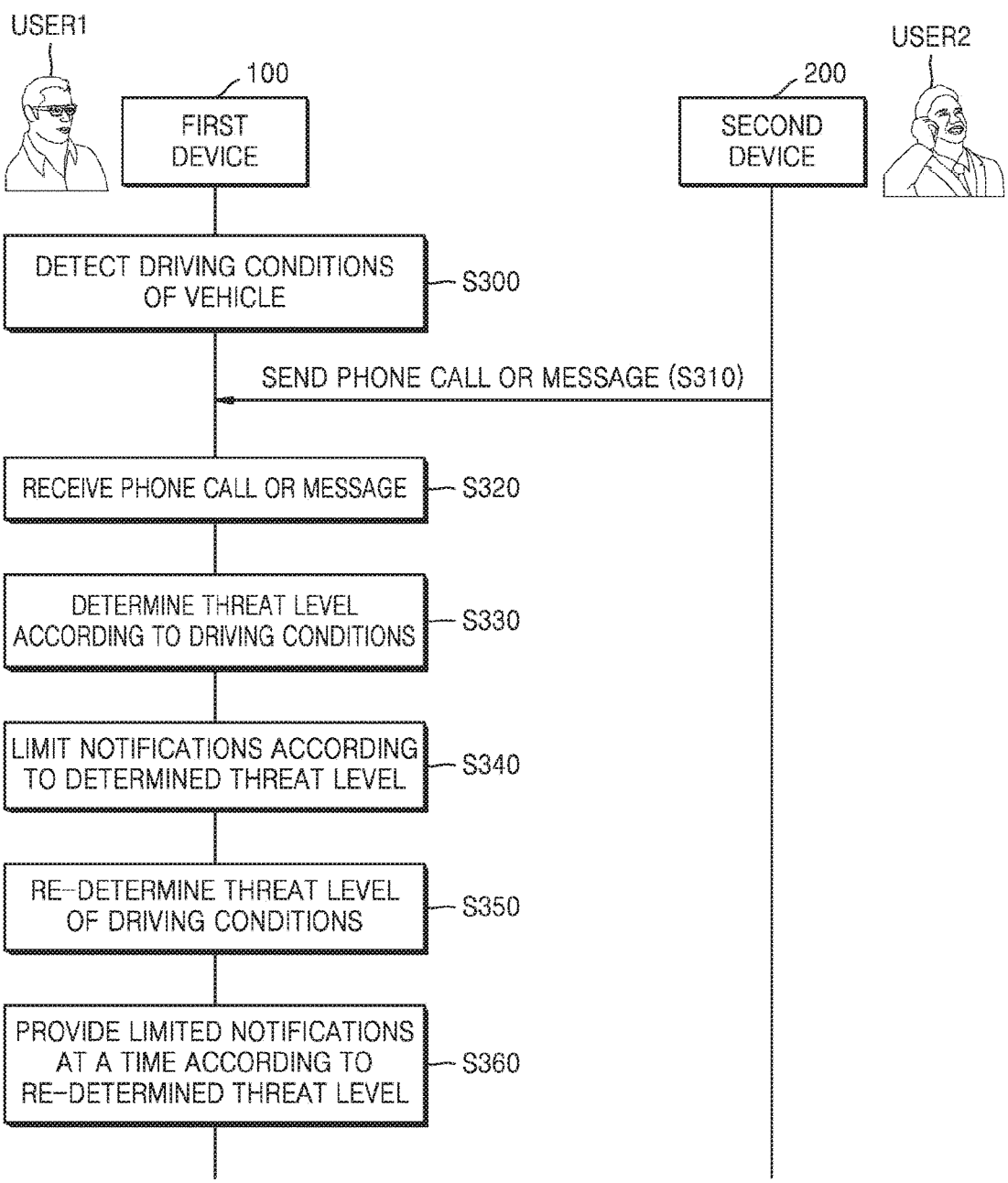
FIG. 3 is a flowchart illustrating operations of first and second devices performed by using a device control method according to an embodiment of the present disclosure.

FIG. 3 is a flowchart illustrating operations of first and second devices performed by using a device control method according to an embodiment of the present disclosure.

Referring to FIG. 3, the device control method according to the present embodiment of the present disclosure may include operations that are time-serially performed by the first and second devices 100 and 200 of FIG. 1. Although omitted below, descriptions of the first and second devices 100 and 200 with reference to FIG. 1 apply to the device control method according to the present embodiment.

In operation S300, the first device 100 may detect driving conditions of the first vehicle C1. In this regard, the driving conditions of the vehicle may include at least one of outer conditions of the vehicle, inner conditions of the vehicle, conditions of the vehicle itself, and conditions of a driver.

In an embodiment of the present disclosure, the first device 100 may detect the driving conditions of the first vehicle C1 by using a camera module, a microphone module, a GPS module, various sensors, applications, and the like, of the first device 100. In an embodiment of the present disclosure, the first device 100 may be connected to the first vehicle C1 by wired or wirelessly and may detect the driving conditions of the first vehicle C1 by using a camera module, a microphone module, a GPS module, various sensors, applications, and the like, of the first vehicle C1. In an embodiment of the present disclosure, the first device 100 may be connected to a wearable device by wired or wirelessly and may detect the driving conditions of the first vehicle C1 by using a camera module, a microphone module, a GPS module, various sensors, applications, and the like, of the wearable device.

In an embodiment of the present disclosure, the first device 100 may detect the driving conditions of the first vehicle C1 by using the camera module. In more detail, the first device 100 may detect road conditions, such as vehicles, pedestrians, lanes, and the like, by using the camera module (for example, a camera module disposed at the rear side of the first device 100) acquiring an outer image of the first vehicle C1. The first device 100 may recognize an iris or head position of the first user USER1 and detect driver conditions, such as fatigue, attention, driving concentration, and the like, of the first user USER1 by using the camera module (for example, a camera module disposed at the front side of the first device 100) acquiring an inner image of the first vehicle C1.

In an embodiment of the present disclosure, the first device 100 may detect the driving conditions of the first vehicle C1 by using the microphone module. In more detail, the first device 100 may detect inner noise of the first vehicle C1 or voice of the first user USER1 by using the microphone module acquiring inner sound of the first vehicle C1.

In an embodiment of the present disclosure, the first device 100 may calculate a current position or speed of the first vehicle C1, and the like, by using the GPS module. For example, the current position may be determined as downtown, the country, highway, and the like. In an embodiment of the present disclosure, the first device 100 may calculate the current speed of the first vehicle C1, and the like, by using various sensors, such as an acceleration sensor, a magnetic sensor, a gyro sensor, and the like.

In an embodiment of the present disclosure, the first device 100 may detect the driving conditions of the first vehicle C1 with reference to information of an application that is being executed or has been executed. For example, the first device 100 may acquire information, such as the current position of the first vehicle C1, current traffic, accident black spots, and the like, by using a map application. In an embodiment of the present disclosure, the first device 100 may acquire information, such as current weather or future weather through a weather application. In an embodiment of the present disclosure, the first device 100 may acquire information relating to the driving conditions of the first vehicle C1 through a news application, an e-mail application, a social network service (SNS), and the like.

In operation S310, the second device 200 may transmit a phone call or a message to the first device 100. In operation S320, the first device 100 may receive the phone call or the message from the second device 200. In this regard, the phone call may be a phone call via a mobile communication network, a voice over internet protocol (VoIP) call, or a voice over long-term evolution (LTE) (VoLTE) call. In this regard, the message may be a short message service (SMS), a multimedia message service (MMS), or a message provided by a chatting service, such as KakaoTalk or Line, and the like.

In operation S330, the first device 100 may determine a threat level according to the driving conditions. In more detail, the first device 100 may analyze road conditions according to the detected driving conditions and determine the threat level according to a result of analysis.

An operation of the first device 100 that analyzes the road conditions will now be described. In an embodiment of the present disclosure, the first device 100 may analyze static road conditions and dynamic road conditions based on a result of detection. The first device 100 may analyze the static road conditions based on a threat element detected from a single frame of a camera and analyze the dynamic road conditions by tracking threat elements detected from continuous frames of the camera. The first device 100 may determine threats as static threats in a case where a distance from the threat element detected from the single frame to the first vehicle C1 is regarded as a threat and determine threats as dynamic threats in a case where the threat elements detected from continuous frames approach a colliding area of the first vehicle C1.

Thereafter, an operation of the first device 100 that determines the threat level will now be described. In an embodiment of the present disclosure, the first device 100 may predict a time to collision (TTC) and determine the threat level based on the predicted TTC. In more detail, the threat level may be finally determined based on detection of all threat elements that simultaneously occur, calculation of the TTC of all the detected threat elements, selection of the highest threat element, and the like. In this regard, threat elements may be defined as elements influencing the threat level, and may include, for example, a speed of the first vehicle C1, pedestrians in the colliding area, vehicles in the colliding area, a lane departure, road types (i.e., roads of the downtown or the countryside), road deterioration (i.e., road slipperiness or freezing due to rain or snow), and the like.

In an embodiment of the present disclosure, the first device 100 may determine a physical threat level (i.e., an objective threat level) relating to an object. The physical threat level may be explained as urgency URG of a response or attention of the driver. The urgency URG may be determined according to the TTC (i.e., $URG=1/(1+TTC)$). In this case, dynamics (i.e., a distance from pedestrian, a speed of a vehicle, and the like) inferred from current static and dynamic conditions may be considered.

In an embodiment of the present disclosure, the first device 100 may determine a probabilistic threat level of an accident that does not occur. In more detail, the probabilistic threat level involves a case where a detected target is not currently positioned on the colliding area of the first vehicle C1 but is predicted to immediately enter the colliding area. An operation of determining the threat level will be described in more detail with reference to FIGS. 4 to 7B below.

In operation S340, the first device 100 may limit notifications according to the determined threat level. In this regard, notifications may indicate receiving notifications of phone calls or messages. In more detail, all receiving notifications of phone calls or messages may be limited at the high threat level, and all receiving notifications of phone calls or messages may be permitted at the low threat level. Meanwhile, notifications may be selectively limited according to counterparts and receiving frequency at the middle threat level. This will be described later with reference to FIGS. 17 and 18.

In operation S350, the first device 100 may re-determine the threat level of the driving conditions. In operation S360, the first device 100 may provide limited notifications at a time according to the re-determined threat level. In the present embodiment of the present disclosure, the first device 100 may provide a notification packet including all limited notifications. In more detail, in a case where the re-determined threat level is the low threat level, the first device 100 may provide receiving notifications of phone calls or messages at a time. Meanwhile, in a case where the re-determined threat level is the middle threat level, the first device 100 may provide selectively receiving notifications of phone calls or messages according to counterparts and receiving frequency. This will be described with reference to FIGS. 13 to 16 later.

Figure 4:
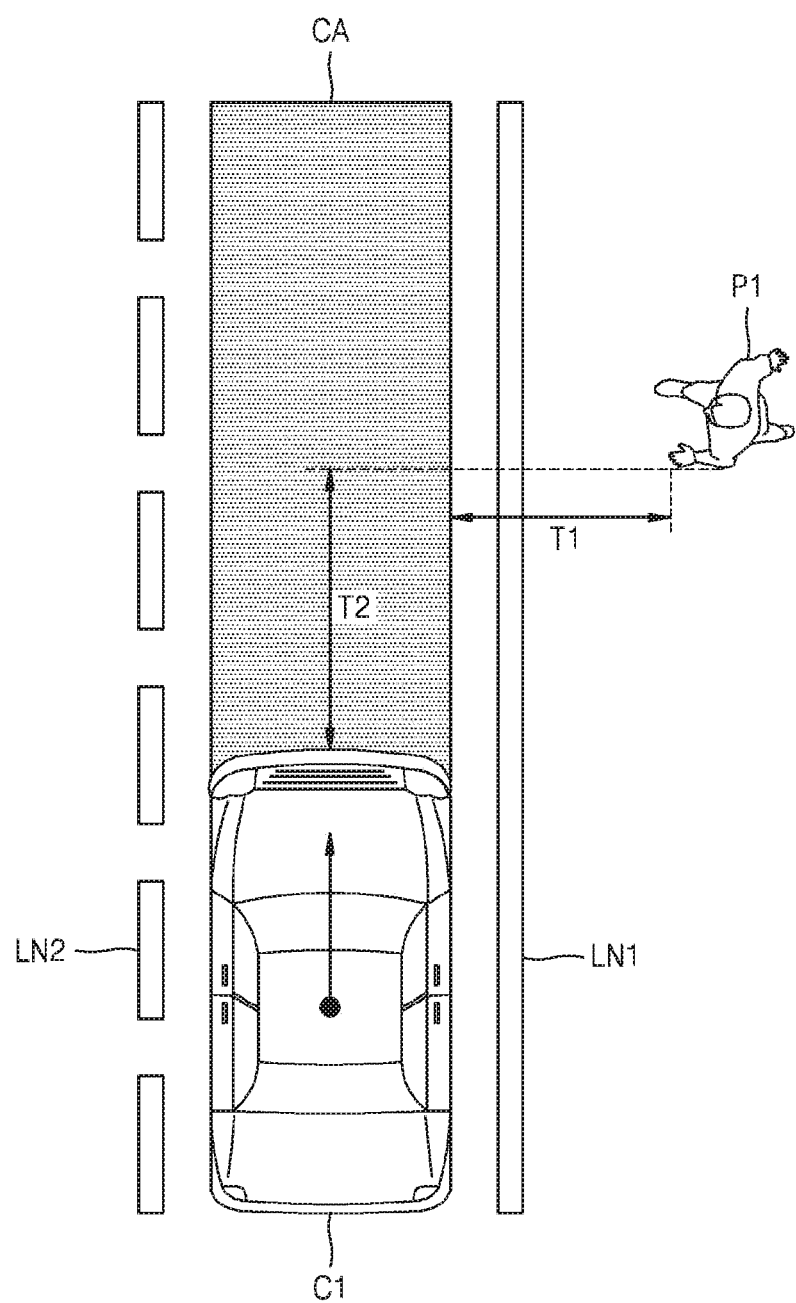
FIG. 4 illustrates an operation of determining a probabilistic threat level performed by a first device according to an embodiment of the present disclosure.

FIG. 4 illustrates illustrating an operation of determining a probabilistic threat level performed by a first device according to an embodiment of the present disclosure.

Referring to FIG. 4, the operation of determining the probabilistic threat level may be performed by, for example, the first device 100 of FIG. 1 and may correspond to, for example, operation S330 of FIG. 3. In the present example, a detected target may be a first pedestrian P1. The first pedestrian P1 is not positioned on a road between first and second lanes LN1 and LN2, i.e., in a colliding area CA, but is positioned next the first lane LN1. The first device 100 may estimate a predicted behavior of the first pedestrian P1 and thus may indicate the probabilistic threat level as the TTC.

A worst behavior may be used when the first pedestrian P1 stops moving or a motion vector of the first pedestrian P1 is unknown. In this regard, a speed of the first pedestrian P1 may be predicted as a standard value, for example, 1 m/s or 0.5 m/s. A most probable behavior may be used in case where the motion vector of the first pedestrian P1 is known. A first time T1 may be a time required by the first pedestrian P1 to reach the colliding area CA. A second time T2 may be defined as a required colliding time of the first vehicle C1. If the first pedestrian P1 is positioned on the colliding area CA, the first time T1 may be 0.

Figure 5:
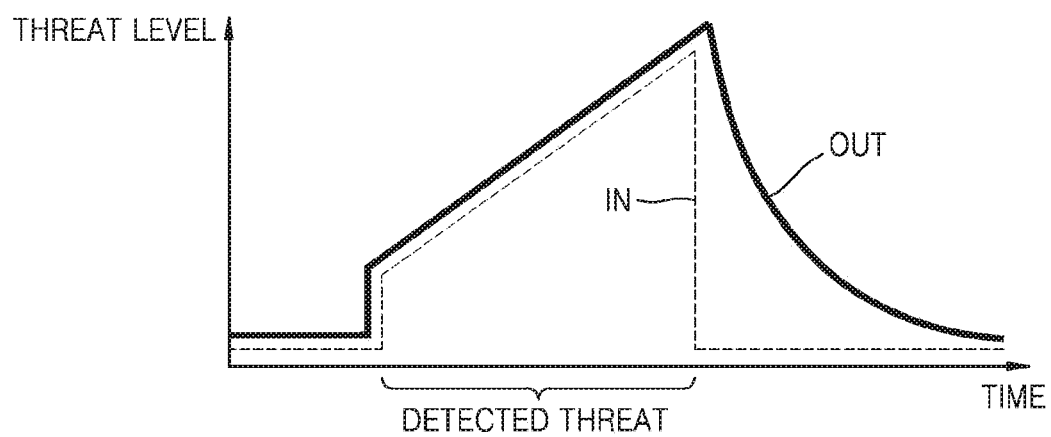
FIG. 5 is a graph showing a threat level determined by a first device according to an embodiment of the present disclosure.

FIG. 5 is a graph showing a threat level determined by a first device according to an embodiment of the present disclosure.

Referring to FIG. 5, the threat level according to the present embodiment of the present disclosure may be determined by, for example, the first device 100, and may correspond to, for example, operation S330 of FIG. 3. In the graph of FIG. 5, an X axis indicates time, and a Y axis indicates the threat level. The first device 100 may generate an input threat level IN according to detected driving conditions, and generate an output threat level OUT based on the generated input threat level IN.

The input threat level IN may increase when there is a detect threat based on the driving conditions and rapidly decrease when the detected threat appears. The output threat level OUT may be generated by filtering the input threat level IN by using an identity function during a section in which the input threat level IN does not decrease, and filtering the input threat IN by using an inertial function during a section in which the input threat level IN decreases.

Accordingly, the first device 100 may determine the output threat level OUT based on a threat element that is not detected but is likely to occur. Thus, the first device 100 may determine in real time a notification limit section based on the output threat level OUT and limit notifications of phone calls or messages during the notification limit section.

Figure 6A:
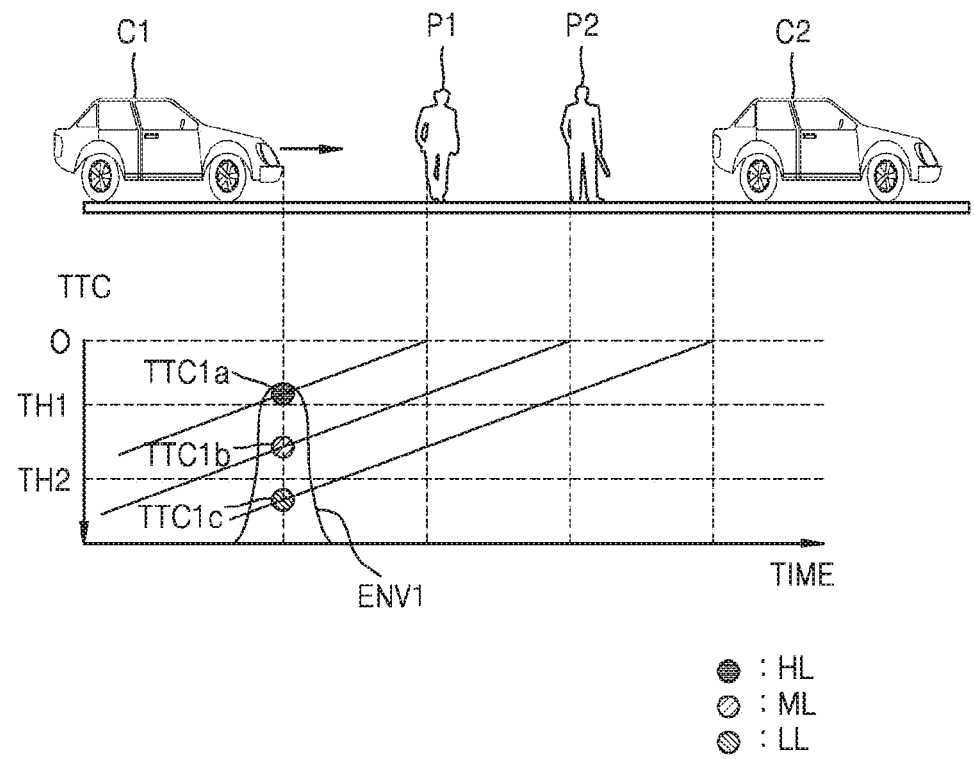
FIG. 6A is a graph showing probable threat elements detected by a first device at a first time and threat levels with respect to the probable threat elements according to an embodiment of the present disclosure.

FIG. 6A is a graph showing probable threat elements detected by a first device at a first time and threat levels with respect to the probable threat elements according to an embodiment of the present disclosure.

Referring to FIG. 6A, the threat levels may be classified as at least three threat levels of a high threat level HL, a middle threat level ML, and a low threat level LL. In more detail, the first device 100 may determine the high threat level HL in a case where a predicted TTC is smaller than a first threshold TH1, determine the middle threat level ML in a case where the predicted TTC is between the first threshold TH1 and a second threshold TH2, and determine the low threat level LL in a case where the predicted TTC is greater than the second threshold TH2.

A second vehicle C2, the pedestrian P1, and a second pedestrian P2 may be positioned on a road on which the first vehicle C1 runs. An X axis indicates time. A Y axis indicates the TTC. Since a predicted first time to collision TTC1$a$ with respect to the first pedestrian P1 is smaller than the first threshold TH1 at the first time t1, the first device 100 determine the high threat level HL with respect to the first pedestrian P1. Since a predicted second time to collision TTC1$b$ with respect to the second pedestrian P2 is between the first threshold TH1 and the second threshold TH2 at the first time t1, the first device 100 determine the middle threat level ML with respect to the second pedestrian P2. Since a predicted third time to collision TTC1$c$ with respect to the second vehicle C2 is greater than the second threshold TH2 at the first time t1, the first device 100 may determine the low threat level LL with respect to the second vehicle C2. An envelope ENV1 indicates all threat elements at the first time t1.

Figure 6B:
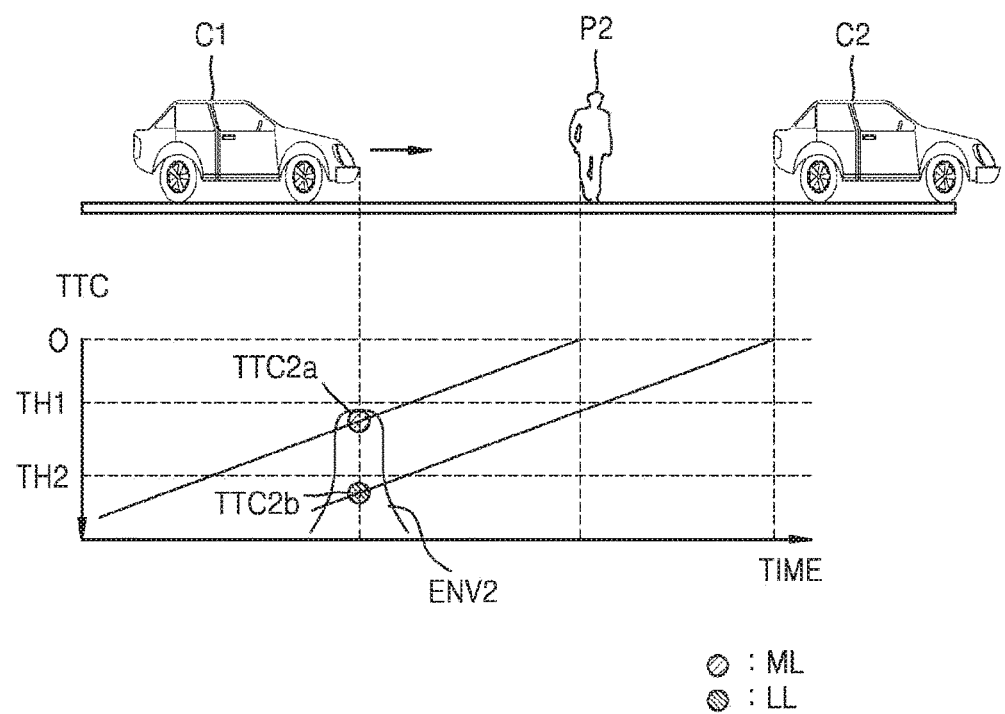
FIG. 6B is a graph showing probable threat elements detected by a first device at a second time and threat levels with respect to the probable threat elements according to an embodiment of the present disclosure.

FIG. 6B is a graph showing probable threat elements detected by a first device at a second time and threat levels with respect to the probable threat elements according to an embodiment of the present disclosure.

Referring to FIG. 6B, the second vehicle C2 and the second pedestrian P2 may be positioned on a road on which the first vehicle C1 runs. An X axis indicates time. A Y axis indicates the TTC. Since a predicted first time to collision TTC2$a$ with respect to the second pedestrian P2 is between the first threshold TH1 and the second threshold TH2 at the second time t2, the first device 100 determine the middle threat level ML with respect to the second pedestrian P2. Since a predicted third time to collision TTC2$b$ with respect to the second vehicle C2 is greater than the second threshold TH2 at the second time t2, the first device 100 determine the low threat level LL with respect to the second vehicle C2. An envelope ENV2 indicates all threat elements at the second time t2.

Figure 6C:
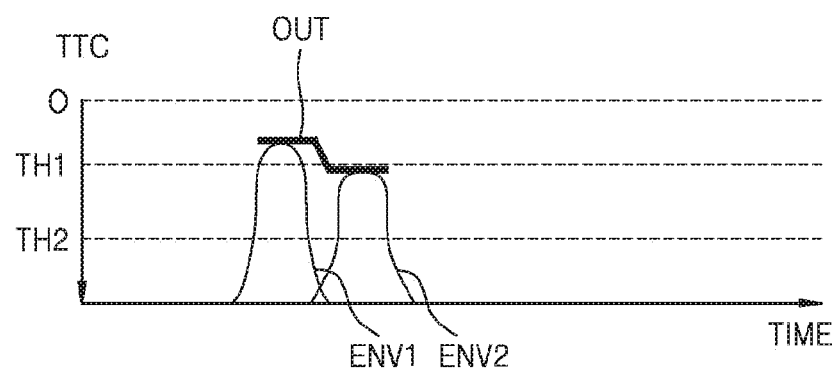
FIG. 6C illustrates a graph showing threat levels determined by a first device according to an embodiment of the present disclosure.

FIG. 6C is a graph illustrating threat levels determined by a first device according to an embodiment of the present disclosure.

Referring to FIG. 6C, the first device 100 may determine the output threat level OUT according to threat levels having a highest threat level based on the envelope ENV1 at the first time t1 and the envelope ENV2 at the second time t2. For example, in a case where the first device 100 receives a phone call or a message from the second device 200 at the first time t1, since the output threat level OUT is the high threat level HL at the first time t1, the first device 100 may limit a receiving notification of the phone call or the message received from the second device 200. The first device 100 may determine the output threat level OUT in real time and provide the limited notification according to the determined output threat level OUT. In more detail, since the output threat level OUT is changed to the middle threat level ML at the second time t2, the first device 100 may provide the receiving notification of the phone call or the message received at the first time t1 from the second device 200 at the second time t2.

Figure 7A:
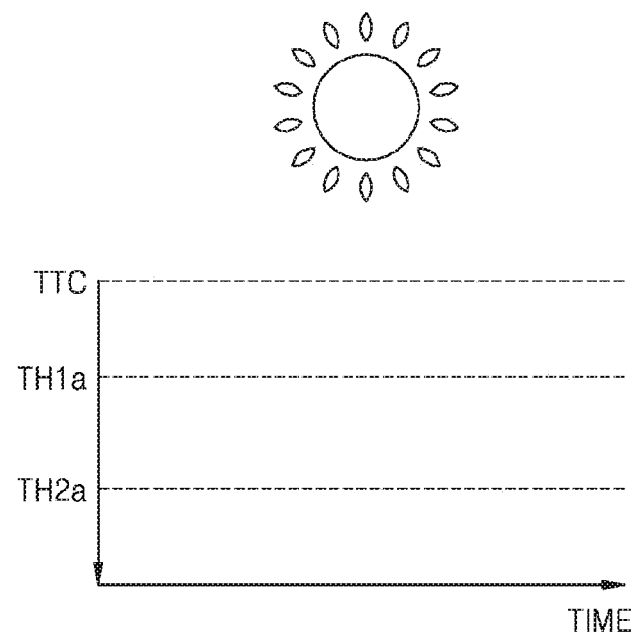
FIGS. 7A and 7B are graphs showing thresholds adaptive to an external environment determined by a first device according to an embodiment of the present disclosure.
Figure 7B:
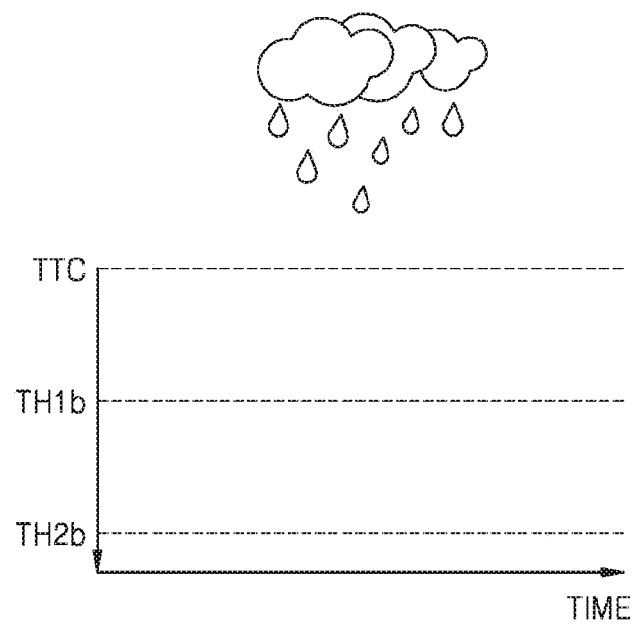

FIGS. 7A and 7B are graphs showing thresholds adaptive to an external environment determined by a first device according to an embodiment of the present disclosure.

Referring to FIGS. 7A and 7B, an X axis indicates time. A Y axis indicates the TTC. The first device 100 may acquire current weather information from, for example, a weather application, a news application, or an SNS application, and the like and configure thresholds for determining threat levels based on the acquired weather information.

In this regard, the thresholds for determining the threat levels may be configured as arbitrary TTC. In a case where a predicted TTC is below the first threshold TH1, the threat level may correspond to the high threat level HL. In a case where the predicted TTC is between the first threshold TH1 and the second threshold TH2, the threat level may correspond to the middle threat level ML. In a case where the predicted TTC exceeds the second threshold TH2, the threat level may correspond to the low threat level LL.

As shown in FIG. 7A, in a case where current weather is clear, the first device 100 may configure first and second threshold TH1a and TH2a to be relatively small. Meanwhile, as shown in FIG. 7B, in a case where current weather is cloudy or rainy, the first device 100 may configure first and second threshold TH1b and TH2b to be relatively great. In the case where current weather is cloudy or rainy, a reaction time of the first user USER1 may relatively increase, and a breaking distance may relatively increase. Thus, the first device 100 may configure the first and second threshold TH1b and TH2b in the case where current weather is cloudy or rainy to be sufficiently greater than the first and second threshold TH1a and TH2a in the case where current weather is clear.

Figure 8A:
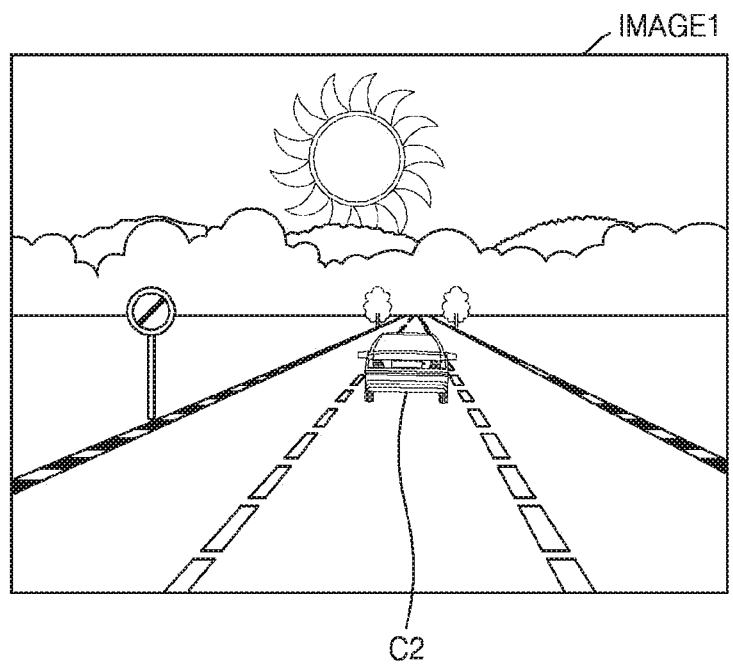
FIG. 8A illustrates first driving conditions detected by a first device according to an embodiment of the present disclosure.
Figure 8B:
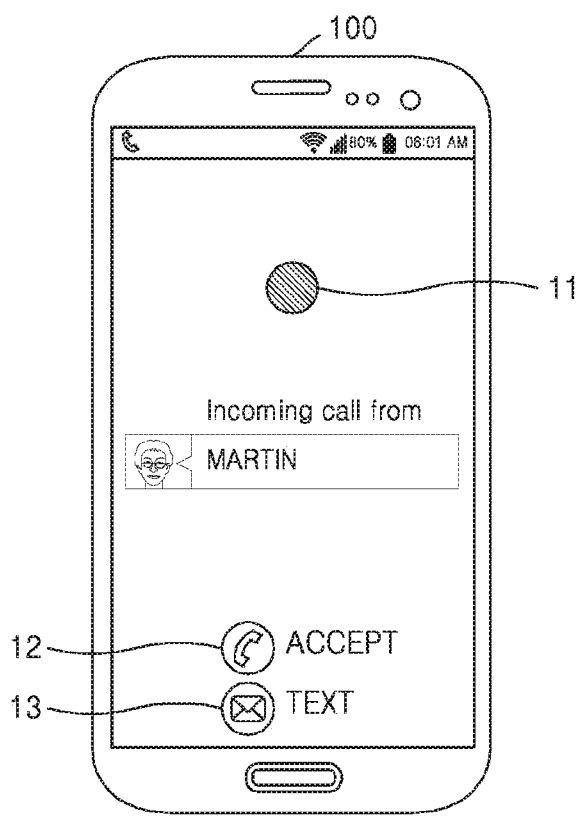
FIG. 8B illustrates a threat level display of the first device according to the detected first driving conditions according to an embodiment of the present disclosure.

FIG. 8A illustrates first driving conditions detected by a first device according to an embodiment of the present disclosure, and FIG. 8B illustrates a threat level display of a first device according to the detected first driving conditions according to an embodiment of the present disclosure.

Referring to FIG. 8A, the first device 100 may acquire a first image IMAGE1 through a camera of the first device 100. The first image IMAGE1 indicates an image of a driving direction of the first vehicle C1 in which the first device 100 is mounted, i.e., an image at which the first user USER1 looks. The first device 100 may acquire distance information from the first image IMAGE1 to the second vehicle C2. The first device 100 may predict the TTC with respect to the second vehicle C2 based on the acquired distance information and compare the predicted TTC with the first and second thresholds TH1 and TH2, thereby generating the output threat level OUT. In the present example, the first device 100 may determine driving conditions detected from the first image IMAGE1 as the low threat level LL.

Referring to FIG. 8B, since the low threat level LL is determined, the first device 100 may provide a notification of a phone call received from the second device 200. In this regard, a user interface (UI) element indicating the low threat level LL, i.e., a low threat level display 11, may be provided as, for example, a circle having a small green size. The first user USER1 may select an accept 12 when wanting a call connection with the second device 200. Meanwhile, the first user USER1 may select a message transmission 13 when transmitting a message to the second device 200.

Figure 9A:
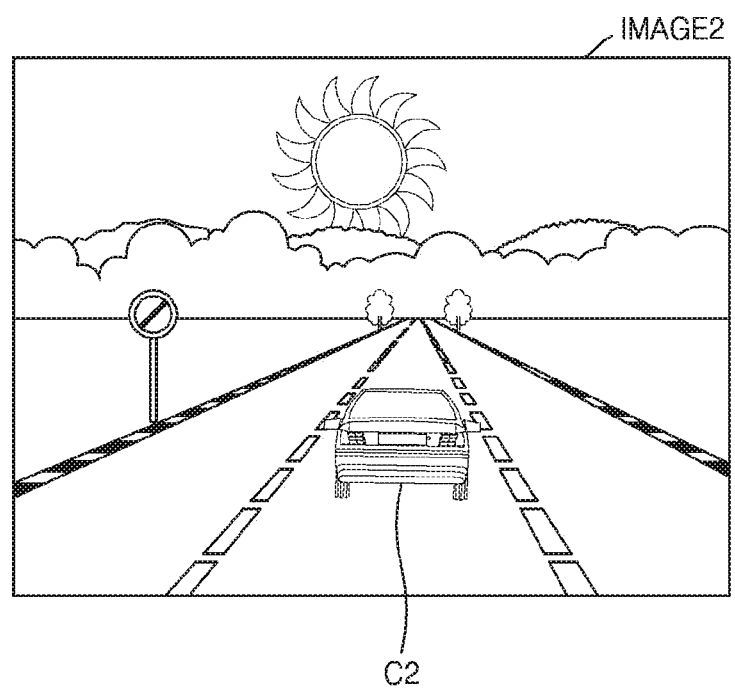
FIG. 9A illustrates second driving conditions detected by a first device according to an embodiment of the present disclosure.
Figure 9B:
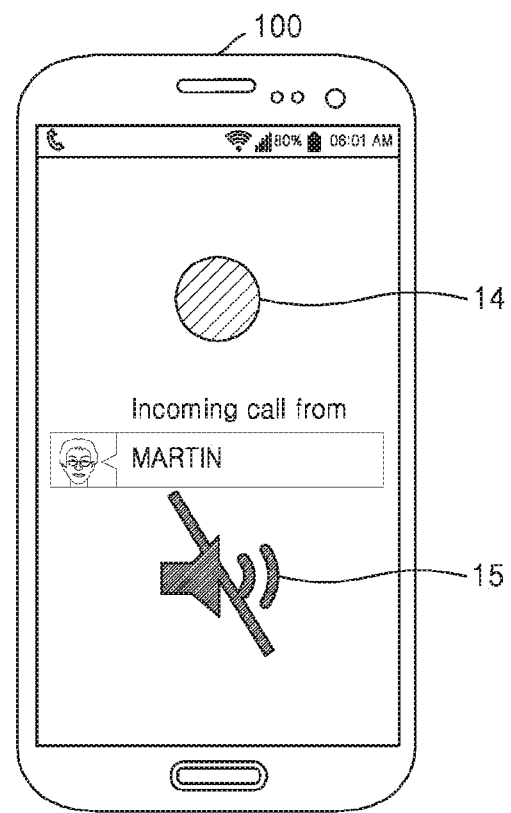
FIG. 9B illustrates a threat level display of the first device according to the detected second driving conditions according to an embodiment of the present disclosure.

FIG. 9A illustrates second driving conditions detected by a first device according to an embodiment of the present disclosure, and FIG. 9B illustrates a threat level display of a first device according to the detected second driving conditions according to an embodiment of the present disclosure.

Referring to FIG. 9A, the first device 100 may acquire a second image IMAGE2 through a camera of the first device 100. The first device 100 may acquire distance information from the second image IMAGE2 to the second vehicle C2. The first device 100 may predict the TTC with respect to the second vehicle C2 based on the acquired distance information and compare the predicted TTC with the first and second thresholds TH1 and TH2, thereby generating the output threat level OUT. In the present example, the first device 100 may determine driving conditions detected from the second image IMAGE2 as the middle threat level ML.

Referring to FIG. 9B, since the middle threat level ML is determined, the first device 100 may limit a notification of a phone call received from the second device 200. In this regard, a UI element indicating the middle threat level ML, i.e., a middle threat level display 14, may be provided as, for example, a circle having a small yellow size, and, in more detail, may have a greater size than that of the low threat level display 11 of FI. 8B. The first device 100 may provide a mute display 15 indicating that the notification is limited at the middle threat level ML.

Figure 10A:
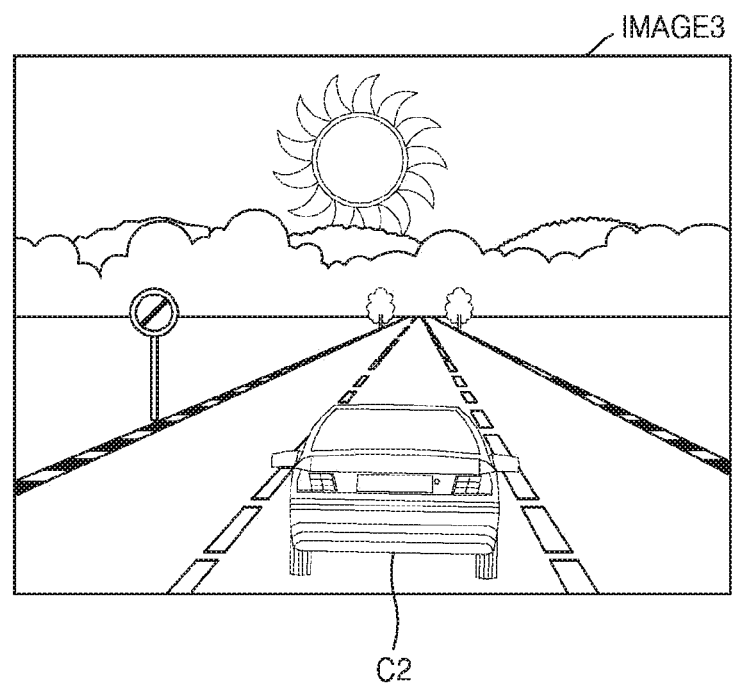
FIG. 10A illustrates third driving conditions detected by a first device according to an embodiment of the present disclosure.
Figure 10B:
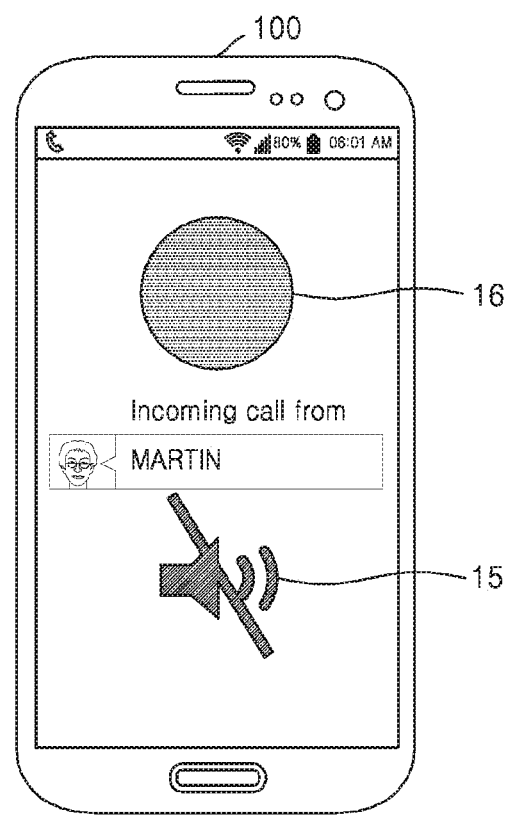
FIG. 10B illustrates a threat level display of the first device according to the detected third driving conditions according to an embodiment of the present disclosure.

FIG. 10A illustrates third driving conditions detected by a first device according to an embodiment of the present disclosure, and FIG. 10B illustrates a threat level display of a first device according to the detected third driving conditions according to an embodiment of the present disclosure.

Referring to FIG. 10A, the first device 100 may acquire a third image IMAGE3 through a camera of the first device 100. The first device 100 may acquire distance information from the third image IMAGE3 to the second vehicle C2. The first device 100 may predict the TTC with respect to the second vehicle C2 based on the acquired distance information and compare the predicted TTC with the first and second thresholds TH1 and TH2, thereby generating the output threat level OUT. In the present example, the first device 100 may determine driving conditions detected from the third image IMAGE3 as the high threat level HL.

Referring to FIG. 10B, since the high threat level HL is determined, the first device 100 may limit a notification of a phone call received from the second device 200. In this regard, an UI element indicating the high threat level HL, i.e., a high threat level display 16, may be provided as, for example, a circle having a large red size, and, in more detail, may have a greater size than that of the middle threat level display 14 of FIG. 9B. The first device 100 may provide the mute display 15 indicating that the notification is limited at the high threat level HL. Examples of the UI element indicating the high threat level HL will be described in more detail with reference to FIGS. 11A and 11B below.

Figure 11A:
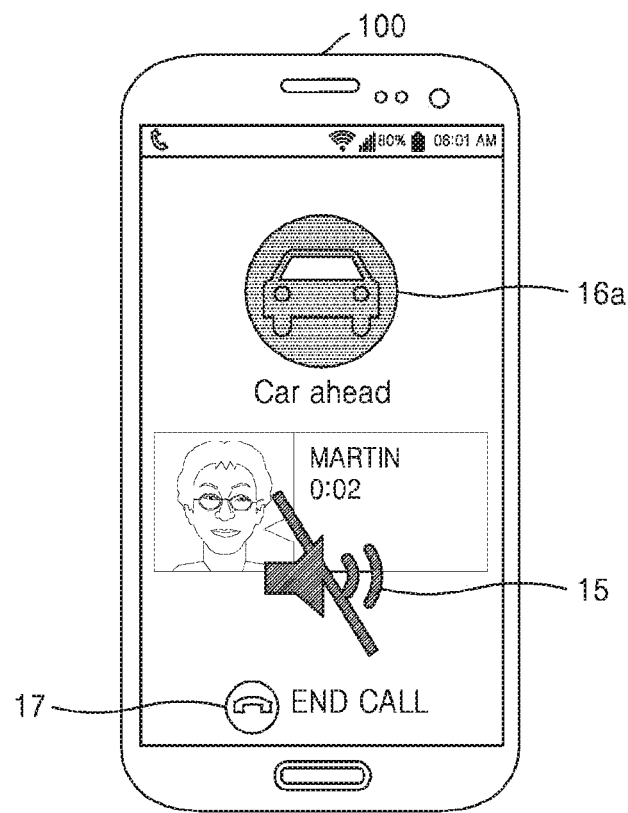
FIGS. 11A and 11B illustrate a high threat level display of a first device according to an embodiment of the present disclosure.
Figure 11B:
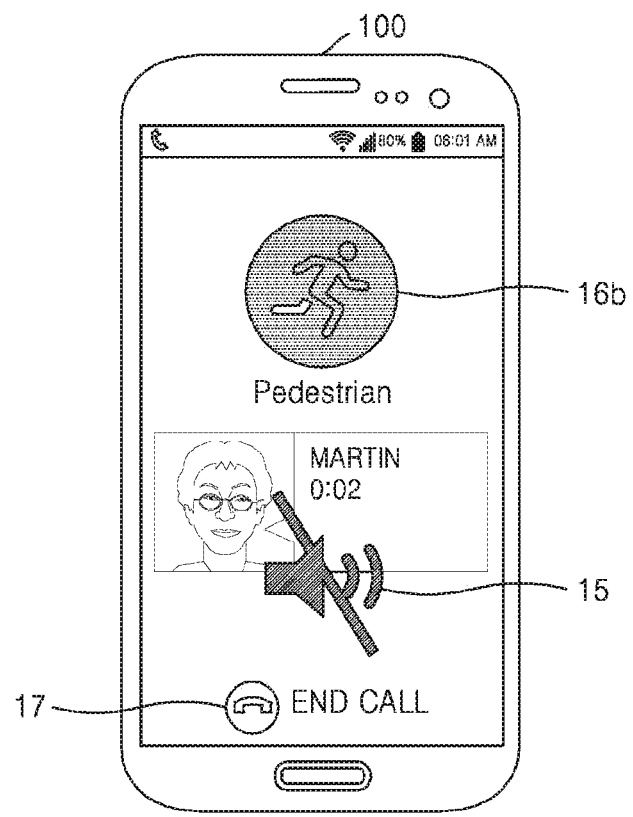

FIGS. 11A and 11B illustrate a high threat level display of a first device according to an embodiment of the present disclosure.

Referring to FIG. 11A, the first device 100 may provide a UI element including a detected threat element on a display at the high threat level HL. In the present embodiment of the present disclosure, since the detected threat element is a vehicle and a detected threat level is the high threat level HL, the first device 100 may provide the display 16a of the high threat level HL as, for example, a pictogram 16a including a vehicle shape in a large red circle.

For example, in a case where the first device 100 is on the phone with the second device 200, the first device 100 may limit a phone call at the high threat level HL. Accordingly, the first device 100 may enter the mute mode 15, and the first user USER1 may select an end call 17.

Referring to FIG. 11B, the first device 100 may provide a UI element including a detected threat element on a display at the high threat level HL. In the present embodiment of the present disclosure, since the detected threat element is a pedestrian and a detected threat level is the high threat level HL, the first device 100 may provide the display 16b of the high threat level HL as, for example, a pictogram 16b including a pedestrian shape in a large red circle.

Figure 12:
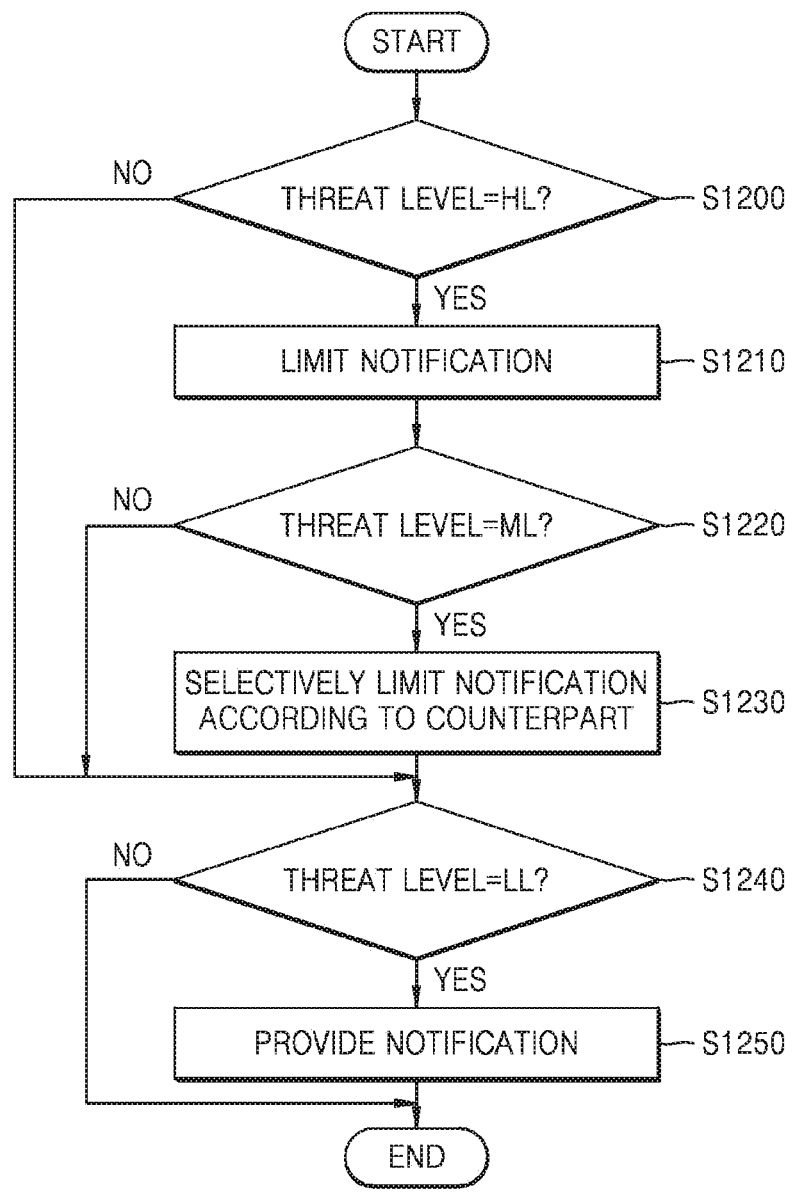
FIG. 12 is a flowchart of a notification limiting method adaptive to a plurality of threat levels performed by a first device according to an embodiment of the present disclosure.

FIG. 12 is a flowchart of a notification limiting method adaptive to a plurality of threat levels performed by a first device according to an embodiment of the present disclosure.

Referring to FIG. 12, the notification limiting method according to the present embodiment of the present disclosure may be performed by, for example, the first device 100 of FIG. 1 and may correspond to, for example, operation S350 of FIG. 3.

In operation S1200, the first device 100 may determine if a determined threat level is the high threat level HL. As a result of determination, the first device 100 may perform operation S1210 if the determined threat level is the high threat level HL and may perform operation S1240 if the determined threat level is not the high threat level HL. In operation S1210, the first device 100 may limit a notification with respect to a phone call or message.

In operation S1220, the first device 100 may determine if the determined threat level is the middle threat level ML. As a result of determination, the first device 100 may perform operation S1230 if the determined threat level is the middle threat level ML and may perform operation S1240 if the determined threat level is not the middle threat level ML. In operation S1230, the first device 100 may selectively limit a notification according to a second user USER2. For example, a user may configure to permit a receiving notification with respect to a specific sender in advance. In a case where the phone call or message is received from a sender who is allowed to permit the receiving notification, the first device 100 may permit the notification at the middle threat level ML.

In operation S1240, the first device 100 may determine if the determined threat level is the low threat level LL. As a result of determination, the first device 100 may perform operation S1250 if the determined threat level is the low threat level LL and may end a notification limiting operation if the determined threat level is not the low threat level LL. In operation S1250, the first device 100 may permit the notification with respect to the phone call or message.

Figure 13:
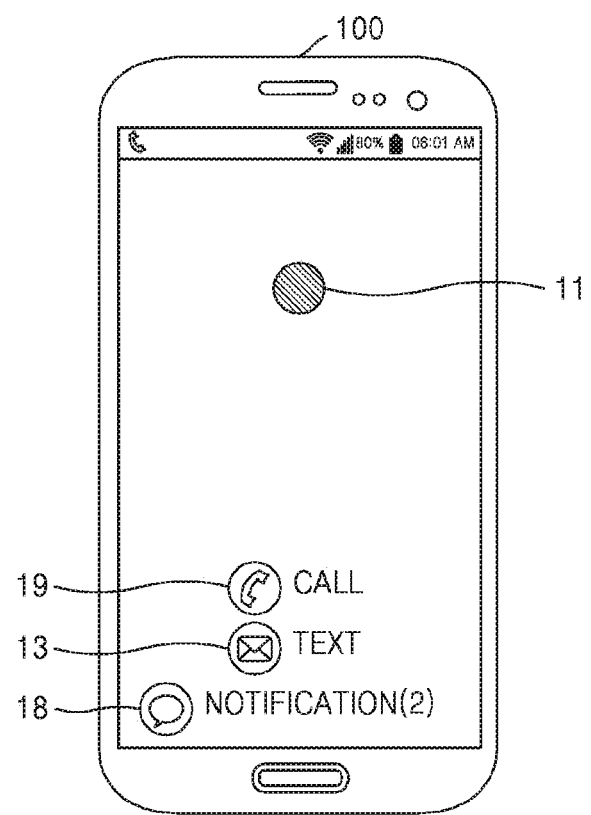
FIG. 13 illustrates a notification providing screen of a first device according to an embodiment of the present disclosure.

FIG. 13 illustrates a notification providing screen of a first device according to an embodiment of the present disclosure.

Referring to FIG. 13, the notification providing screen according to the present embodiment may correspond to an embodiment of operation S360 of FIG. 3. In a case where a re-determined threat level is the low threat level LL, the first device 100 may provide notifications 18 at a time. In a case where the re-determined threat level is the low threat level LL, the first device 100 may display permission of a call transmission 19 and the message transmission 13.

Figure 14:
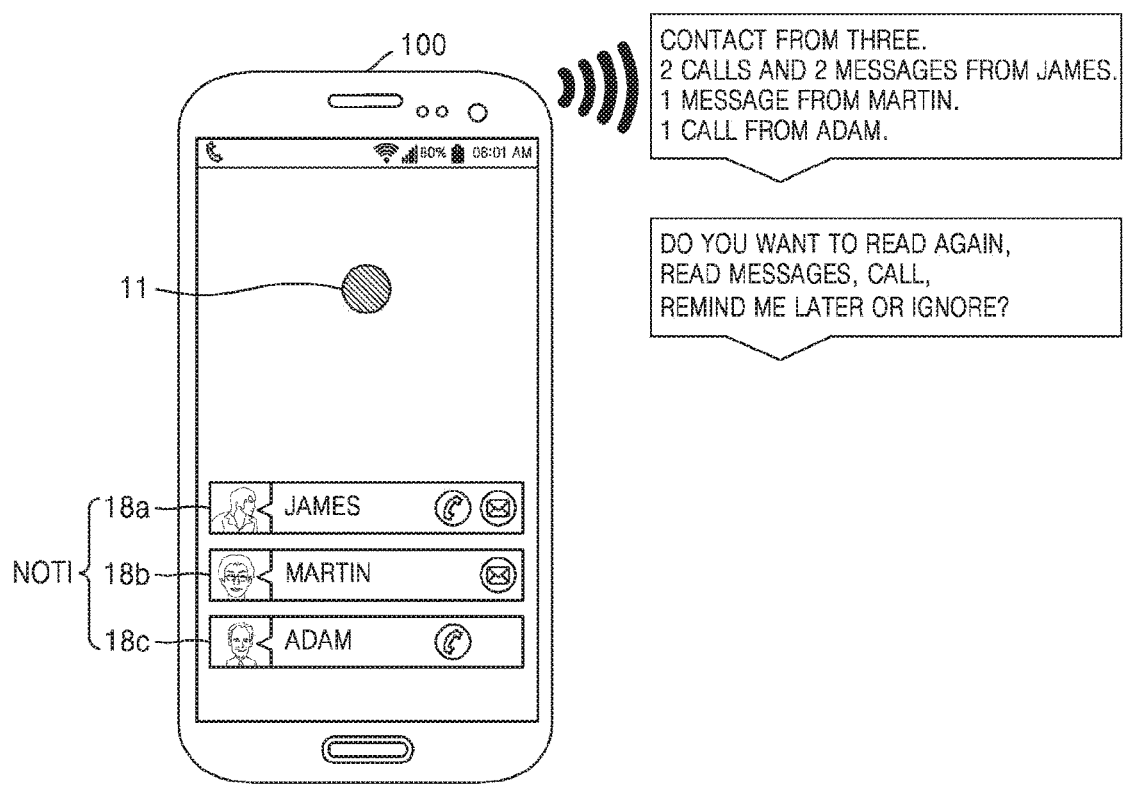
FIG. 14 illustrates a notification providing screen of a first device according to an embodiment of the present disclosure.

FIG. 14 illustrates a notification providing screen of a first device according to an embodiment of the present disclosure.

Referring to FIG. 14, the present embodiment may be provided in a case where the first user USER1 selects the notifications 18 in FIG. 13. The first device 100 may provide a notification packet including notifications limited during a section at a time. The notification packet NOT1 may include a first notification 18a, a second notification 18b, and a third notification 18c. For example, the first notification 18a may be a notification with respect to calls and messages received from JAMES, the second notification 18b may be a notification with respect to a message received from MARTIN, and the third notification 18c may be a notification with respect to a call received from ADAM.

In an embodiment of the present disclosure, the first device 100 may provide the notification packet NOT1 in sound through a speaker of the first device 100. In an embodiment of the present disclosure, the first device 100 may provide the notification packet NOT1 in sound through a speaker of the first vehicle C1. For example, the first device 100 may output "Contact from three. 2 calls and 2 messages from JAMES. 1 message from MARTIN. 1 call from ADAM" in voice through the speaker. Thereafter, the first device 100 may output a selection request of a user "Do you want to Read again, Read messages, Call, Remind me later or Ignore?" in voice through the speaker.

Figure 15:
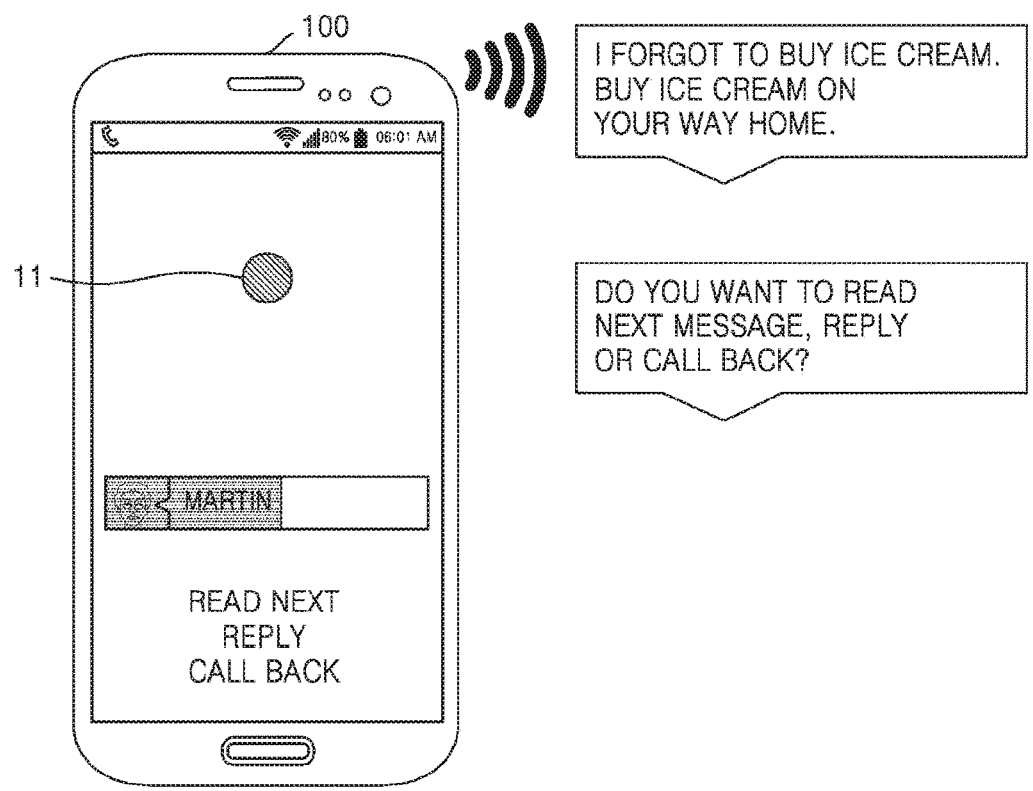
FIG. 15 illustrates providing a receiving message performed by a first device according to an embodiment of the present disclosure.

FIG. 15 illustrates providing a receiving message performed by a first device according to an embodiment of the present disclosure.

Referring to FIG. 15, an operation of providing the receiving message according to the present embodiment of the present disclosure may apply, for example, in a case where a user selects "message reading" with respect to providing a notification of FIG. 14. The first device 100 may convert text included in a message (for example, a message received from MARTIN) into voice and output the converted voice (for example, "I forgot to buy ice cream. Buy ice cream on your way home") through a speaker of the first device 100. Thereafter, the first device 100 may output a selection request of the user "Do you want to Read next message, Reply or Call back?" in voice through the speaker.

Figure 16:
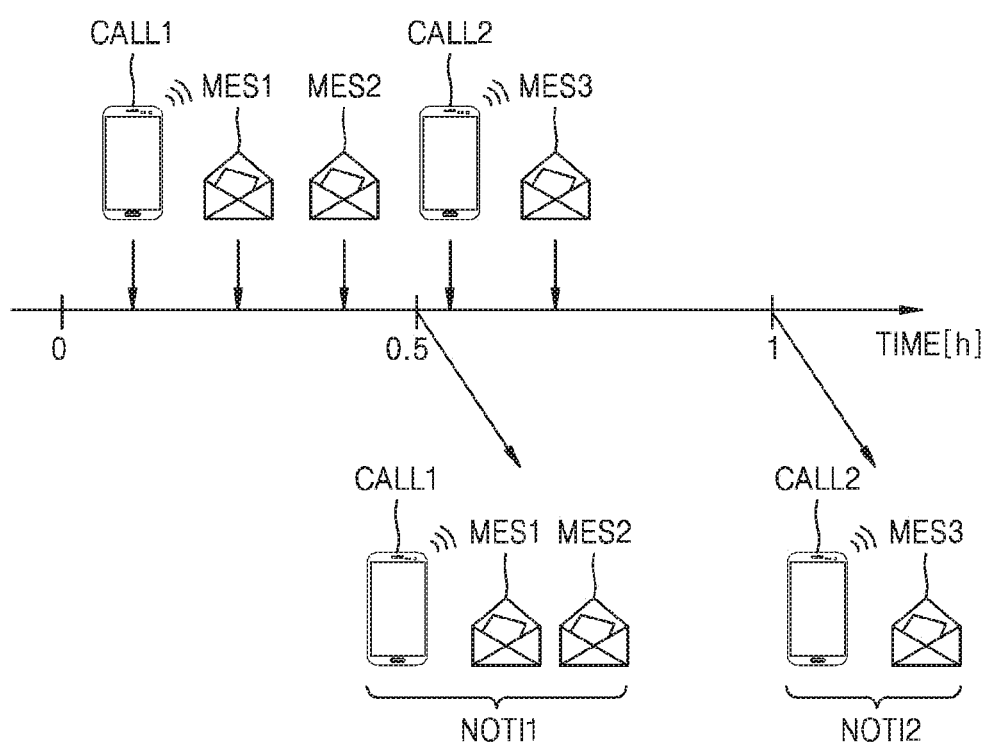
FIG. 16 illustrates a notification providing method performed by a first device according to an embodiment of the present disclosure.

FIG. 16 illustrates a notification providing method performed by a first device according to an embodiment of the present disclosure.

Referring to FIG. 16, the first device 100 may provide notification packets NOT11 and NOT12 at a preset period or a preset time. In an embodiment of the present disclosure, if driving conditions are changed, in more detail, if a threat level is changed to the low threat level LL, the first device 100 may provide the notification packets NOT11 and NOT12 at the preset period or the preset time. In an embodiment of the present disclosure, although the driving conditions are not changed, in more detail, if the threat level is changed to the high threat level HL or the middle threat level ML, the first device 100 may provide the notification packets NOT11 and NOT12 at the preset period or the preset time.

In the present example, the preset period may be 30 minutes. In an embodiment of the present disclosure, the first device 100 may limit notifications with respect to communication events received by the first device 100, i.e., a first call CALL1 and first and second messages MES1 and MES2, for initial 30 minutes, and provide the first notification packet NOT1 including all the first call CALL1 and the first and second messages MES1 and MES2 in 30 minutes. Thereafter, the first device 100 may limit notifications with respect to communication events received by the first device 100, i.e., a second call CALL2 and a third message MES3, for next 30 minutes, and provide the second notification packet NOT2 including both the second call CALL2 and the third message MES3 in 30 minutes.

According to the present embodiment of the present disclosure, the first user USER1 may previously configure a notification period or a notification time, and receive the notification packets NOT1 and NOT2 only at the notification period or the notification time while limiting other notifications, thereby greatly reducing a number of interruptions of driving of the first user USER1 caused by notifications of the first device 100.

Figure 17:
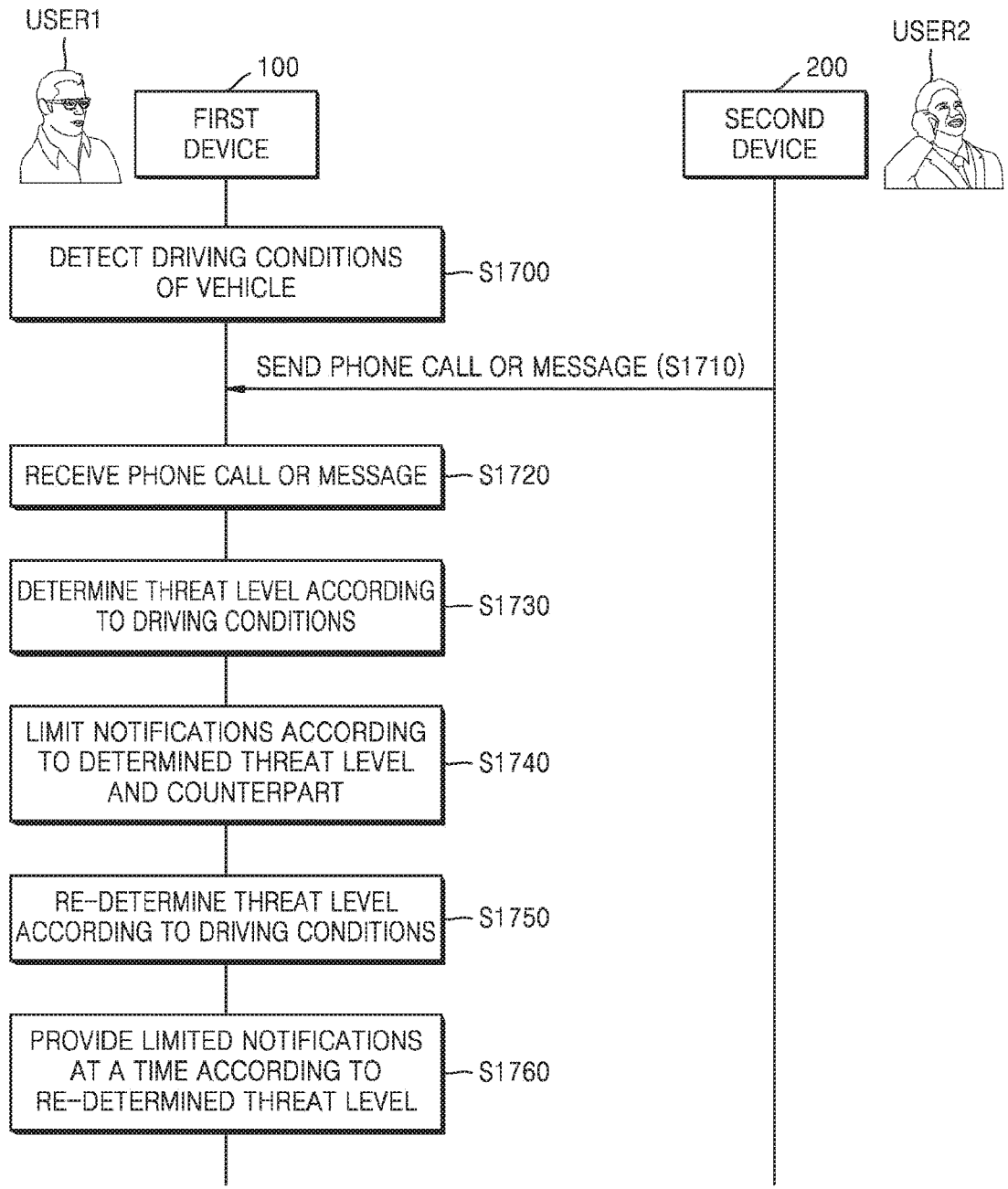
FIG. 17 is a flowchart illustrating operations of first and second devices performed by using a device control method according to an embodiment of the present disclosure.

FIG. 17 is a flowchart illustrating operations of first and second devices performed by using a device control method according to an embodiment of the present disclosure.

Referring to FIG. 17, the device control method according to the present embodiment may be a modification of the device control method of FIG. 3 and include operations that are time-serially performed by the first and second devices 100 and 200 of FIG. 1. Although omitted below, descriptions of the first and second devices 100 and 200 with reference to FIG. 1 apply to the device control method according to the present embodiment.

In operation S1700, the first device 100 may detect driving conditions of a vehicle. In operation S1710, the second device 200 may transmit a phone call or a message to the first device 100. In operation S1720, the first device 100 may receive the phone call or the message from the second device 200. In operation S1730, the first device 100 may determine a threat level according to the driving conditions.

In operation S1740, the first device 100 may limit notifications according to the determined threat level and a counterpart. In this regard, the determined threat level may be classified as at least the high threat level HL, the middle threat level ML, and the low threat level LL. In the present embodiment of the present disclosure, in a case where the determined threat level is the high threat level HL, the first device 100 may limit notifications irrespective of the counterpart, i.e., the second user USER2, in a case where the determined threat level is the middle threat level ML, the first device 100 may permit notifications irrespective of the second user USER2, and in a case where the determined threat level is the low threat level LL, the first device 100 may selectively limit notifications according to the second user USER2.

In an embodiment of the present disclosure, the first device 100 may determine a white list based on a phone book, a call history, a message transmitting/receiving list, or user settings. In the case where the determined threat level is the middle threat level ML, if the second user USER2 is included in the white list, the first device 100 may permit notifications, and, if the second user USER2 is not included in the white list, the first device 100 may limit notifications. For example, in a case where a phone call or message is received from the second user USER2 stored in a favorite list of the phone book, the first device 100 may determine that the second user USER2 is included in the white list and may permit notifications at the middle threat level ML.

In operation S1750, the first device 100 may re-determine the threat level according to the driving conditions. In operation S1760, the first device 100 may provide limited notifications at a time according to the re-determined threat level.

Figure 18:
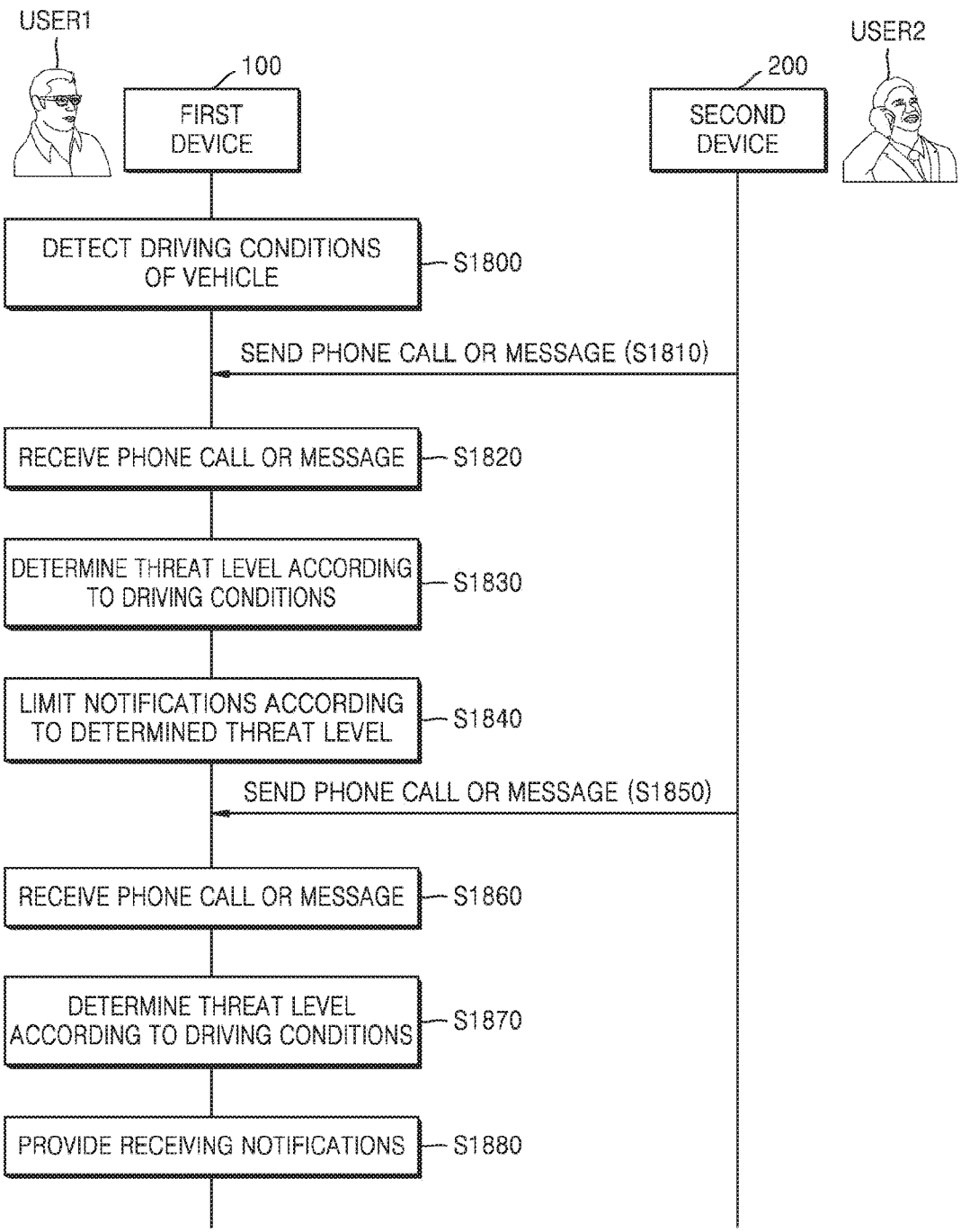
FIG. 18 is a flowchart illustrating operations of first and second devices performed by using a device control method according to an embodiment of the present disclosure.

FIG. 18 is a flowchart illustrating operations of first and second devices performed by using a device control method according to an embodiment of the present disclosure.

Referring to FIG. 18, the device control method according to the present embodiment may be a modification of the device control method of FIG. 3 and include operations that are time-serially performed by the first and second devices 100 and 200 of FIG. 1. Although omitted below, descriptions of the first and second devices 100 and 200 with reference to FIG. 1 apply to the device control method according to the present embodiment.

In operation S1800, the first device 100 may detect driving conditions of a vehicle. In operation S1810, the second device 200 may transmit a phone call or a message to the first device 100. In operation S1820, the first device 100 may receive the phone call or the message from the second device 200. In operation S1830, the first device 100 may determine a threat level according to the driving conditions. In operation S1840, the first device 100 may limit notifications according to the determined threat level.

In operation S1850, the second device 200 may transmit a phone call or a message to the first device 100 again. In operation S1860, the first device 100 may receive the phone call or the message from the second device 200 again. In operation S1870, the first device 100 may determine the threat level according to the driving conditions. In operation S1880, the first device 100 may provide receiving notifications.

In the present embodiment of the present disclosure, the first device 100 may adaptively limit or provide notifications according to an occurrence frequency of events, i.e., a receiving frequency from the second device 200. In more detail, in a case where a receiving number from the same second user USER2 exceeds a preset value, the first device 100 may determine that the received phone call or message is an important phone call or message, and limitedly permit a notification with respect to the received phone call or message. In the present embodiment of the present disclosure, in a case where the receiving number from the second user USER2 is more than 2 times, the first device 100 may provide a receiving notification from the second device 200 at the middle threat level ML.

Figure 19:
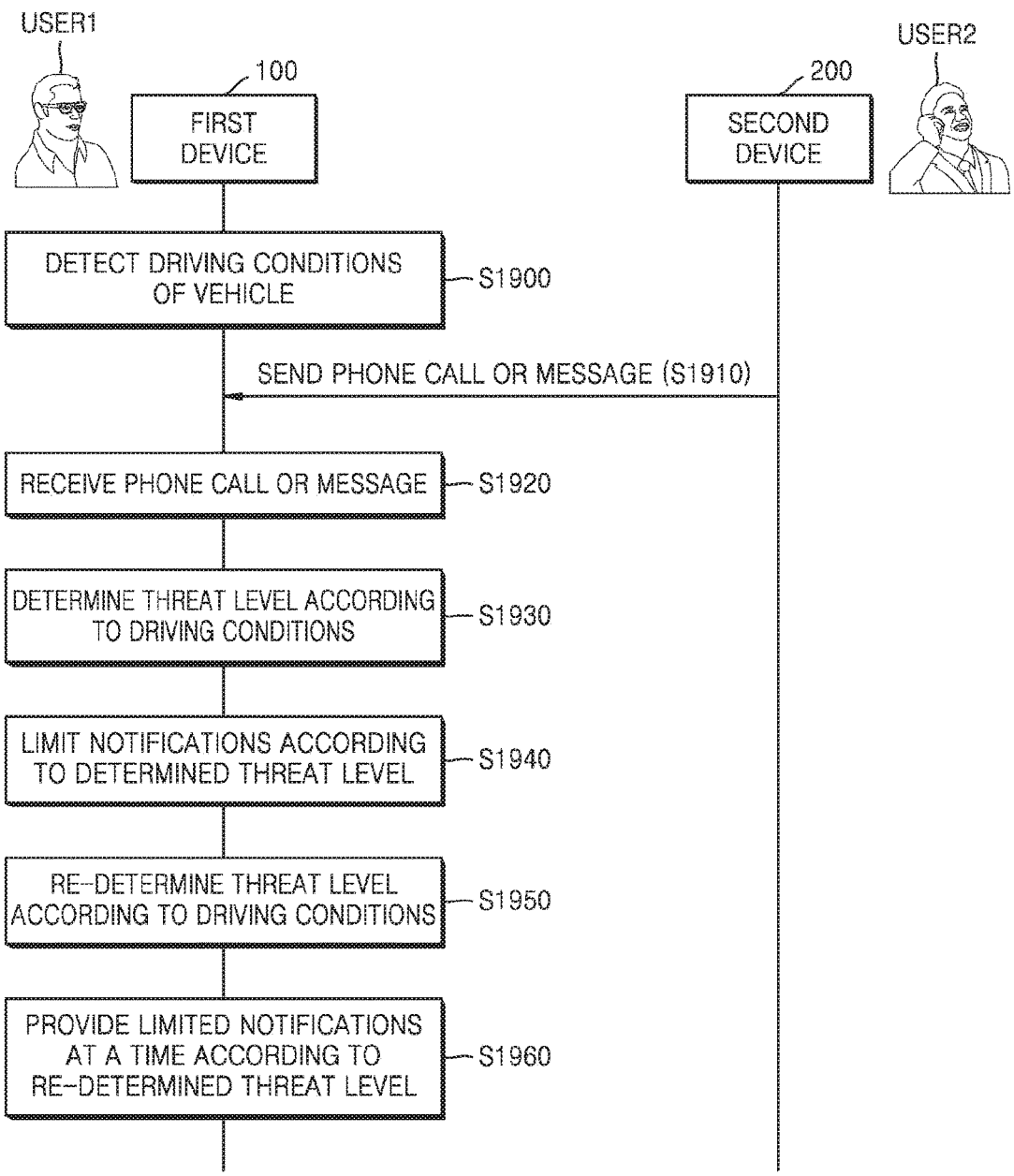
FIG. 19 is a flowchart illustrating operations of first and second devices performed by using a device control method according to an embodiment of the present disclosure.

FIG. 19 is a flowchart illustrating operations of first and second devices performed by using a device control method according to an embodiment of the present disclosure.

Referring to FIG. 19, the device control method according to the present embodiment may be a modification of the device control method of FIG. 3 and include operations that are time-serially performed by the first and second devices 100 and 200 of FIG. 1. Although omitted below, descriptions of the first and second devices 100 and 200 with reference to FIG. 1 apply to the device control method according to the present embodiment.

In operation S1900, the first device 100 may detect driving conditions of a vehicle. In operation S1910, the second device 200 may transmit a phone call or a message to the first device 100. In operation S1920, the first device 100 may receive the phone call or the message from the second device 200. In operation S1930, the first device 100 may determine a threat level according to the driving conditions. In operation S1940, the first device 100 may limit notifications according to the determined threat level.

In operation S1950, the first device 100 may provide a state change guide with respect to a condition for changing the driving conditions. In more detail, in a case where the threat level determined in operation S1930 is the high threat level HL or the middle threat level ML, the first device 100 may determine the condition for changing the driving conditions such that the threat level is changed to the low threat level LL, and provide the state change guide with respect to the determined condition. In an embodiment of the present disclosure, the first device 100 may output the state change guide in sound through a speaker of the first device 100. In an embodiment of the present disclosure, the first device 100 may output the state change guide in sound through a speaker of the first vehicle C1. This will be described in more detail with reference to FIG. 20.

In operation S1960, the first device 100 may re-determine the threat level according to the driving conditions. In operation S1970, the first device 100 may provide limited notifications at a time according to the re-determined threat level.

Figure 20:
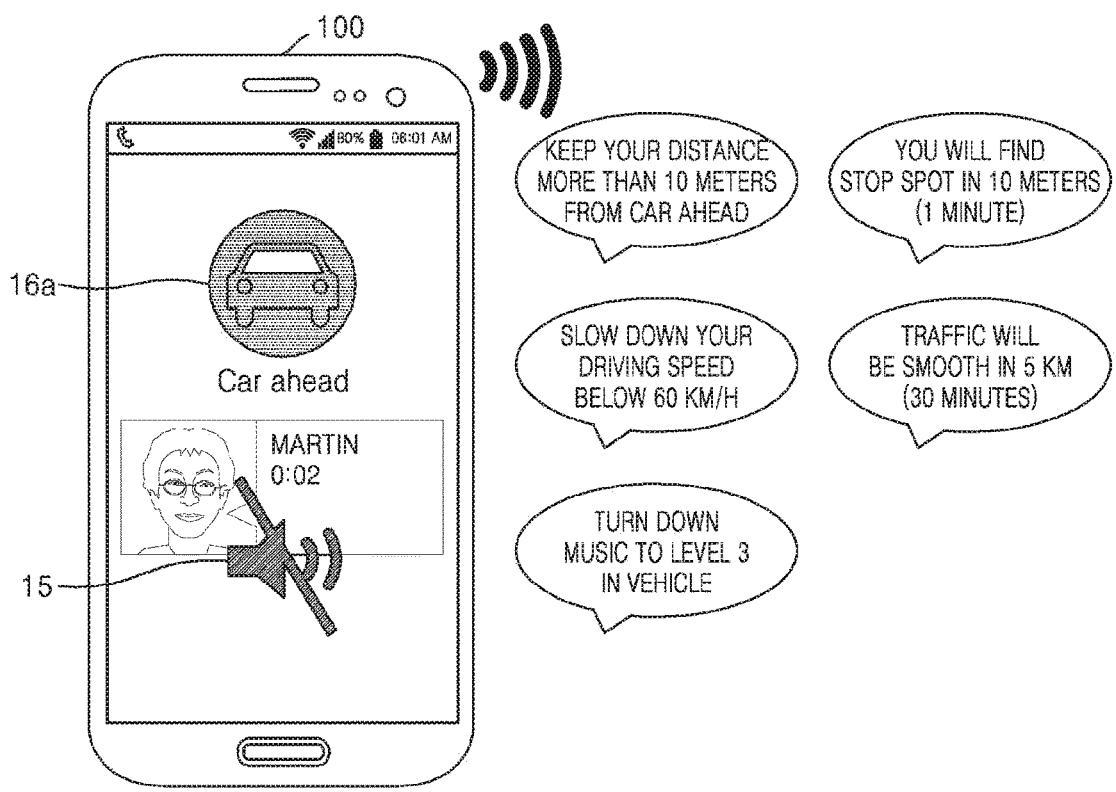
FIG. 20 illustrates a state change guide performed by a first device according to an embodiment of the present disclosure.

FIG. 20 illustrates examples of providing a state change guide performed by the first device 100 according to an embodiment of the present disclosure.

Referring to FIG. 20, the first device 100 may limit notifications at the high threat level HL and determine a condition for changing the driving conditions. In this regard, the driving conditions may include at least one of outer conditions of a vehicle, inner conditions of the vehicle, conditions of the vehicle itself, and conditions of a driver.

In an embodiment of the present disclosure, the first device 100 may provide the state change guide for a condition for changing the outer conditions of the vehicle. In more detail, the first device 100 may determine a stop available spot, and the like, through an image captured by a camera, and determine a position of a service area or a traffic smooth zone, and the like, through an application. Thereafter, the first device 100 may generate the state change guide based on a result of determination and output the generated state change guide in sound. For example, the first device 100 may output state change guides "Keep your distance more than 10 meters from the car ahead", "You will find a stop spot in 10 meters (1 minute)", "Slow down your driving speed below 60 km/h", "Traffic will be smooth in 5 km (30 minutes)", and the like, in voice through a speaker.

In an embodiment of the present disclosure, the first guide 100 may provide the state change guide for a condition for changing the inner conditions of the vehicle. In more detail, the first device 100 may detect, through the speaker, a level of noise of the vehicle or sound reproduced through a speaker of the vehicle, and determine a volume level of sound that allows a phone call with the second user USER2. For example, the first device 100 may output the state change guide "Turn down the music to level 3 in the vehicle" in voice through the speaker.

In an embodiment of the present disclosure, the first guide 100 may provide the state change guide for a condition for changing the conditions of the driver. In more detail, the first device 100 may detect, through a camera, a position of an iris or a head of the first user USER1 and determine a fatigue of the first user USER1, and the like, based on a result of detection. The first device 100 may recognize voice of the first use through the speaker and determine an emotional state of the first user USER1 based on a result of recognition. For example, the first device 100 may output a state change guide "You will find a service area in 10 meters. Take a short rest", and the like, in voice through a speaker.

Figure 21:
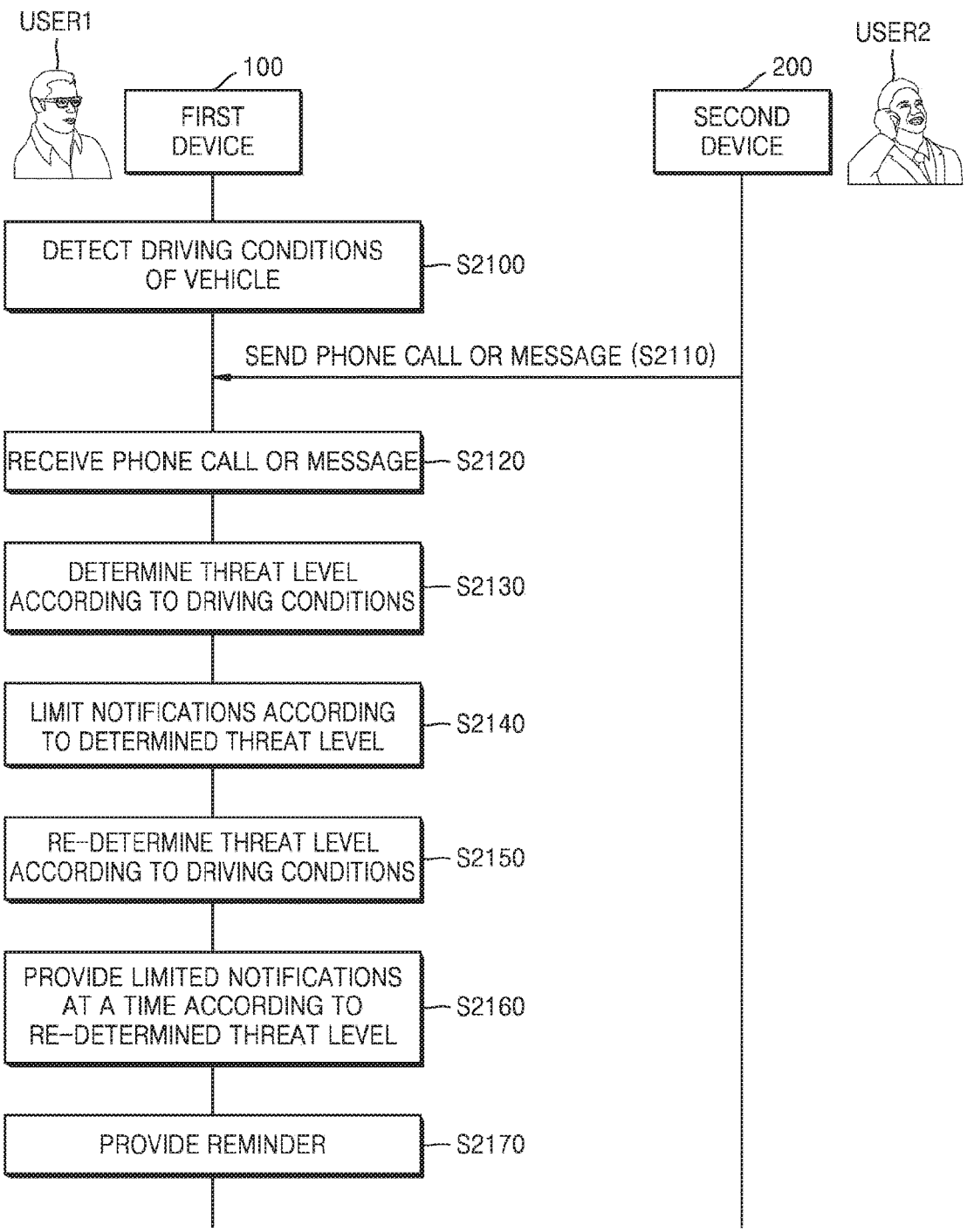
FIG. 21 is a flowchart illustrating operations of first and second devices performed by using a device control method according to an embodiment of the present disclosure.

FIG. 21 is a flowchart illustrating operations of first and second devices performed by using a device control method according to an embodiment of the present disclosure.

Referring to FIG. 21, the device control method according to the present embodiment of the present disclosure may be a modification of the device control method of FIG. 3 and include operations that are time-serially performed by the first and second devices 100 and 200 of FIG. 1. Although omitted below, descriptions of the first and second devices 100 and 200 with reference to FIG. 1 apply to the device control method according to the present embodiment.

In operation S2100, the first device 100 may detect driving conditions of a vehicle. In operation S2110, the second device 200 may transmit a phone call or a message to the first device 100. In operation S2120, the first device 100 may receive the phone call or the message from the second device 200.

In operation S2130, the first device 100 may determine a threat level according to the driving conditions. In operation S2140, the first device 100 may limit notifications according to the determined threat level. In operation S2150, the first device 100 may re-determine the threat level according to the driving conditions. In operation S2160, the first device 100 may provide limited notifications at a time according to the re-determined threat level.

In operation S2170, the first device 100 may provide a user with a reminder. This will be described in detail with reference to FIG. 22.

Figure 22:
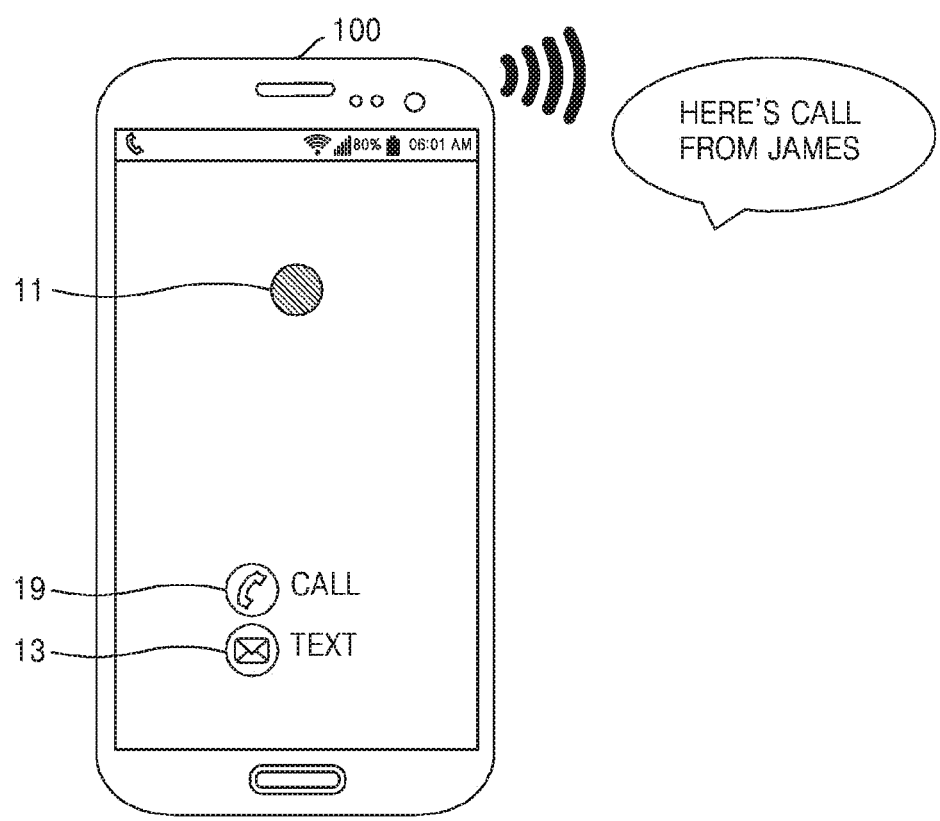
FIG. 22 illustrates providing a reminder performed by a first device according to an embodiment of the present disclosure.

FIG. 22 illustrates providing a reminder performed by a first device according to an embodiment of the present disclosure.

Referring to FIG. 22, if a threat level is changed to the low threat level LL, the first device 100 may provide limited notifications with a user at a time, and, if a time has elapsed, provide the user with the reminder. For example, the first device 100 may output a reminder "Here's call from JAMES" in voice through a speaker. The first device 100 may output the reminder "Here's call from JAMES" on a display through text.

In an embodiment of the present disclosure, the first user USER1 may select a call transmission 19 or a message transmission 13 after receiving the reminder. In another embodiment of the present disclosure, the first user USER1 may input a user command "Call JAMES" or "Text JAMES" to the first device 100 in voice after receiving the reminder.

In an embodiment of the present disclosure, the first device 100 may provide the first user USER1 with the reminder if an operation of the first vehicle C1 ends. If the operation of the first vehicle C1 ends, the first device 100 may repeatedly provide the first user USER1 with the reminder at a time interval.

Figure 23:
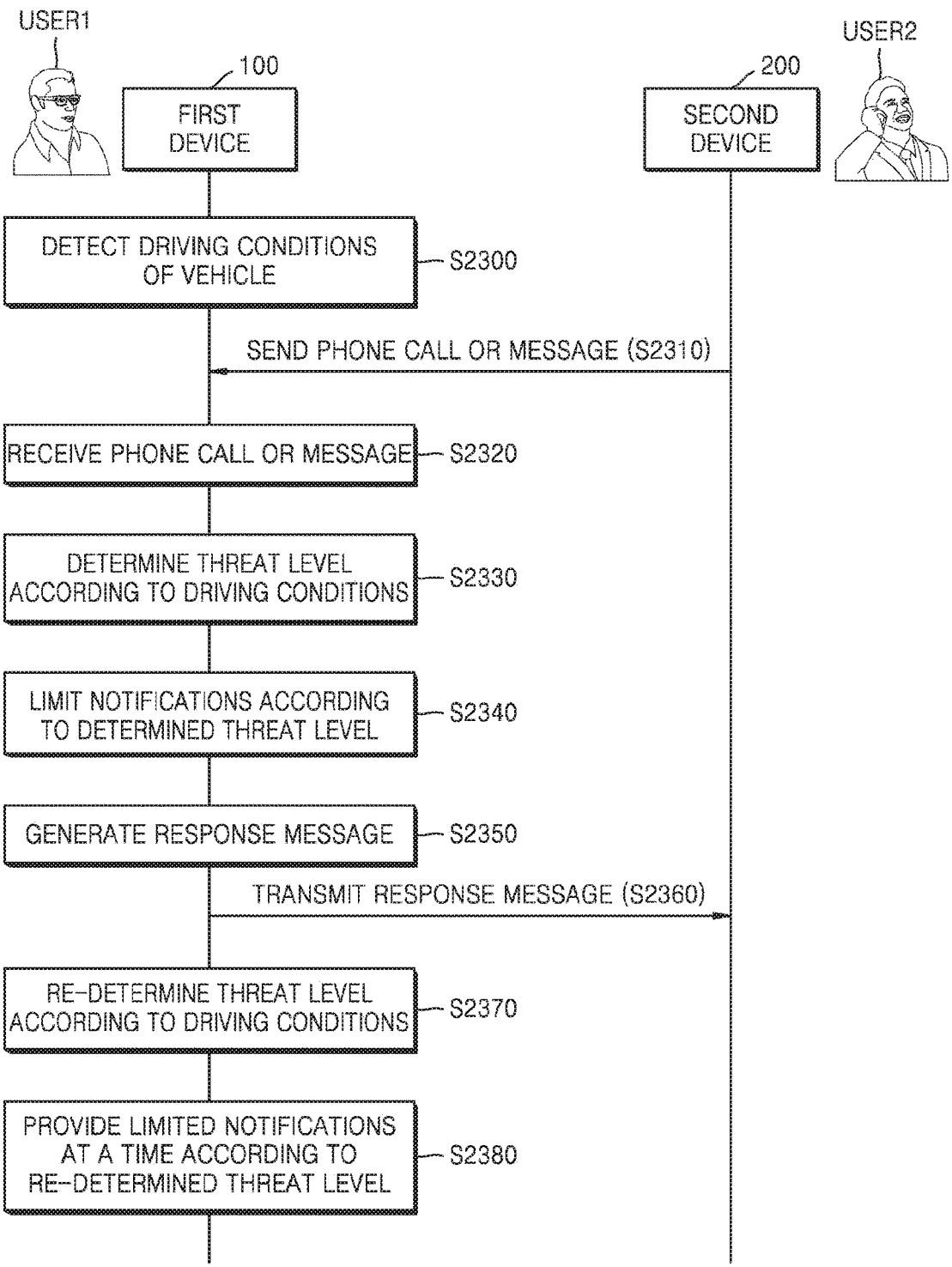
FIG. 23 is a flowchart illustrating operations of first and second devices performed by using a device control method according to an embodiment of the present disclosure.

FIG. 23 is a flowchart illustrating operations of first and second devices performed by using a device control method according to an embodiment of the present disclosure.

Referring to FIG. 23, the device control method according to the present embodiment of the present disclosure may be a modification of the device control method of FIG. 3 and include operations that are time-serially performed by the first and second devices 100 and 200 of FIG. 1. Although omitted below, descriptions of the first and second devices 100 and 200 with reference to FIG. 1 apply to the device control method according to the present embodiment.

In operation S2300, the first device 100 may detect driving conditions of a vehicle. In operation S2310, the second device 200 may transmit a phone call or a message to the first device 100. In operation S2320, the first device 100 may receive the phone call or the message from the second device 200. In operation S2330, the first device 100 may determine a threat level according to the driving conditions. In operation S2340, the first device 100 may limit notifications according to the determined threat level.

In operation S2350, the first device 100 may generate a response message. In more detail, the first device 100 may automatically generate the response message including a current situation of the first user or a future situation according to the detected driving conditions.

In this regard, the "current situation" presents a reason why the first user USER1 fails to respond at a time when receiving a phone call or message and is determined with reference to the detected driving conditions and application information, and may be, for example, a detailed activity of the first user USER1, a position, a path, and the like. For example, the first device 100 may generate the response message including the current situation "I'm driving".

The "future situation" presents a status change of the first user USER1 predicted with reference to the detected driving conditions and application information and may correspond to an expected response time with respect to the phone call or the message. For example, in a case where the first device 100 is executing a navigation application, the first device 100 may predict the future situation of the first user USER1 as "Arriving at your destination in a few minutes" with reference to information (for example, destination information configured by the first user USER1, current traffic conditions, and the like) of the navigation application.

In operation S2360, the first device 100 may transmit the response message to the second device 200. In an embodiment of the present disclosure, the first device 100 may transmit the response message to the second device 200 through one of a plurality of communication media. In this regard, the plurality of communication media may include at least one of an SMS, an SNS, such as Facebook or Twitter, a chatting service, such as KakaoTalk or Line, or e-mail.

In an embodiment of the present disclosure, the first device 100 may select one of the plurality of communication media based on contact information stored in the first device 100. In this case, in a case where a phone number of the second device 200 is not included in the contact information stored in the first device 100, the first device 100 may select the SMS. In an embodiment of the present disclosure, the first device 100 may select one of the plurality of communication media based on a use frequency with respect to the communication media between the first user USER1 and the second user USER2.

In operation S2370, the first device 100 may re-determine the threat level according to the driving conditions. In operation S2380, the first device 100 may provide limited notifications at a time according to the re-determined threat level.

Figure 24:
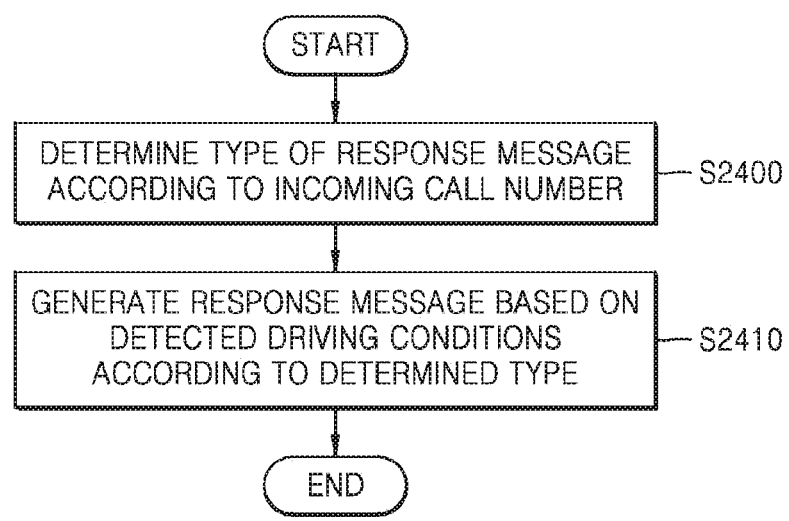
FIG. 24 is a flowchart of a response message generation method performed by a first device according to an embodiment of the present disclosure.

FIG. 24 is a flowchart of a response message generation method performed by a first device according to an embodiment of the present disclosure.

Referring to FIG. 24, an operation of generating a response message according to the present embodiment of the present disclosure may correspond to an example of operation S2350 of FIG. 23 and thus include operations that are time-serially performed by the first device 100 of FIG. 1.

In operation S2400, a type of the response message may be determined according to an incoming call number. In more detail, information that is to be transferred to the second user USER2 may be determined based on at least one of contact information, a recent call history, a recent message transmitting/receiving history, and settings information.

In an embodiment of the present disclosure, the first device 100 may determine the information that is to be transferred to the second user USER2 through the response message based on contact information stored in the first device 100, i.e., a phone book, the recent call history, or the recent message transmitting/receiving history. In this regard, the information that is to be transferred may be a current situation of the first user USER1 or a future situation.

In more detail, in a case where the second user USER2 is not included in the contact information stored in the first device 100, the second user USER2 may be highly unlikely to be close with the first user USER1. Although the second user USER2 is included in the contact information stored in the first device 100, in a case where a call frequency or a message transmitting/receiving frequency between the first user USER1 and the second user USER2 is below a threshold, the second user USER2 may be highly unlikely to be close with the first user USER1. In these cases, the current situation of the first user USER1 or the future situation may not be included in the response message.

Meanwhile, in a case where the second user USER2 is included in the contact information stored in the first device 100 and the call frequency or the message transmitting/receiving frequency between the first user USER1 and the second user USER2 exceeds the threshold, the second user USER2 may be highly likely to be close with the first user USER1. In a case where the second user USER2 is configured as a favorite or a very important person (VIP) in the contact information stored in the first device 100, the second user USER2 may be highly likely to be close with the first user USER1. In these cases, the current situation of the first user USER1 or the future situation may be included in the response message.

In an embodiment of the present disclosure, the information that is to be transferred to the second user USER2 through the response message may be determined based on settings information previously input by the first user USER1. For example, the first user USER1 may individually configure the second user USER2 whose current situation or future situation is to be transferred through the response message.

In operation S2410, the response message may be generated based on detected driving conditions according to the determined type. In more detail, the first device 100 may generate the response message including only information determined in operation S2400. Accordingly, the response message may be classified as various types.

FIG. 25 is a table showing types of a response message generated by a first device according to an embodiment of the present disclosure.

Referring to FIG. 25, a first type response message TYPE1 may include a current situation of the first user USER1. For example, the first device 100 may select the first type response message TYPE1 in a case where it is difficult to predict a call available time. For example, the first type response message TYPE1 may be generated as "I'm driving".

A second type response message TYPE2 may include the current situation of the first user USER1 and a future situation. For example, in a case where the second user USER2 is a family member of the first user USER1, the second type response message TYPE2 of the first user USER1 may be selected. In more detail, the first device 100 may generate the second type response message TYPE2 including the current situation, such as a position of the first user USER1, a path, or a status and the future situation, such as a reply available time of the first user USER1 or a response available time. For example, the second type response message TYPE2 may be generated as "I'm driving and I'll call back in an hour".

A third type response message TYPE3 may include the future situation of the first user USER1. For example, in a case where the second user USER2 is a coworker, since a current situation relating to a privacy of the first user USER1 may not be wanted, in this case, the third type response message TYPE3 may be selected. In more detail, the first device 100 may generate the third type response message TYPE3 including the future situation, such as the reply available time of the first user USER1 or the response available time, and the like. For example, the third type response message TYPE3 may be generated as "I'll call back in an hour".

A fourth type response message TYPE4 may not include a current situation of a user or a future situation. For example, in a case where the second user USER2 is not included in the contact information stored in the first device 100 or a contact frequency between the first user USER1 and the second user USER2 is low, the fourth type response message TYPE4 may be selected. For example, the fourth type response message TYPE4 may be generated as "I'm not available now".

Figure 26:
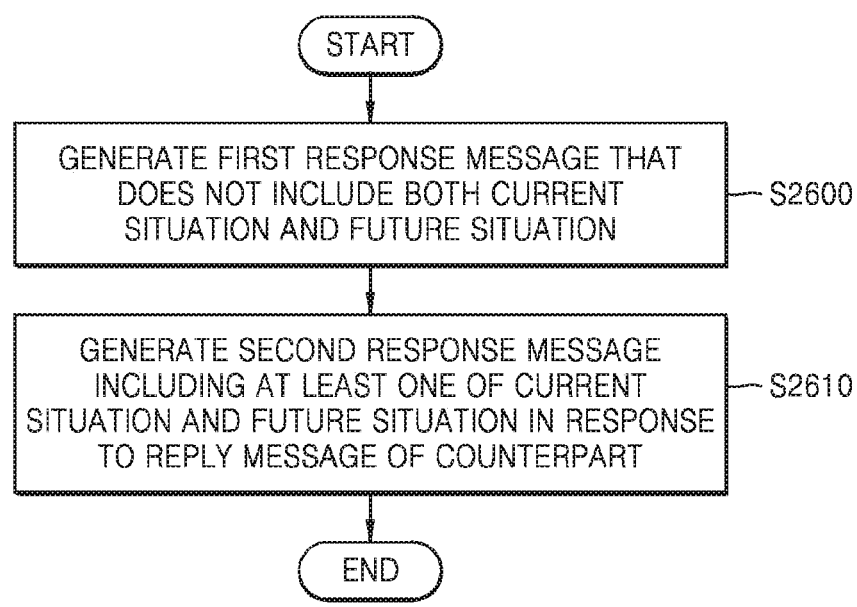
FIG. 26 is a flowchart of a response message generation method performed by a first device according to an embodi

FIG. 26 is a flowchart of a response message generation method performed by a first device according to an embodiment of the present disclosure.

Referring to FIG. 26, the operation of generating a response message according to the present embodiment of the present disclosure may correspond to an example of operation S2350 of FIG. 23 and thus include operations that are time-serially performed by the first device 100 of FIG. 1.

In operation S2600, a first response message that does not include both a current situation and a future situation may be generated. In more detail, the first response message initially transmitted to the second user USER2 may be generated to include only content that I cannot answer the phone. In this regard, the first response message may correspond to the fourth type response message TYPE4 described with reference to FIG. 25 above. For example, the first response message may be generated as "I'm not available now". In this case, the first user USER1 may not need to perform a separate selection operation for generating the first response message, and the first device 100 may not receive and process information from applications for generating the first response message.

In operation S2610, a second response message including at least one of the current situation and the future situation may be generated in response to a reply message of a counterpart. For example, the first device 100 may receive the reply message "Where are you now?" and the first device 100 may generate the second response message (for example, "I'm around the City Hall now") including the current situation regarding a current position.

Operation S2610 may be repeatedly performed according to the reply message of the counterpart. For example, the first device 100 may further receive a reply message "When are you available?" from the second user USER2 and the first device 100 may generate the second response message (for example, "I'll call back in an hour") including the future situation regarding a call available time.

Figure 27:
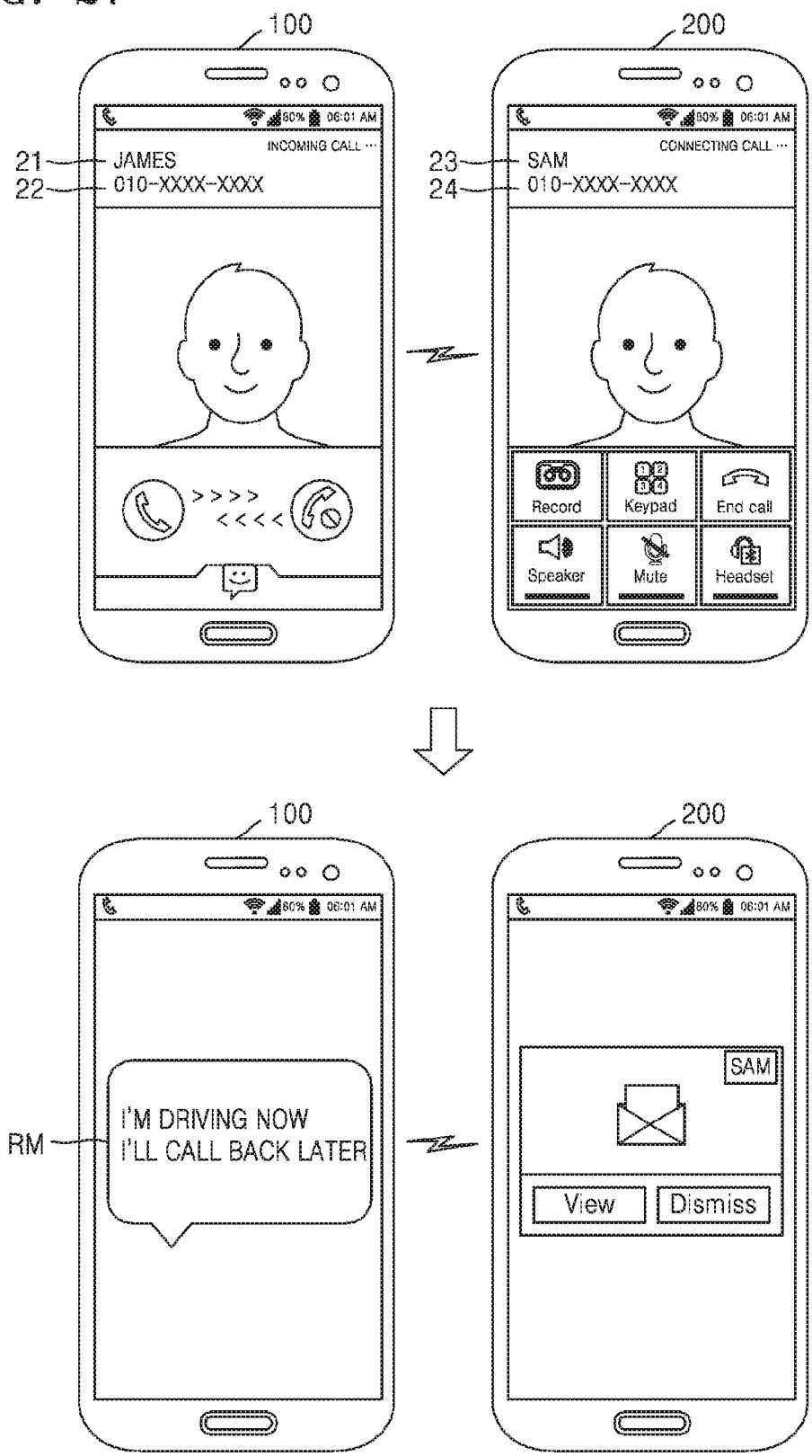
- FIG. 27 illustrates an operation of providing a response message performed by a first device according to an embodiment of the present disclosure.

FIG. 27 illustrates an operation of providing a response message performed by a first device according to an embodiment of the present disclosure.

Referring to FIG. 27, the first device 100 may receive a phone call from the second device 200. A phone number 21 of the second device 200 may be displayed on a screen of the first device 100 and may be referred to as a caller number or a sender number. In a case where the phone number 21 of the second device 200 is included in contact information, that is, a phone book stored in the first device 100, a name 22 of the second user USER2 stored in the contact information may be displayed on the screen of the first device 100.

A phone number 23 of the first device 100 may be displayed on a screen of the second device 200 and may be referred to as a receiver number. In a case where the phone number 23 of the first device 100 is included in contact information, that is, a phone book stored in the second device 200, a name 24 of the first user USER1 stored in the contact information may be displayed on the screen of the second device 200.

In the present embodiment of the present disclosure, in a case where the first user USER1 of the first device 100 is a driver of the first vehicle C1, and the first device 100 is determined as the high threat level HL or the middle threat level ML according to driving conditions, the first device 100 may limit a notification with respect to a phone call from the second device 200. In an embodiment of the present disclosure, if the phone call is received from the second device 200, the first device 100 may automatically generate a response message RM with reference to detected driving conditions and automatically transmit the generated response message RM to the second device 200. Thereafter, the first device 100 may provide a notification indicating a complete transmission of the response message RM, for example, in the form of a message, on the screen of the first device 100 such that the first user USER1 may be informed that the response message RM has been transmitted. In this regard, the response message RM may be a message including a current situation of the first user USER1, a future situation, or the current situation and the future situation or a mere missed message.

Figure 28:
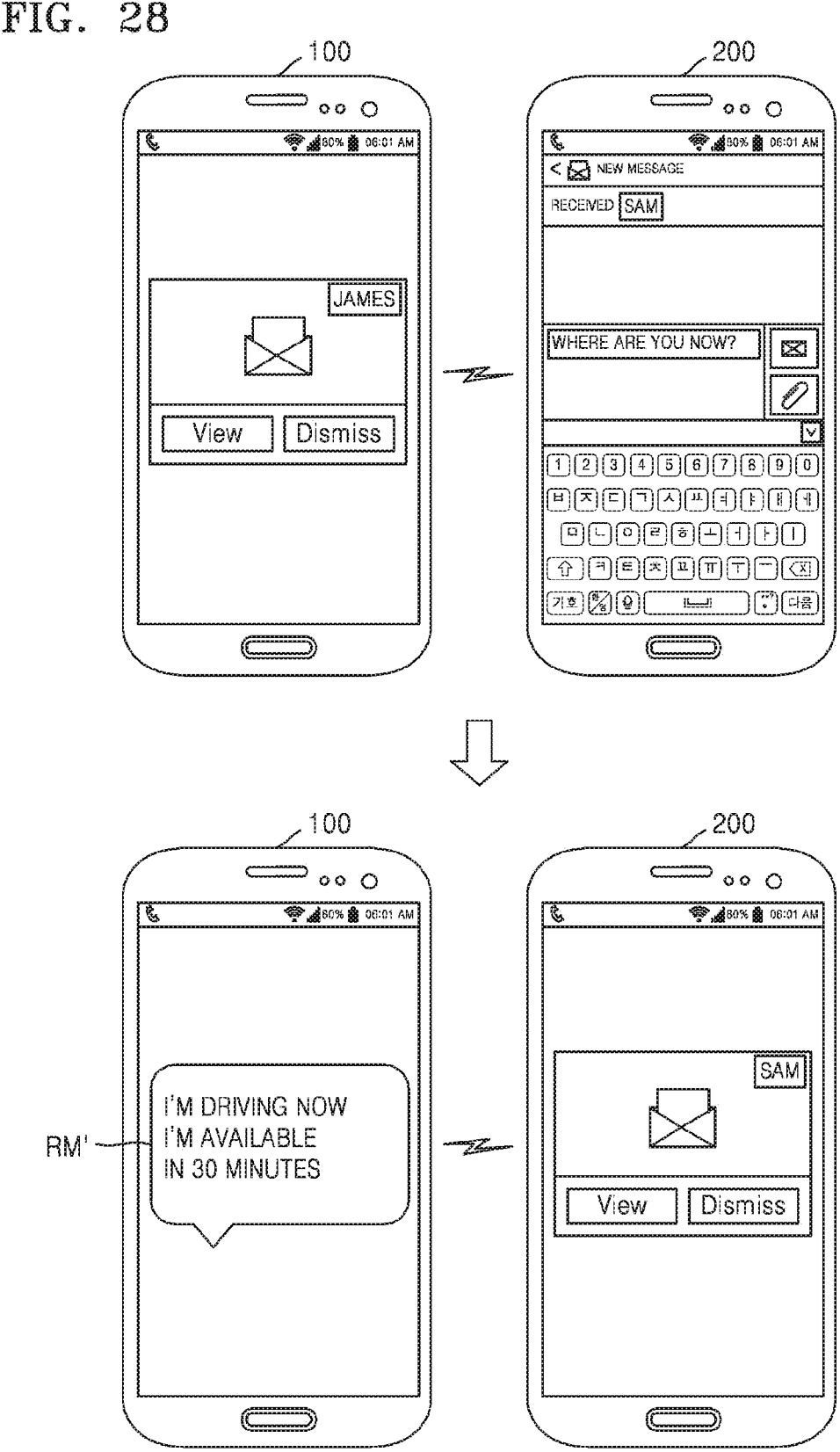
FIG. 28 illustrates an operation of providing a response message performed by a first device according to an embodiment of the present disclosure.

FIG. 28 illustrates an operation of providing a response message performed by a first device according to an embodiment of the present disclosure.

Referring to FIG. 28, the first device 100 may receive a phone call from the second device 200. In the present embodiment of the present disclosure, in a case where the first user USER1 of the first device 100 is a driver of the first vehicle C1, and the first device 100 is determined as the high threat level HL or the middle threat level ML according to driving conditions, the first device 100 may limit a notification with respect to a phone call from the second device 200. In an embodiment of the present disclosure, if a message is received from the second device 200, the first device 100 may automatically generate a response message RM' with reference to detected driving conditions and automatically transmit the generated response message RM' to the second device 200. Thereafter, the first device 100 may provide a notification indicating a complete transmission of the response message RM', for example, in the form of a message, on the screen of the first device 100 such that the first user USER1 may be informed that the response message RM' has been transmitted. In this regard, the response message RM' may be a message including a current situation of the first user USER1, a future situation, or the current situation and the future situation or a mere missed message.

Figure 29:
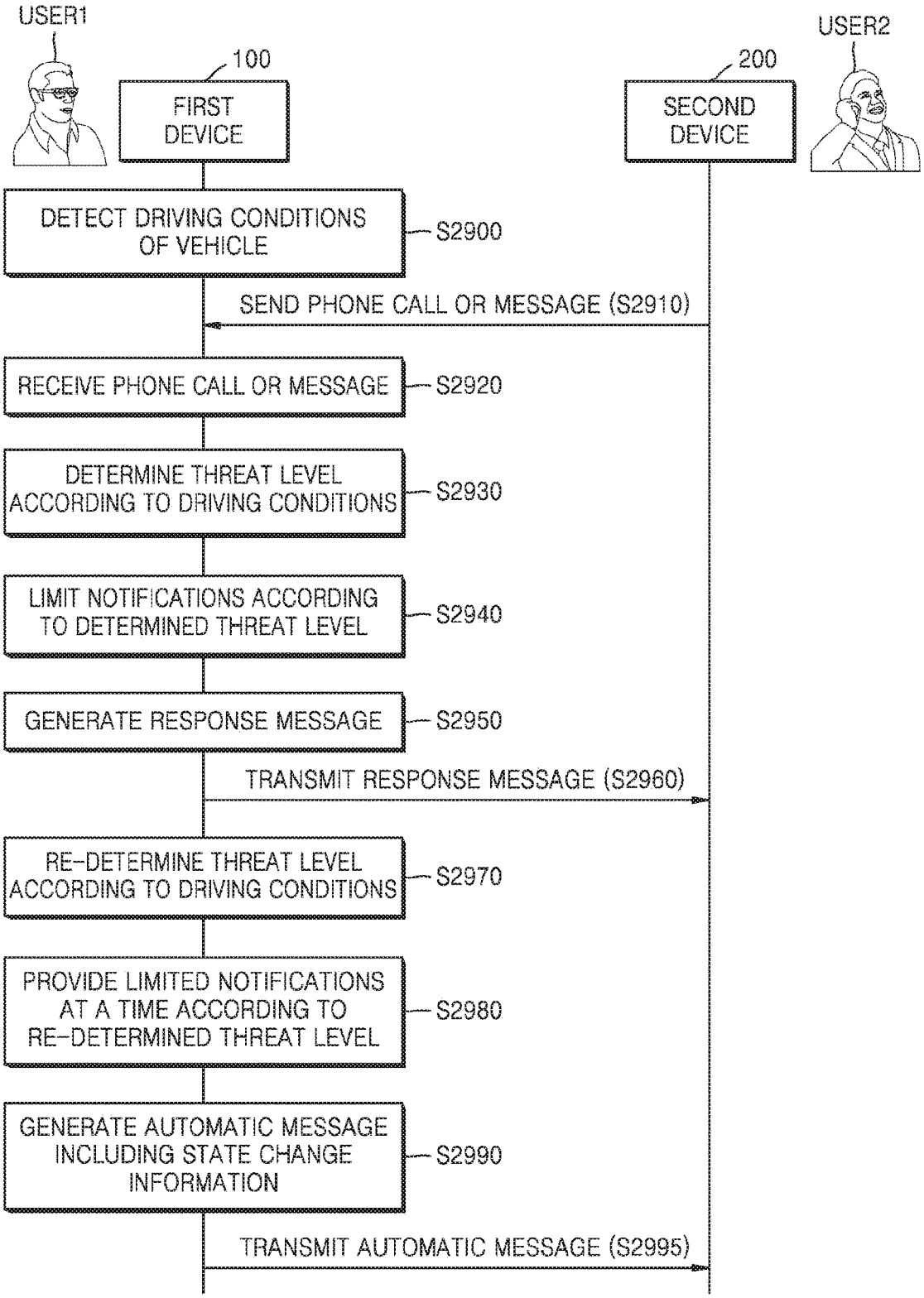
FIG. 29 is a flowchart illustrating operations of first and second devices performed by using a device control method according to an embodiment of the present disclosure.

FIG. 29 is a flowchart illustrating operations of first and second devices performed by using a device control method according to an embodiment of the present disclosure.

Referring to FIG. 29, the device control method according to the present embodiment may be a modification of the device control method of FIG. 3 and include operations that are time-serially performed by the first and second devices 100 and 200 of FIG. 1. Although omitted below, descriptions of the first and second devices 100 and 200 with reference to FIG. 1 apply to the device control method according to the present embodiment.

In operation S2900, the first device 100 may detect driving conditions of a vehicle. In operation S2910, the second device 200 may transmit a phone call or a message to the first device 100. In operation S2920, the first device 100 may receive the phone call or the message from the second device 200. In operation S2930, the first device 100 may determine a threat level according to the driving conditions. In operation S2940, the first device 100 may limit notifications according to the determined threat level.

In operation S2950, the first device 100 may generate a response message. In operation S2960, the first device 100 may transmit the response message to the second device 200. However, in an embodiment of the present disclosure, operations S2950 and S2960 may not be included. In operation S2970, the first device 100 may re-determine the threat level according to the driving conditions. In operation S2980, the first device 100 may provide limited notifications at a time according to the re-determined threat level.

In operation S2990, the first device 100 may generate an automatic message including state change information. In more detail, if the high threat level HL or the middle threat level ML is changed to the low threat level LL, the first device 100 may generate the automatic message including the state change information. This will be described in more detail with reference to FIG. 30.

In operation S2995, the first device 100 may transmit the automatic message to the second device 200. In an embodiment of the present disclosure, the first device 100 may transmit the automatic message to the second device 200 through one of a plurality of communication media. In this regard, the plurality of communication media may include at least one of a SMS, an SNS, such as Facebook or Twitter, a chatting service, such as KakaoTalk or Line, or e-mail.

Figure 30:
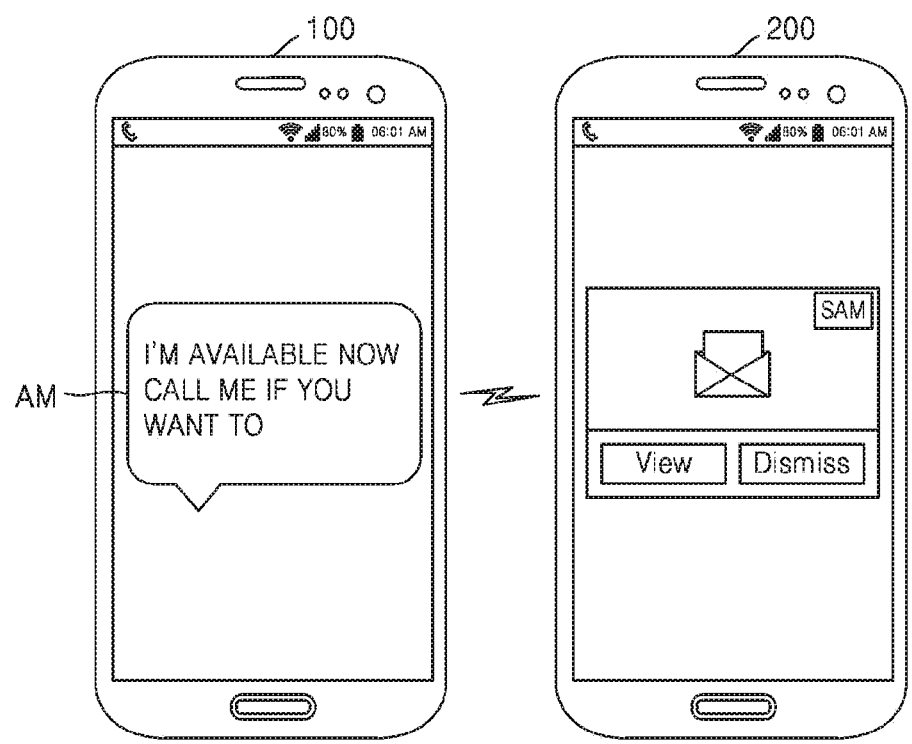
FIG. 30 illustrates an operation of providing an automatic message performed by a first device according to an embodiment of the present disclosure.

FIG. 30 illustrates an operation of providing an automatic message performed by a first device according to an embodiment of the present disclosure.

Referring to FIG. 30, if a threat level is changed to the low threat level LL, the first device 100 may provide an automatic message AM including state change information to the second user USER2. For example, the first device 100 may provide the automatic message AM "I'm available now. Call me if you want to" to the second user USER2.

In an embodiment of the present disclosure, if the operation of the first vehicle C1 ends, the first device 100 may provide the automatic message AM to the second user USER2.

Figure 31:
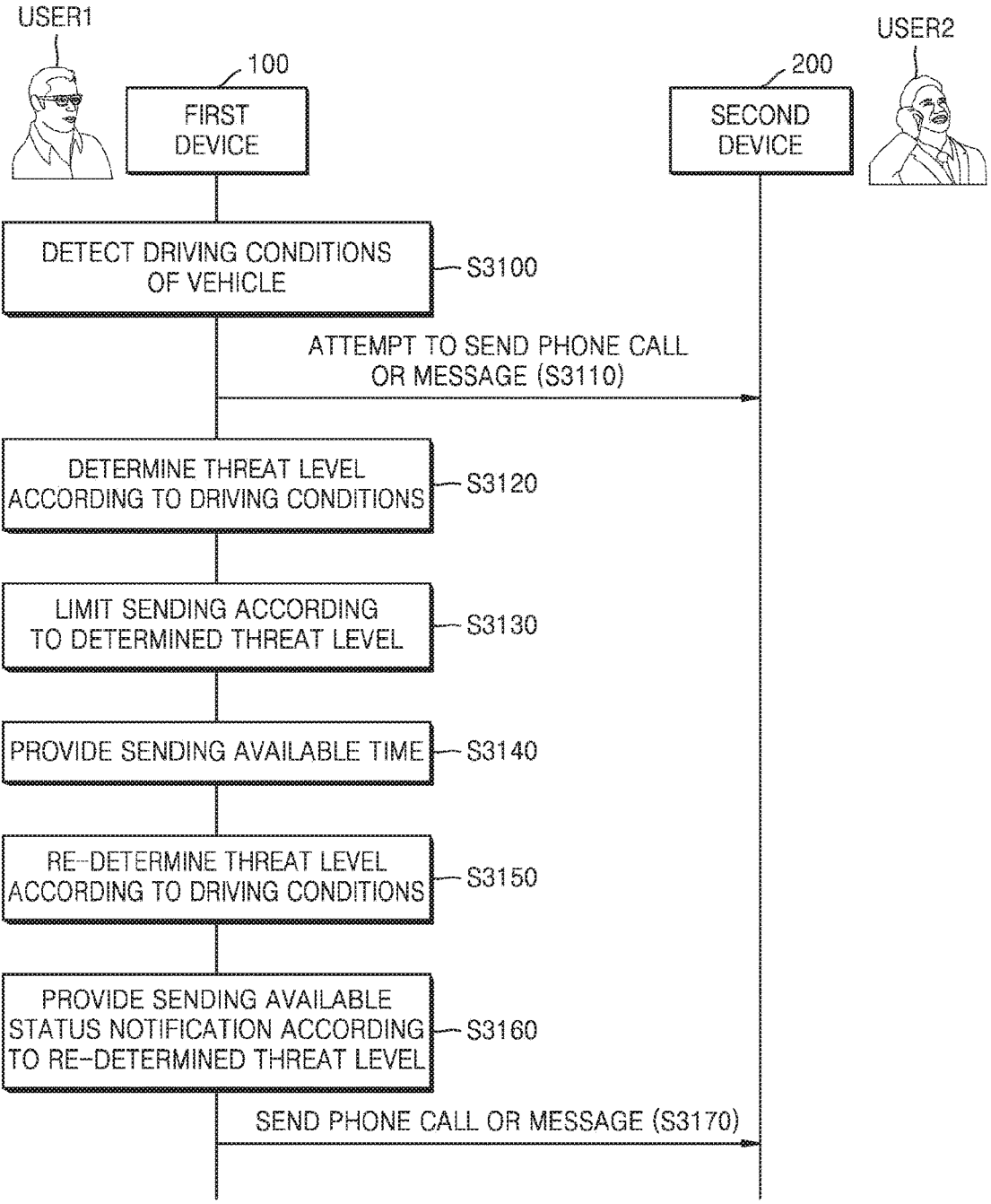
FIG. 31 is a flowchart illustrating operations of first and second devices performed by using a device control method according to an embodiment of the present disclosure.

FIG. 31 is a flowchart illustrating operations of first and second devices performed by using a device control method according to an embodiment of the present disclosure.

Referring to FIG. 31, the device control method according to the present embodiment may be a modification of the device control method of FIG. 3 and include operations that are time-serially performed by the first and second devices 100 and 200 of FIG. 1. Although omitted below, descriptions of the first and second devices 100 and 200 with reference to FIG. 1 apply to the device control method according to the present embodiment.

In operation S3100, the first device 100 may detect driving conditions of a vehicle. In an embodiment of the present disclosure, operation S3100 may be performed after operation S3110.

In operation S3110, the first device 100 may attempt to transmit a phone call or a message to the second device 200. For example, the first user USER1 may touch a phone button or a message button displayed on a display of the first device 100. For another example, the first user USER1 may input a voice command "Call JAMES" or "Text JAMES" through a voice recognition function of the first device 100.

In operation S3120, the first device 100 may determine a threat level according to the driving conditions. In the present embodiment of the present disclosure, the first device 100 may classify a threat level as at last the high threat level HL, the middle threat level ML, and the low threat level LL according to the driving conditions.

In operation S3130, the first device 100 may limit transmission according to the determined threat level. In more detail, in a case where the determined threat level is the high threat level HL, the first device 100 may limit all transmission irrespective of the second user USER2. In a case where the determined threat level is the middle threat level ML, the first device 100 may selectively limit transmission according to the second user USER2. In a case where the determined threat level is the low threat level LL, the first device 100 may permit all transmission irrespective of the second user USER2.

In operation S3140, the first device 100 may provide a transmission available time. In more detail, the first device 100 may predict the transmission available time based on the detected driving conditions and provide the predicted transmission available time to the first user USER1. This will be described in more detail with reference to FIG. 32.

In operation S3150, the first device 100 may re-determine the threat level according to the driving conditions. In operation S3160, the first device 100 may provide a transmission available status notification according to the re-determined threat level. In operation S3170, the first device 100 may transmit the phone call or the message to the second device 200. This will be described in more detail with reference to FIGS. 33A through 33C and 34A through 34D.

Figure 32:
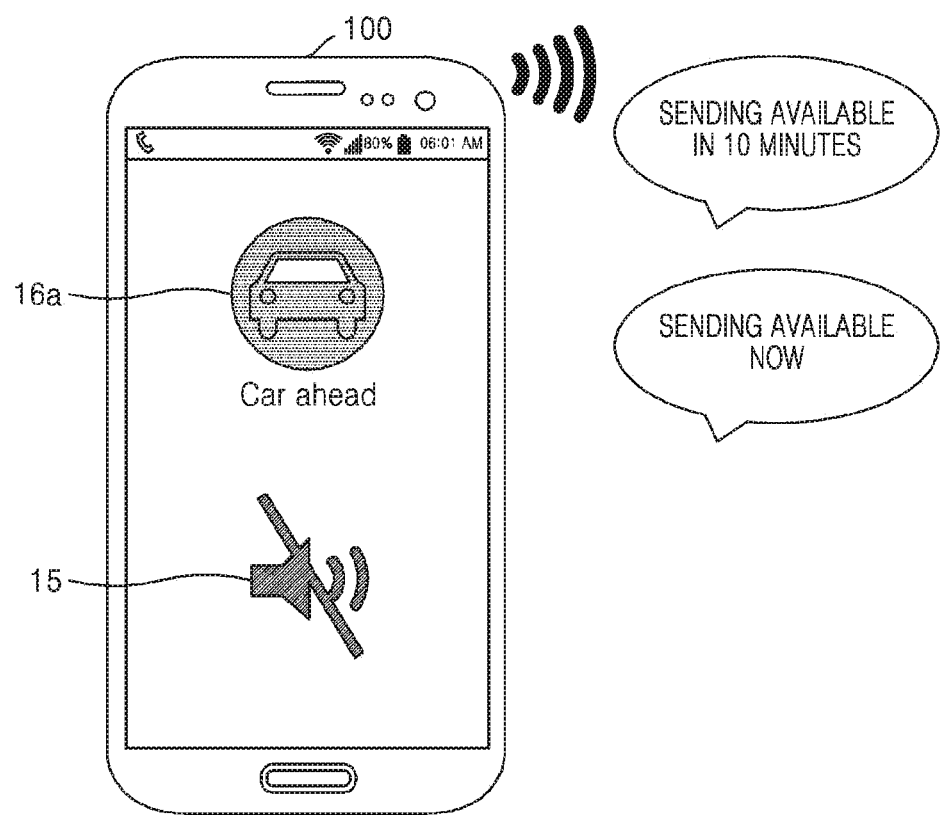
FIG. 32 illustrates an operation of providing a transmission available time performed by a first device according to an embodiment of the present disclosure.

FIG. 32 illustrates an operation of providing a transmission available time performed by a first device according to an embodiment of the present disclosure.

Referring to FIG. 32, the operation of providing the transmission available time according to the present embodiment of the present disclosure may correspond to, for example, operations S3140 and S3160. In an embodiment of the present disclosure, the first device 100 may predict the transmission available time based on an image acquired through a camera and traffic information, and the like, acquired through an application. For example, the first device 100 may output voice "transmission available in 10 minutes" through a speaker. If driving conditions are changed and then a threat level is changed to the low threat level LL, the first device 100 may output voice "transmission available now" through the speaker.

Figure 33A:
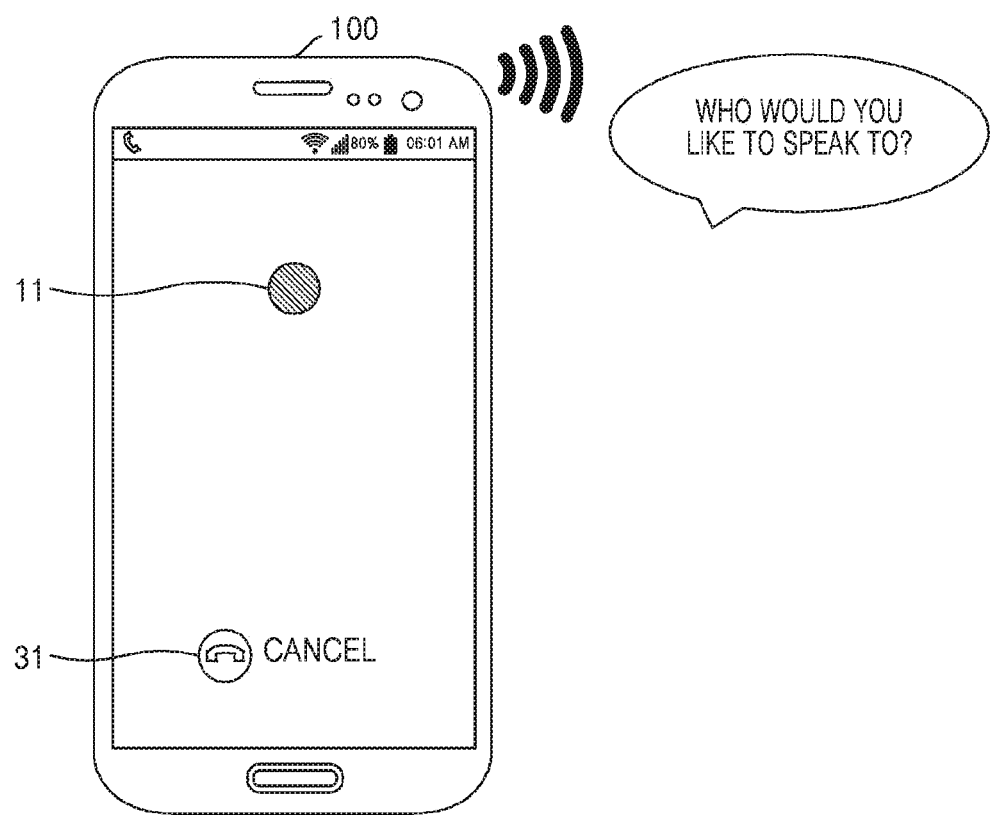
FIGS. 33A to 33C sequentially illustrate an operation of transmitting a phone call performed by a first device according to an embodiment of the present disclosure.
Figure 33B:
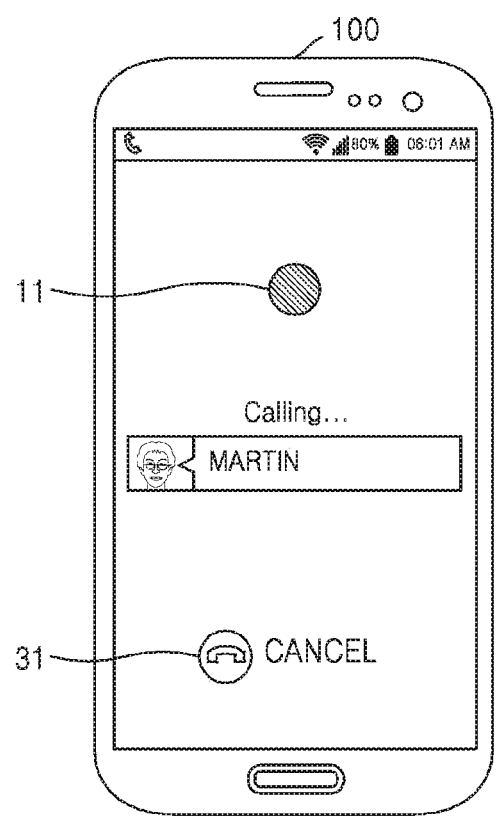
Figure 33C:
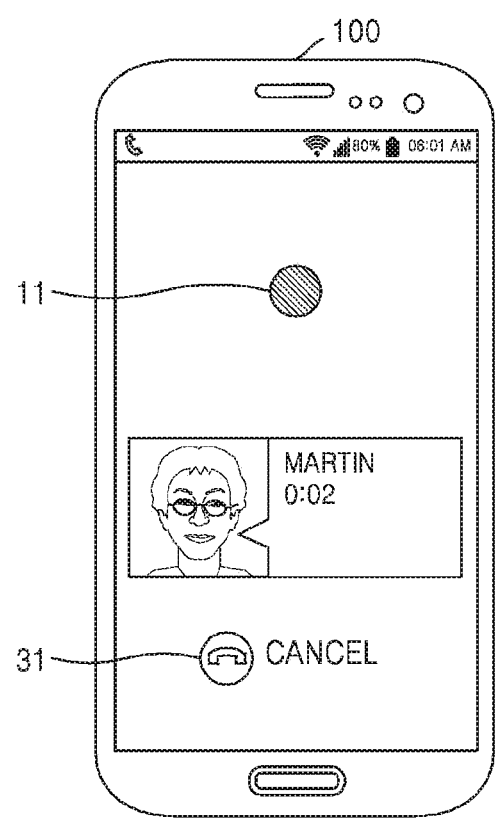

FIGS. 33A to 33C sequentially illustrate an operation of transmitting a phone call performed by a first device according to an embodiment of the present disclosure.

Referring to FIG. 33A, the operation of transmitting the phone call according to the present embodiment of the present disclosure may correspond to an example of operation S3170 of FIG. 31. In a case where the first user USER1 makes the phone call to the second device 200, the first device 100 may permit transmission in a case where a determined threat level is a low threat level 11. The first device 100 may output voice "Who would you like to speak to?" through a speaker. The first user USER1 may press a cancel button 31 in a case where the first user USER1 wants to cancel the sending.

Referring to FIG. 33B, if the first user USER1 speaks a name (for example, MARTIN) of the second user USER2, the first device 100 may transmit the phone call to the second user USER2. The first user 100 may recognize voice of the first user USER1 through a voice recognition module, search for a phone book according to voice data of the first user USER1, and transmit the phone call to the second device 200 of the second user USER2.

Referring to FIG. 33C, in a case where the second user USER2 accepts the phone call, the first user USER1 may make the phone call with the second user USER2. In an embodiment of the present disclosure, the first user USER1 may press the cancel button 31 in a case where the first user USER1 wants to cancel the phone call. In an embodiment of the present disclosure, in a case where the first user USER1 wants to cancel the phone call, the first user USER1 may input a user command "Hang up" to the first device 100 through voice.

FIGS. 34A through 34D sequentially illustrate an operation of transmitting a message performed by a first device according to an embodiment of the present disclosure.

Figure 34A:
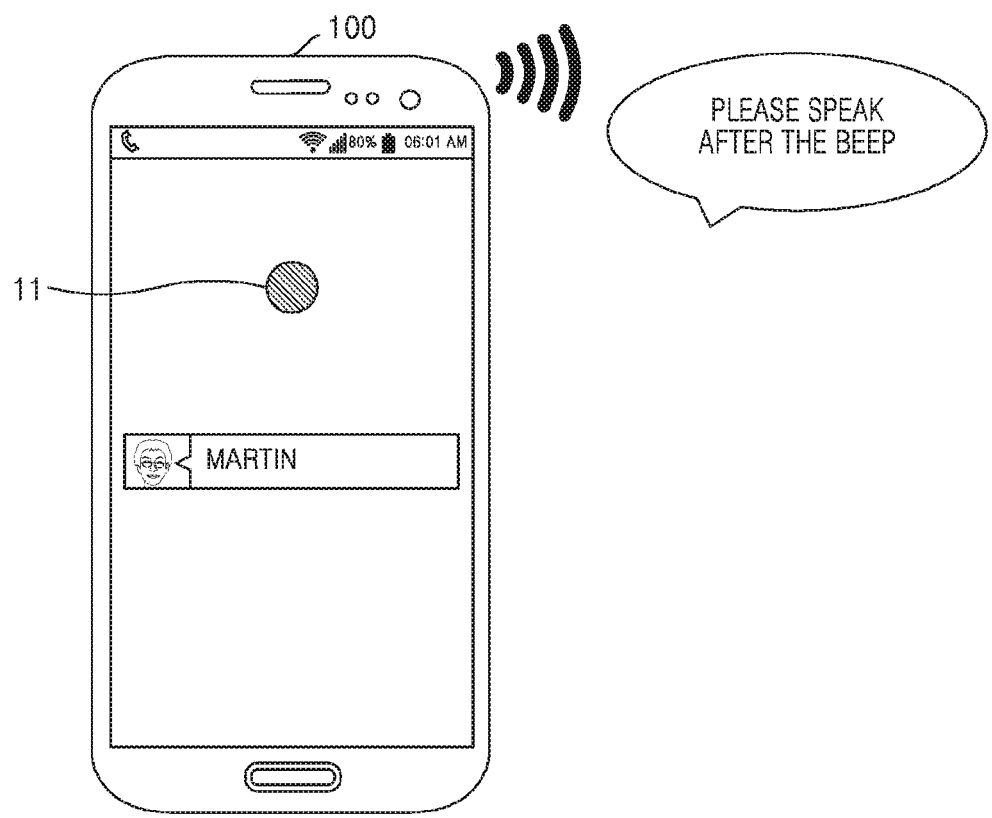
FIGS. 34A to 34D sequentially illustrate an operation of transmitting a message performed by a first device according to an embodiment of the present disclosure.

Referring to FIG. 34A, the operation of transmitting the message according to the present embodiment of the present disclosure may correspond to an example of operation S3170 of FIG. 31. In a case where the first user USER1 transmits the message to the second device 200, the first device 100 may permit transmission of the message in a case where a determined threat level is the low threat level 11. The first device 100 may input a name (for example, MARTIN) of the second user USER2 to the first device 100 in voice. If the second user USER2 is selected by the first user USER1, the first device 100 may output voice "Please speak after the beep" through a speaker.

Figure 34B:
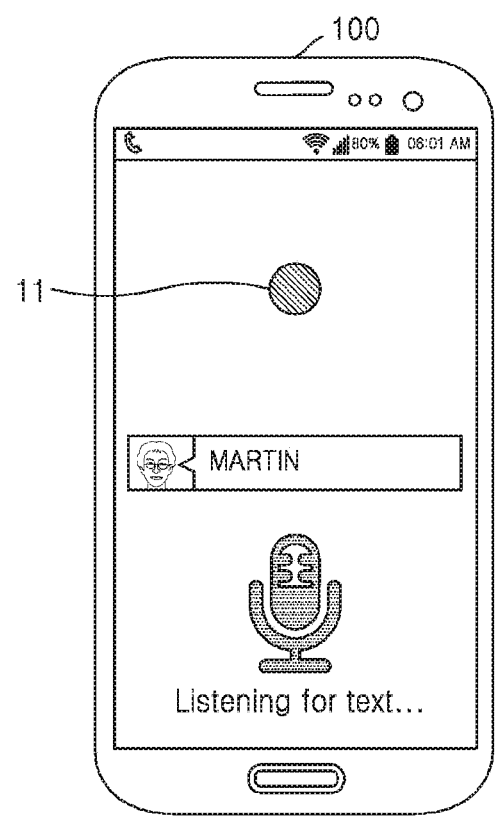

Referring to FIG. 34B, the first user USER1 may input content of the message that is to be sent to the second use USER2 to the first device 100 in voice through a microphone of the first device 100. The first device 100 may convert voice data input from the first user USER1 into text data.

Figure 34C:
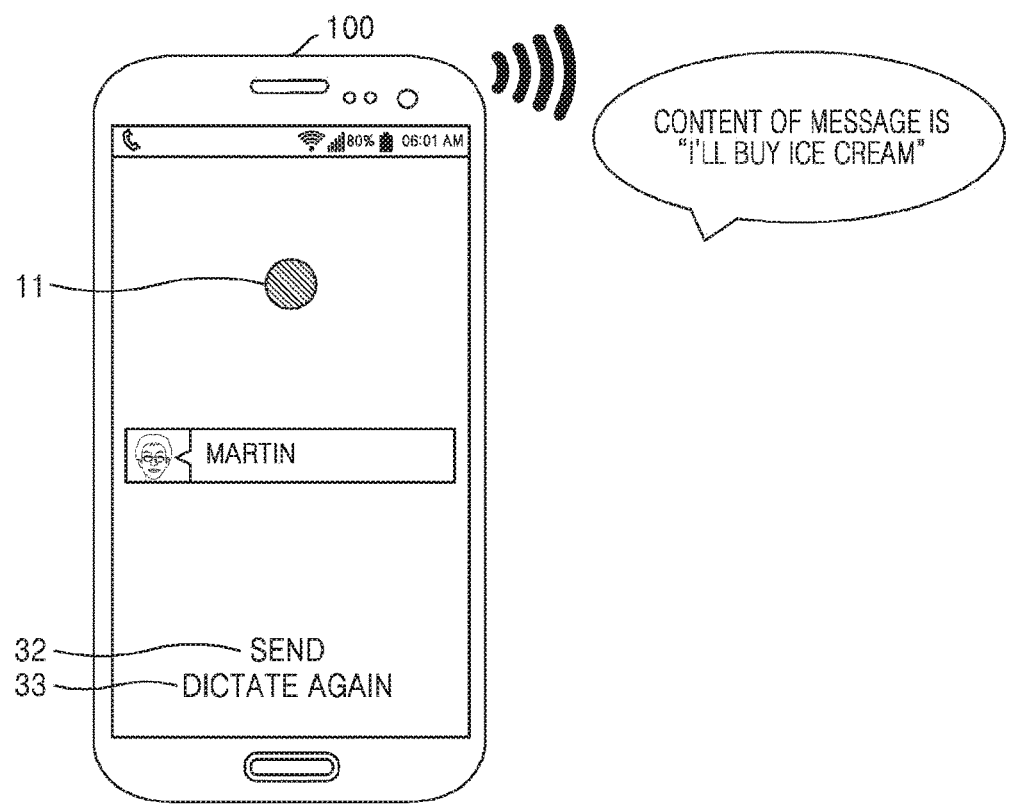

Referring to FIG. 34C, the first device 100 may output the input voice data through the speaker of the first device 100 in order to confirm the content of the message to the first user USER1. For example, the first device 100 may output voice "The content of the message is 'I'll buy ice cream'" through the speaker.

In an embodiment of the present disclosure, the first user USER1 may press a transmission button 32 or a reread button 33. In an embodiment of the present disclosure, the first user USER1 may input a user command "Transmit" or "Reread" to the first device 100 through voice.

Figure 34D:
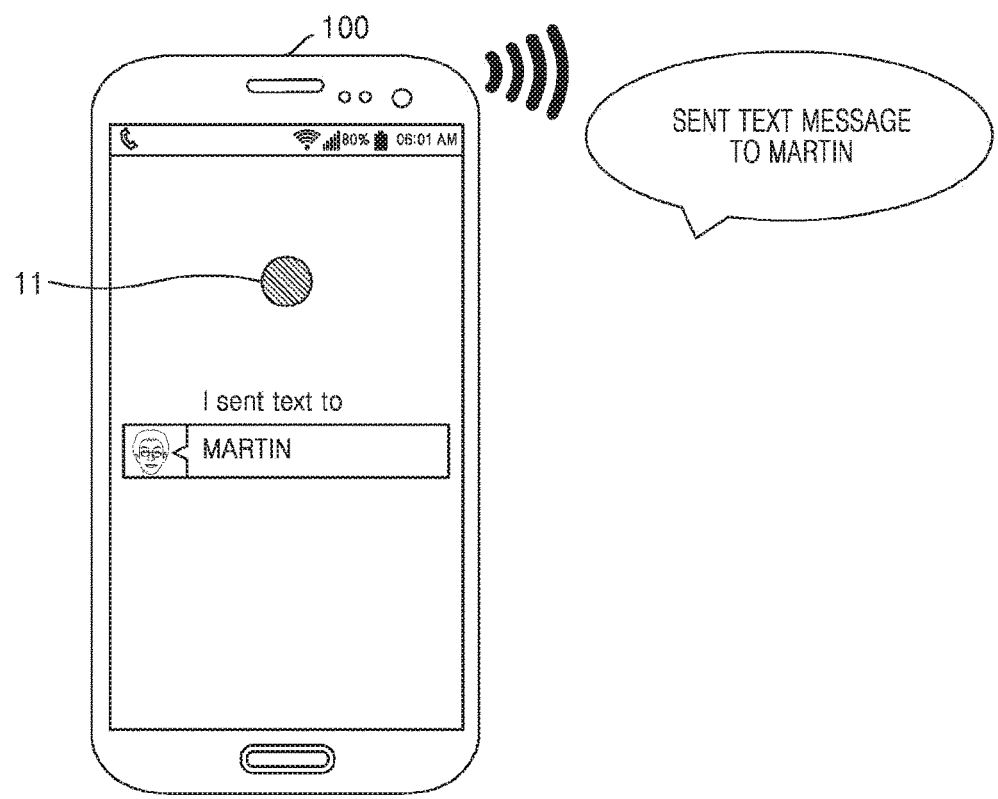

Referring to FIG. 34D, if the first user USER1 confirms the content of the message, i.e., if the first user USER1 presses the transmission button 32 or input the voice command to the first device 100, the first device 100 may transmit the message to the second device 200 and provide a notification indicating a complete transmission of the message. For example, the first device 100 may output voice "Sent text message to MARTIN" though the speaker.

FIG. 35 is a flowchart illustrating operations of first and second devices performed by using a device control method according to an embodiment of the present disclosure.

Referring to FIG. 35, the device control method according to the present embodiment may be a modification of the device control method of FIG. 31 and include operations that are time-serially performed by the first and second devices 100 and 200 of FIG. 1. Although omitted below, descriptions of the first and second devices 100 and 200 with reference to FIG. 1 apply to the device control method according to the present embodiment.

In operation S3500, the first device 100 may detect driving conditions of a vehicle. In operation S3510, the first device 100 may attempt to transmit a phone call or a message to the second device 200. In operation S3520, the first device 100 may determine a threat level according to the driving conditions. In the present embodiment of the present disclosure, the first device 100 may classify a threat level as at last the high threat level HL, the middle threat level ML, and the low threat level LL according to the driving conditions. In operation S3530, the first device 100 may limit transmission according to the determined threat level.

In operation S3540, the first device 100 may provide the state change guide regarding a condition for changing the driving conditions. In more detail, the first device 100 may determine the condition for changing the driving conditions such that the threat level is changed to the low threat level LL in a case where the threat level determined in operation S3520 is the high threat level HL or the middle threat level ML and provide the state change guide regarding the determined condition. In an embodiment of the present disclosure, the first device 100 may output the state change guide in sound through a speaker of the first device 100. In an embodiment of the present disclosure, the first device 100 may output the state change guide in sound through a speaker of the first vehicle C1. This will be described in more detail with reference to FIG. 36.

In operation S3550, the first device 100 may re-determine the threat level according to the driving conditions. In operation S3560, the first device 100 may provide a transmission available status notification according to the re-determined threat level. In operation S3570, the first device 100 may transmit the phone call or the message to the second device 200.

Figure 36:
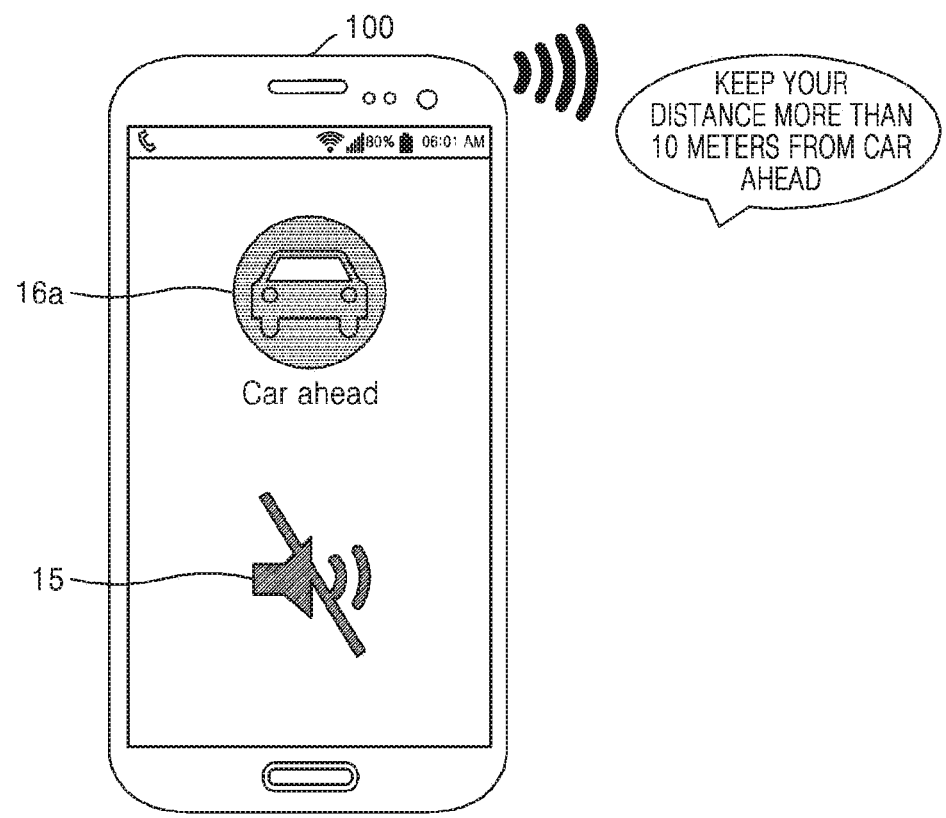
FIG. 36 illustrates an operation of providing a state change guide performed by a first device according to an embodiment of the present disclosure.

FIG. 36 illustrates an operation of providing a state change guide performed by a first device according to an embodiment of the present disclosure.

Referring to FIG. 36, the first device 100 may limit transmission of a phone call or a message at the high threat level HL and determine a condition for changing driving conditions. In this regard, the driving conditions may include at least one of outer conditions of a vehicle, inner conditions of the vehicle, conditions of the vehicle itself, and conditions of a driver. The various embodiments of the operation of providing the state change guide described with reference to FIG. 20 above may apply to the present embodiment of the present disclosure.

In an embodiment of the present disclosure, the first device 100 may provide the state change guide for a condition for changing the outer conditions of the vehicle. In more detail, the first device 100 may determine a stop available spot, and the like, through an image captured by a camera, and determine a position of a service area or a traffic smooth zone, and the like, through an application. Thereafter, the first device 100 may generate the state change guide based on a result of determination and output the generated state change guide as sound. For example, the first device 100 may output a state change guide "Keep your distance more than 10 meters from the car ahead" in voice.

Figure 37:
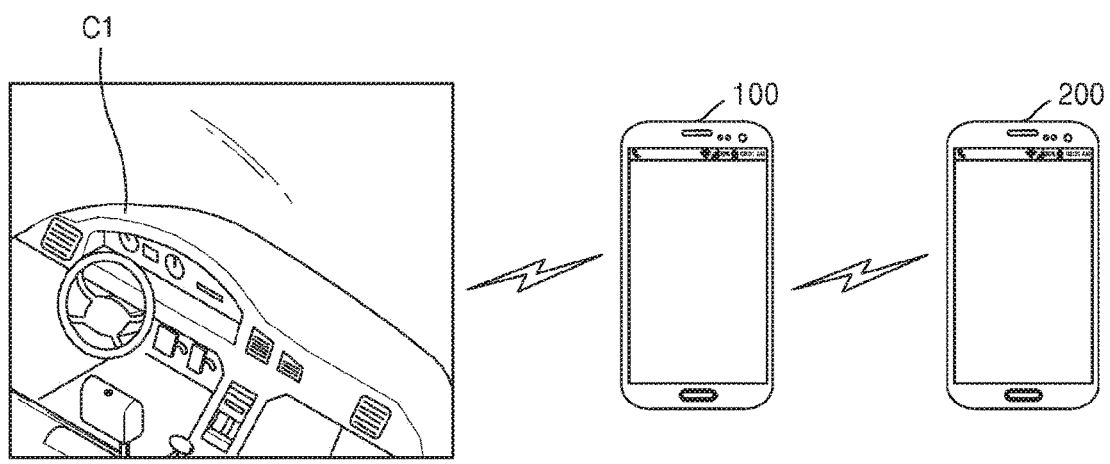
FIG. 37 illustrates a system providing a smart driving mode according to an embodiment of the present disclosure.

FIG. 37 illustrates a system providing a smart driving mode according to an embodiment of the present disclosure.

Referring to FIG. 37, the system providing the smart driving mode may include the first device 100, the second device 200, and the first vehicle C1. The first device 100 may be positioned in the first vehicle C1. In an embodiment of the present disclosure, the first device 100 may be mounted in a cradle of the first vehicle C1. However, the various embodiments of the present disclosure are not limited thereto. The first device 100 may be positioned in an arbitrary space of the first vehicle C1. The system according to the present embodiment of the present disclosure is a modification of the system of FIG. 1 and the descriptions provided with reference to FIGS. 1 through 36 above may apply to the present embodiment.

In the present embodiment of the present disclosure, the first and second devices 100 and 200 may be electronic devices supporting a voice call function. In this regard, the first and second devices 100 and 200 may be substantially the same as the first and second devices 100 and 200 of FIG. 1. Thus, the descriptions of the first and second devices 100 and 200 above may apply to the present embodiment and redundant descriptions are omitted.

In the present embodiment of the present disclosure, a user of the first device 100 may be a driver driving the first vehicle C1. In an embodiment of the present disclosure, the first device 100 may receive a call or a message from the second device 200. In an embodiment of the present disclosure, the first device 100 may transmit a call or a message to the second device 200.

In the present embodiment of the present disclosure, the first device 100 may be connected to the first vehicle C1 by wired or wirelessly, for example, via Bluetooth. In an embodiment of the present disclosure, the first device 100 may acquire information necessary for detecting driving conditions of the first vehicle C1 from a camera of the first vehicle C1, a microphone, a navigation, and the like. In an embodiment of the present disclosure, the first device 100 may output a notification of the call or the message received from the second device 200 through the speaker, the navigation, and the like. As described above, according to the present embodiment of the present disclosure, the first device 100 may be connected to the first vehicle C1 and further improve performance of the smart driving mode.

Figure 38:
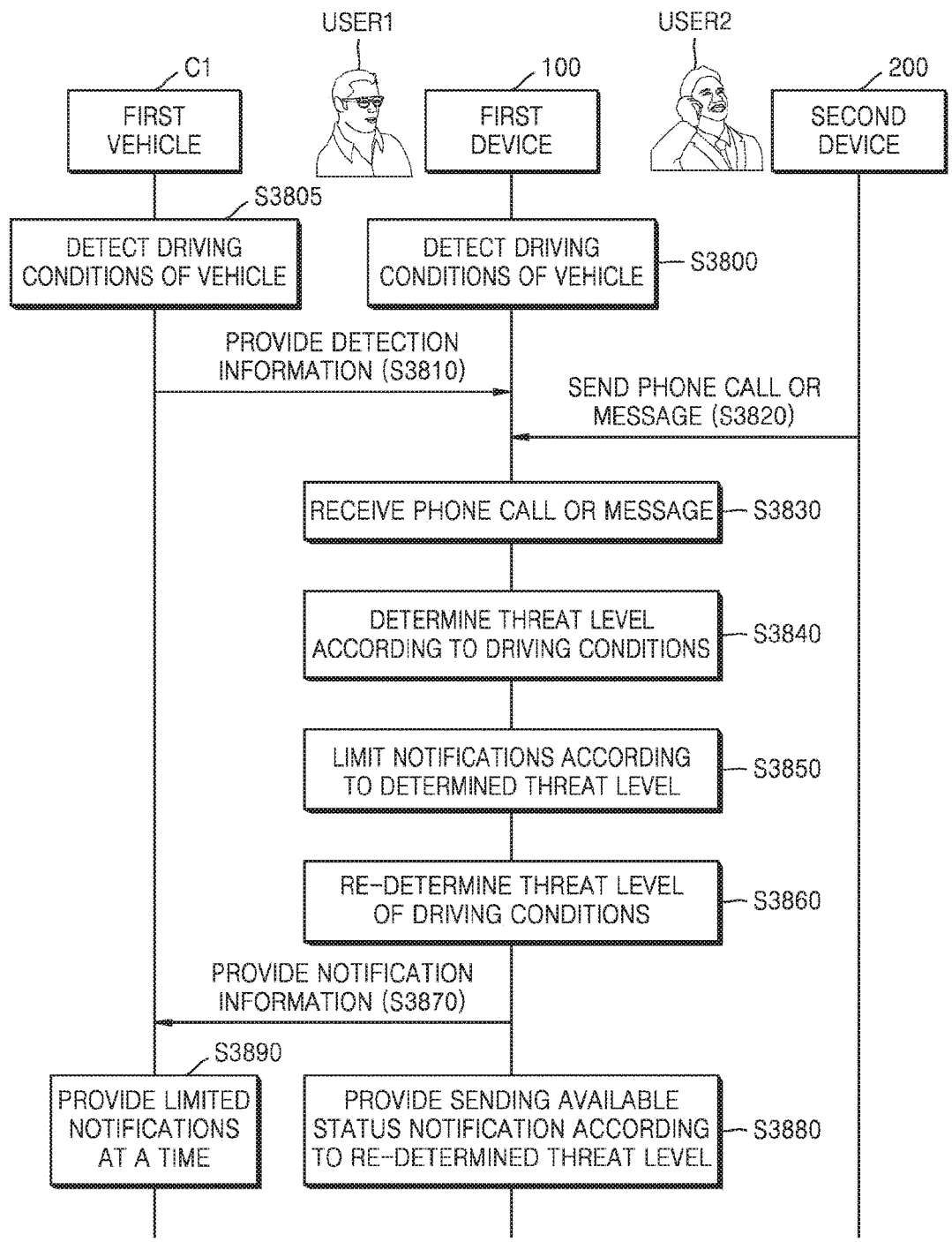
FIG. 38 is a flowchart illustrating operations of first and second devices and a first vehicle performed by using a device control method according to an embodiment of the present disclosure.

FIG. 38 is a flowchart illustrating operations of first and second devices and a first vehicle performed by using a device control method according to an embodiment of the present disclosure.

Referring to FIG. 38, in operation S3800, the first device 100 may detect driving conditions of the first vehicle C1. In operation S3805, the first vehicle C1 may detect the driving conditions of the first vehicle C1. In an embodiment of the present disclosure, operations S3800 and S3805 may be simultaneously performed. In an embodiment of the present disclosure, only one of operations S3800 and S3805 may be performed.

In operation S3810, the first vehicle C1 may provide detection information to the first device 100. For example, the detection information may include an image acquired by a camera of the first vehicle C1, sound acquired by a microphone of the first vehicle C1, or traffic information acquired by a navigation installed in the first vehicle C1.

In operation S3820, the second device 200 may transmit a phone call or a message to the first device 100. In operation S3830, the first device 100 may receive the phone call or the message from the second device 200. In operation S3840, the first device 100 may determine a threat level according to the driving conditions. In operation S3850, the first device 100 may limit notifications according to the determined threat level. In operation S3860, the first device 100 may re-determine the threat level of the driving conditions.

In operation S3870, the first device 100 may provide notification information to the first vehicle C1. In more detail, in a case where the re-determined threat level is the low threat level LL, the first device 100 may provide the notification information including all the limited notification to the first vehicle C1.

In operation S3880, the first device 100 may provide the limited notification at a time according to the re-determined threat level. In more detail, in a case where the re-determined threat level is the low threat level LL, the first device 100 may provide a notification packet including all the limited notifications.

In operation S3890, the first vehicle C1 may provide the limited notification at a time. In an embodiment of the present disclosure, operations S3880 and S3890 may be simultaneously performed. In an embodiment of the present disclosure, only one of operations S3880 and S3890 may be performed.

Figure 39:
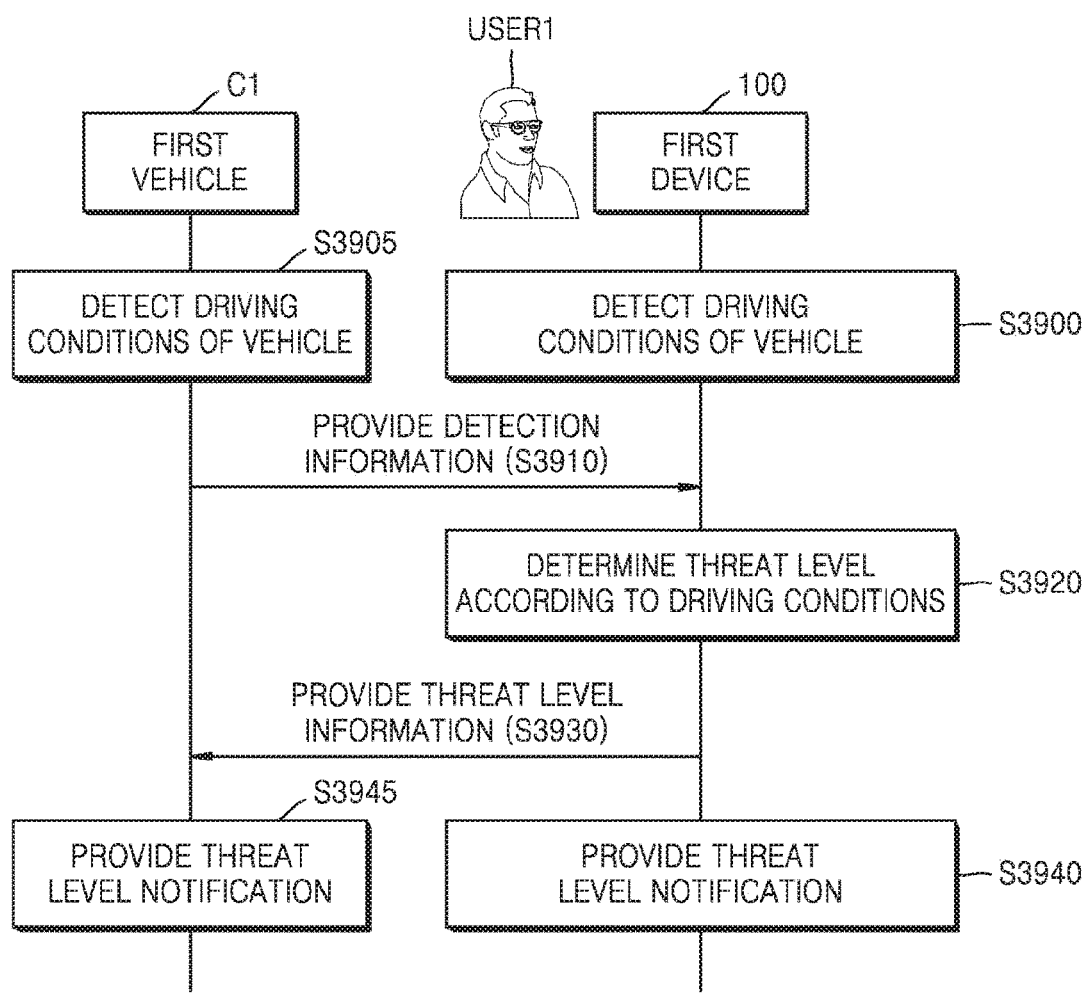
FIG. 39 is a flowchart illustrating operations of a first device and a first vehicle performed by using a device control method according to an embodiment of the present disclosure.

FIG. 39 is a flowchart illustrating operations of a first device and a first vehicle performed by using a device control method according to an embodiment of the present disclosure.

Referring to FIG. 39, in operation S3900, the first device 100 may detect driving conditions of the first vehicle C1. In operation S3905, the first vehicle C1 may detect the driving conditions of the first vehicle C1. In an embodiment of the present disclosure, operations S3900 and S3905 may be simultaneously performed. In an embodiment of the present disclosure, only one of operations S3900 and S3905 may be performed.

In operation S3910, the first vehicle C1 may provide detection information to the first device 100. For example, the detection information may include an image acquired by a camera of the first vehicle C1, sound acquired by a microphone of the first vehicle C1, or traffic information acquired by a navigation installed in the first vehicle C1.

In operation S3920, the first device 100 may determine a threat level according to the driving conditions. In the present embodiment of the present disclosure, the first device 100 may classify the threat level as the high threat level HL, the middle threat level ML, and the low threat level LL.

In operation S3930, the first device 100 may provide notification information to the first vehicle C1. In operation S3940, the first device 100 may provide a threat level notification. In operation S3945, the first vehicle C1 may provide a threat level notification. In an embodiment of the present disclosure, operations S3940 and S3945 may be simultaneously performed. In an embodiment of the present disclosure, only one of operations S3940 and S3945 may be performed. This will be described in more detail with reference to FIGS. 40A and 40B below.

Figure 40A:
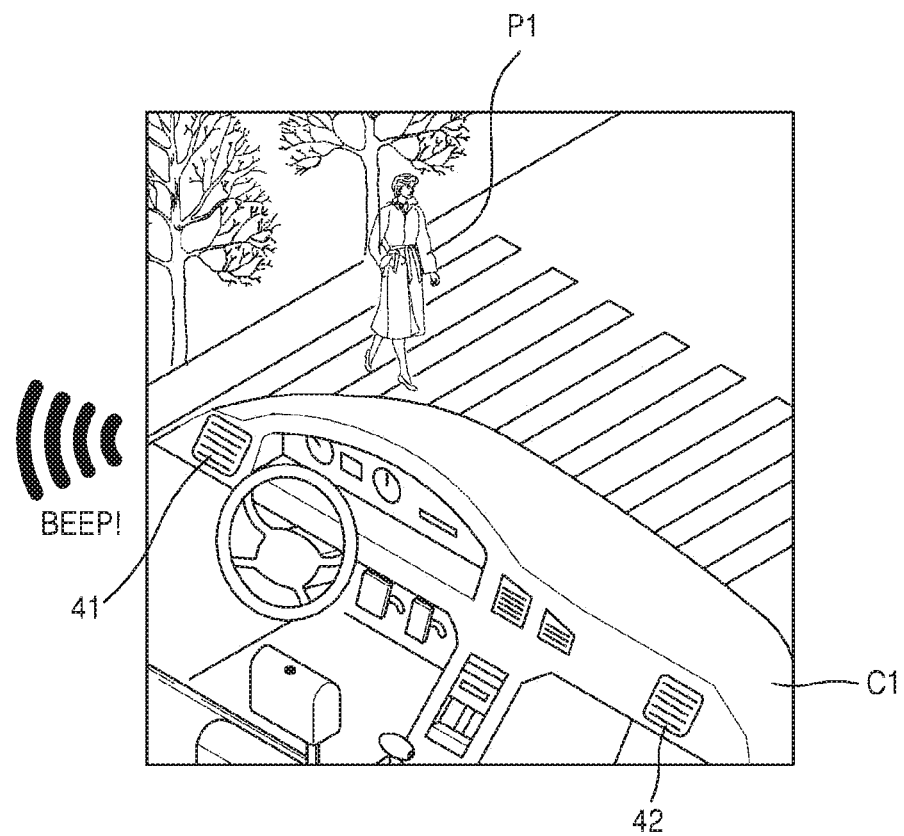
FIGS. 40A and 40B illustrate an operation of providing a threat level notification performed by a first vehicle and a first device according to an embodiment of the present disclosure.
Figure 40B:
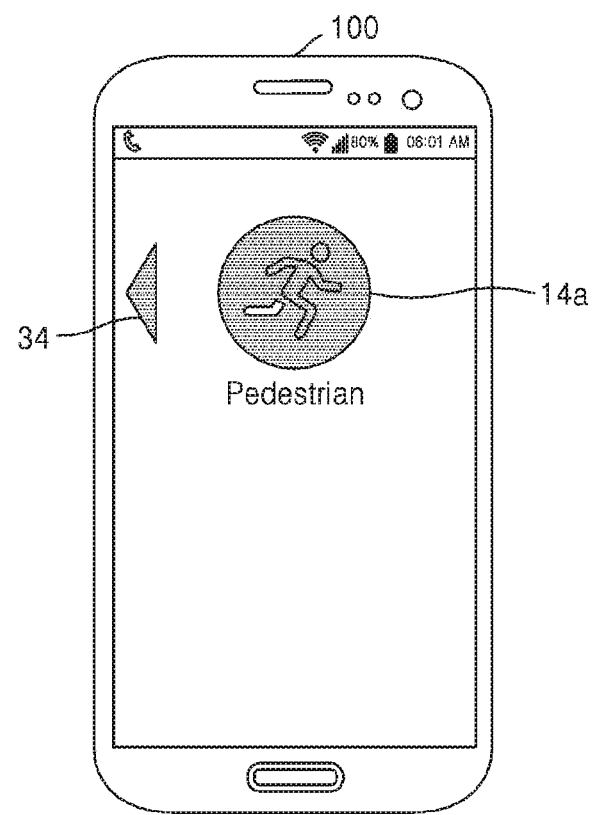

FIGS. 40A and 40B illustrate an operation of providing a threat level notification performed by a first vehicle and a first device according to an embodiment of the present disclosure.

Referring to FIG. 40A, the first pedestrian P1 may be detected from an image acquired by the first device 100 or the first vehicle C1. In the present example, the first pedestrian P1 may be detected in the left of the first vehicle C1. The first device 100 may provide threat level information to the first vehicle C1 based on a position of the first pedestrian P1 such that a threat level notification is output through a left speaker 41 of the first vehicle C1. Accordingly, the first vehicle C1 may provide the threat level notification, such as horn sound or "there is a collision threat in the left" through the left speaker 41 and may not provide a threat level notification through a right speaker 42.

Referring to FIG. 40B, the first device 100 may display a pictogram 14*a* indicating that a detected threat level is the middle threat level ML, a detected threat element is a pedestrian, and a direction 34 of the detected threat element is the left.

Figure 41:
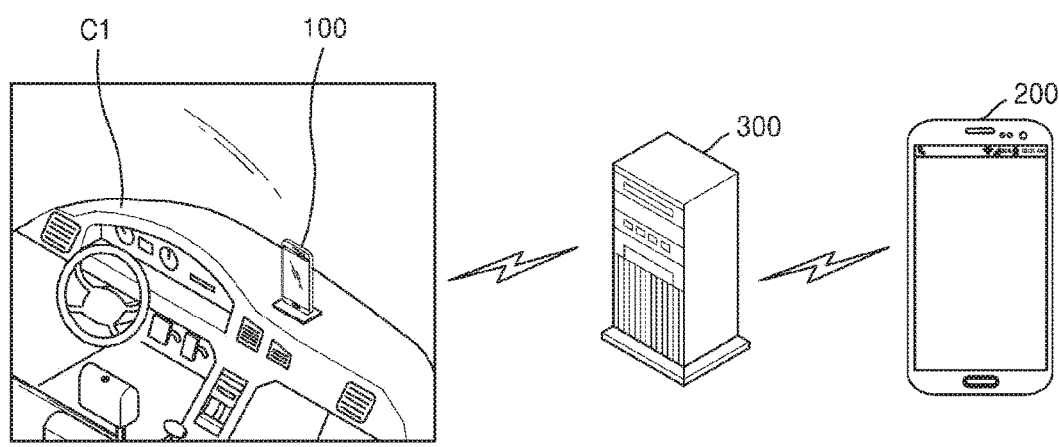
FIG. 41 illustrates a system providing a smart driving mode according to an embodiment of the present disclosure.

FIG. 41 illustrates a system providing a smart driving mode according to an embodiment of the present disclosure.

Referring to FIG. 41, the system providing the smart driving mode according to the present embodiment may include the first device 100, the second device 200, and a server 300. The first device 100 may be positioned in the first vehicle C1. In an embodiment of the present disclosure, the first device 100 may be mounted in a cradle of the first vehicle C1. However, the various embodiments of the present disclosure are not limited thereto. The first device 100 may be positioned in an arbitrary space of the first vehicle C1. The system according to the present embodiment of the present disclosure is a modification of the system of FIG. 1 or 37 and the descriptions provided with reference to FIGS. 1 through 40B above may apply to the present embodiment.

In the present embodiment of the present disclosure, the first and second devices 100 and 200 may be electronic devices supporting a voice call function. In this regard, the first and second devices 100 and 200 may be substantially the same as the first and second devices 100 and 200 of FIG. 1. Thus, the descriptions of the first and second devices 100 and 200 above may apply to the present embodiment and redundant descriptions are omitted.

In the present embodiment of the present disclosure, a user of the first device 100 may be the first user USER1 driving the first vehicle C1. In an embodiment of the present disclosure, the first device 100 may receive a call or a message from the second device 200. In an embodiment of the present disclosure, the first device 100 may transmit a call or a message to the second device 200. According to the present embodiment of the present disclosure, the server 300 may control an operation of the first device 100. At least one of control operations of the first device 100 included in the various embodiments of the present disclosure described with reference to FIGS. 1 to 40B above may be performed by the server 300.

In an embodiment of the present disclosure, if the call or the message is received in the first device 100, the server 300 may be activated and limit notifications according to the driving conditions, and, if the driving conditions are changed, provide the notifications at a time. In more detail, a camera of the first device 100, a microphone, or an application that is being executed may provide detection information to the server 300, and the server 300 may limit or provide notification of the first device 100 based on the detection information received from the first device 100.

In an embodiment of the present disclosure, if the call or the message is received in the first device 100, the server 300 may be activated and generate a response message according to the driving conditions, and provide the generated response message to the second device 200. In more detail, the camera of the first device 100, the microphone, or the application that is being executed may provide the detection information to the server 300, and the server 300 may generate the response message based on the detection information received from the first device 100 and provide the generated response message to the second device 200.

In an embodiment of the present disclosure, if the call or the message is received in the first device 100, the server 300 may be activated and generate a state change guide regarding a condition for changing the driving conditions according to the driving conditions, and provide the generated state change guide to the second device 200.

Figure 42:
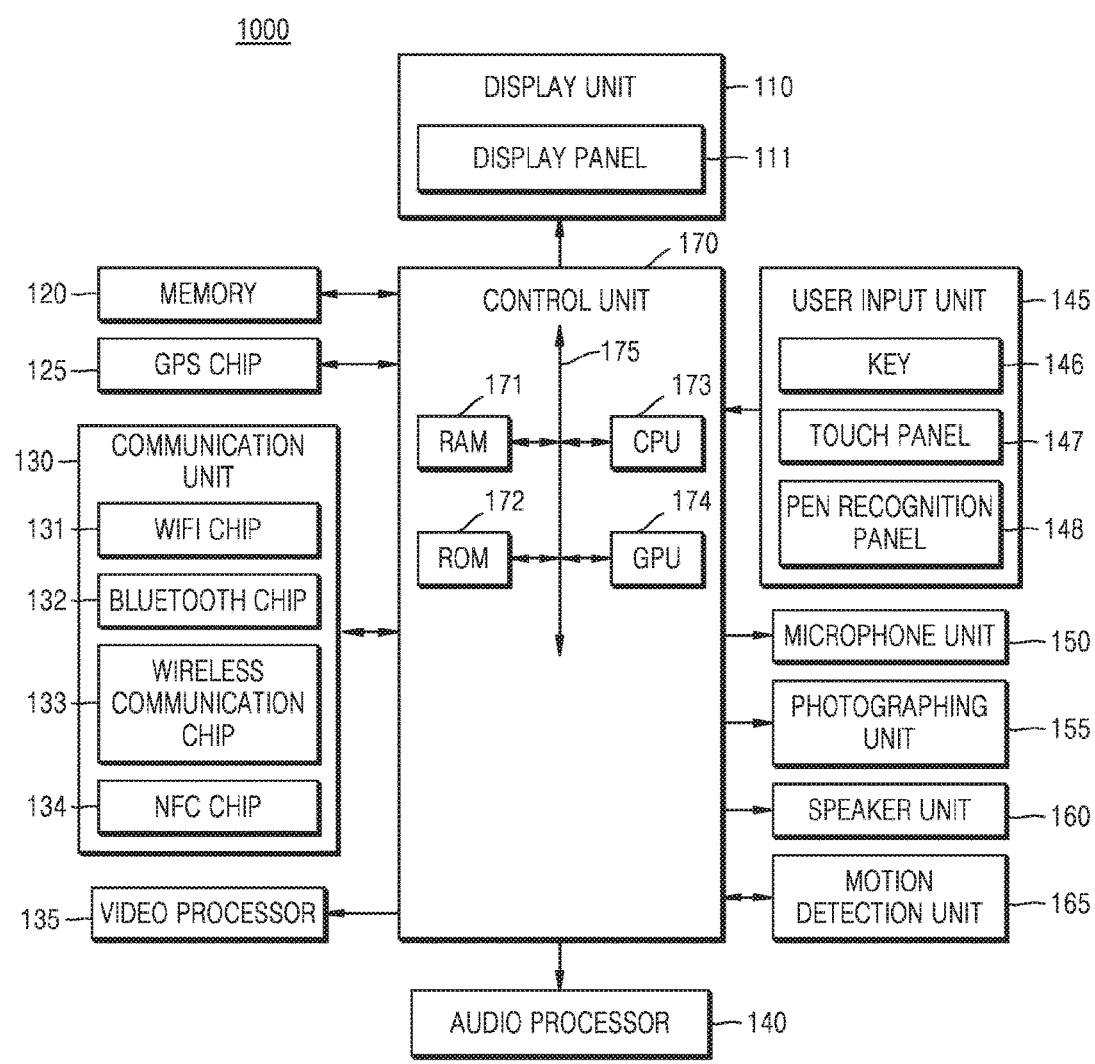
FIG. 42 is a block diagram illustrating a device according to an embodiment of the present disclosure.

FIG. 42 is a block diagram illustrating a device according to an embodiment of the present disclosure.

Referring to FIG. 42, a configuration of a device 1000 according to the present embodiment may apply to the first device 100 and the second device 200 of FIG. 1. The configuration of the device 1000 may apply to various types of devices, such as, a smart phone, a tablet PC, a PDA, an MP3 player, a kiosk, an electronic frame, a navigation device, a digital TV, a wrist watch, or a wearable device, such as a head-mounted display (HMD).

Referring to FIG. 42, the device 1000 may include at least one of a display device 110, a control unit 170, a memory 120, a GPS chip 125, a communication unit 130, a video processor 135, an audio processor 140, a user input unit 145, a microphone unit 150, a photographing unit 155, a speaker unit 160, and a motion detection unit 165.

The display unit 110 may include a display panel 111 and a controller (not shown) controlling the display panel 111. The display panel 111 may be implemented as various types of displays, such as a liquid crystal display (LCD), an organic light emitting diode (OLED) display, an active matrix OLED (AMOLED), a plasma display panel (PDP), and the like. The display panel 111 may be implemented in a flexible, transparent, or wearable way. The display unit 110 may be provided as a touch screen (not shown) after being coupled to a touch panel 147 of the user input unit 145. For example, the touch screen (not shown) may include an integral module in which the display panel 11 and the touch panel 147 are coupled to each other in a stack structure.

The memory 120 may include at least one of an internal memory (not shown) and an external memory (not shown). The memory 120 may store various types of programs and data used to operate the device 1000.

The internal memory may include at least one of, for example, a volatile memory (for example, a dynamic random access memory (DRAM), a static RAM (SRAM), a synchronous DRAM (SDRAM), and the like), a non-volatile memory (for example, a one-time programmable read only memory (OTPROM), a programmable ROM (PROM), an erasable and programmable ROM (EPROM), an electrically erasable and programmable ROM (EEPROM), a mask ROM, a flash ROM, and the like), a hard disk drive (HDD), a solid state drive (SSD), and the like. According to an embodiment of the present disclosure, the control unit 170 may load and process a command or data received from at least one of the non-volatile memory or another element in the volatile memory. The control unit 170 may preserve data received from or generated by another element in the non-volatile memory.

The external memory may include at least one of, for example, a compact flash (CF), a secure digital (SD), a micro SD (MSD), a mini SD, an extreme digital (xD), and a memory stick.

The control unit 170 may control the display unit 110 to display a part of the content stored in the memory 120. In other words, the control unit 170 may display a part of the content stored in the memory 120 on the display unit 110. Alternatively, if a user gesture is performed on a region of the display unit 110, the control unit 170 may perform a control operation corresponding to the user gesture.

The control unit 170 may include at least one of a RAM 171, a ROM 172, a central processing unit (CPU) 173, a graphics processing unit (GPU) 174, and a bus 175. The RAM 171, the ROM 172, the CPU 173, and the GPU 174 may be connected through the bus 175.

The CPU 173 may access the memory 120 and perform booting by using an OS stored in the memory 120. The CPU 173 may perform various operations by using various types of programs, contents, data, and the like, stored in the memory 120.

The ROM 172 stores a set of commands for booting the OS. For example, if a turn-on command is input and power is supplied to a cellular terminal 100B, the CPU 173 may boot the OS by copying the OS stored in the memory 120 to the RAM 171 according to the command stored in the ROM 172 and executing the OS. If booting is complete, the CPU 173 performs various types of operations by copying various types of programs stored in the memory 120 to the RAM 171 and executing programs copied in the RAM 171. If booting of the device 10000 is complete, the GPU 174 displays a UI screen on a region of the display unit 110. In more detail, the GPU 174 may generate a screen displaying an electronic document including various objects, such as content, an icon, a menu, and the like. The GPU 174 computes an attribute value, such as a coordinate value, a shape, a size, a color, and the like, displaying each object according to a layout of the screen. The GPU 174 may generate various layouts of screens including the objects based on the computed attribute value. The screens generated by the GPU 174 may be provided to the display unit 110 and displayed on regions of the display unit 110.

The GPS chip 125 may receive a GPS signal from a GPS satellite and compute a current location of the device 1000. When a navigation program is used or a current location of a user is necessary, the control unit 170 may compute a user location by using the GP chip 125.

The communication unit 130 may communicate with various types of external devices according to various types of communications. In more detail, the communication unit 130 may include at least one of a Wi-Fi chip 131, a Bluetooth chip 132, a wireless communication chip 133, and a near field communication (NFC) chip 134. The control unit 170 may communicate with various types of external devices by using the communication unit 130.

The Wi-Fi chip 131 and the Bluetooth chip 132 may respectively perform communication by using a Wi-Fi method and a Bluetooth method. When the Wi-Fi chip 131 or the Bluetooth chip 132 is used, various types of information may be transmitted and received by firstly transmitting and receiving various types of connection information, such as a service set identifier (SSID) and a session key and connecting communication by using the various types of connection information. The wireless communication chip 133 is a chip performing communication according to various communication standards, such as Institute of Electrical and Electronics Engineers (IEEE), ZigBee, $3^{rd}$ generation (3G), a 3G partnership project (3GPP), LTE, and the like. The NFC chip 134 is a chip operating by using an NFC method that uses a band of 13.56 MHz among various radio frequency identification (RF-ID) frequency bands, such as 135 kHz, 13.56 MHz, 433 MHz, 860~960 MHz, 2.45 GHz, and the like.

The video processor 135 may process video data included in the contents received through the communication unit 130 or stored in the memory 120. The video processor 135 may perform various image processing on the video data, such as decoding, scaling, noise filtering, frame rate conversion, resolution conversion, and the like.

The audio processor 140 may process audio data included in the contents received through the communication unit 130 or stored in the memory 120. The audio processor 140 may perform various processing on the audio data, such as decoding, amplification, noise filtering, and the like.

If a reproduction program on multimedia content is executed, the control unit 170 may drive the video processor 135 and the audio processor 140 to reproduce the corresponding content. The speaker unit 160 may output the audio data generated by the audio processor 140.

The user input unit 145 may receive various commands from the user. In the present embodiment of the present disclosure, the user input unit 145 may receive the setting information regarding a smart driving mode. In more detail, the user input unit 145 may include at least one of a key 146, a touch panel 147, and a pen recognition panel 148.

The key 146 may include various types of keys a mechanical button, a wheel, and the like, formed in various regions, such as a front portion, a side portion, or a back portion of an appearance of a main body.

The touch panel 147 may detect a touch input of the user and output a touch event value corresponding to the detected touch input. When the touch panel 147 is coupled to the display panel 111 to form the touch screen (not shown), the touch screen may be implemented as various types of touch sensors, such as a capacitive, decompressive, or piezoelectric touch sensor. A capacitive method detects small electricity caused by a body of the user and computes a touch coordinate when a part of the body of the user touches a touch screen surface by using a dielectric material coated on the touch screen surface. A decompressive method detects a flow of current when two electrode plates included in the touch screen touches a point of the screen touched by the user and computes a touch coordinate. The touch event occurring on the touch screen may be generated by a finger of the user mainly or a substance formed of a conductive material that may change a capacitance.

The pen recognition panel 148 may detect a proximity input or a touch input according to an operation of a touch pen (for example, a stylus pen, a digitizer pen, and the like) of the user and output a detected pen proximity event or pen touch event. The pen recognition panel 148 may be implemented, for example, in an electromagnetic resonance (EMR) manner, and detect a touch or proximity input according to an intensity change of an electromagnetic field by a pen proximity or touch. In more detail, the pen recognition panel 148 may be configured to include an electronic induction coil sensor (not shown) having a grid structure and an electronic signal processing unit (not shown) sequentially providing an alternating current signal having a certain frequency to loop coils of the electronic induction coil sensor. If a pen including a resonance circuit is present near a loop coil of the pen recognition panel 148, a magnetic field transmitted from the corresponding loop coil generates current based on a reciprocal electronic induction to the resonance circuit of the pen. An induction magnetic field may be generated from the coli included in the resonance circuit of the pen based on the current. The pen recognition panel 148 may detect the induction magnetic field from the loop coil in a signal receiving status to detect a proximity location of the pen or touch location. The pen recognition panel 148 may have a certain area of a lower portion of the display panel 111, for example, an area that may cover a display region of the display panel 111.

The microphone unit 150 may receive and convert a user voice or other sound into audio data. The control unit 170 may use the user voice input through the microphone unit 150 during a call operation or convert the user voice into the audio data and store the audio data in the memory 120.

The photographing unit 155 may photograph a still image or a moving image according to the control of the user. A plurality of photographing units 155 may be implemented like a front camera, a rear camera, and the like.

When the photographing unit 155 and the microphone unit 150 are provided, the control unit 170 may perform a control operation according to the user voice input through the microphone unit 150 or a user motion recognized by the photographing unit 155. For example, the device 1000 may operate in a motion control mode or a sound control mode.

When the device 1000 operates in the motion control mode, the control unit 170 may activate the photographing unit 155 to photograph the user, track a motion change of the user, and perform the control operation corresponding to the motion change. When the device 1000 operates in the sound control mode, the control unit 170 may analyze the user voice input through the microphone unit 1500 and operate in the sound recognition mode in which the control operation is performed according to the analyzed user voice.

The motion detection unit 165 may detect a motion of the main body of the device 1000. The device 1000 may rotate or may be inclined in various directions. In this regard, the motion detection unit 165 may detect a motion characteristic, such as a rotation direction and angle, an inclination, and the like, by using at least one of various sensors, such as a terrestrial magnetic sensor, a gyro sensor, an acceleration sensor, and the like.

In addition, although not shown in FIG. 42, in the present embodiment of the present disclosure, the device 1000 may further include various external input ports for connecting various external terminals, such as a universal serial bus (USB) port to which a USB connector may be connected, a headset, a mouse, a local area network (LAN), and the like, a digital multimedia broadcasting (DMB) chip receiving and processing a DMB signal, various sensors, and the like.

Titles of elements of the device 1000 described above may be changed. The device 1000 of the present embodiment of the present disclosure may include at least one of the elements, may omit some of the elements, or may include additional elements.

Figure 43:
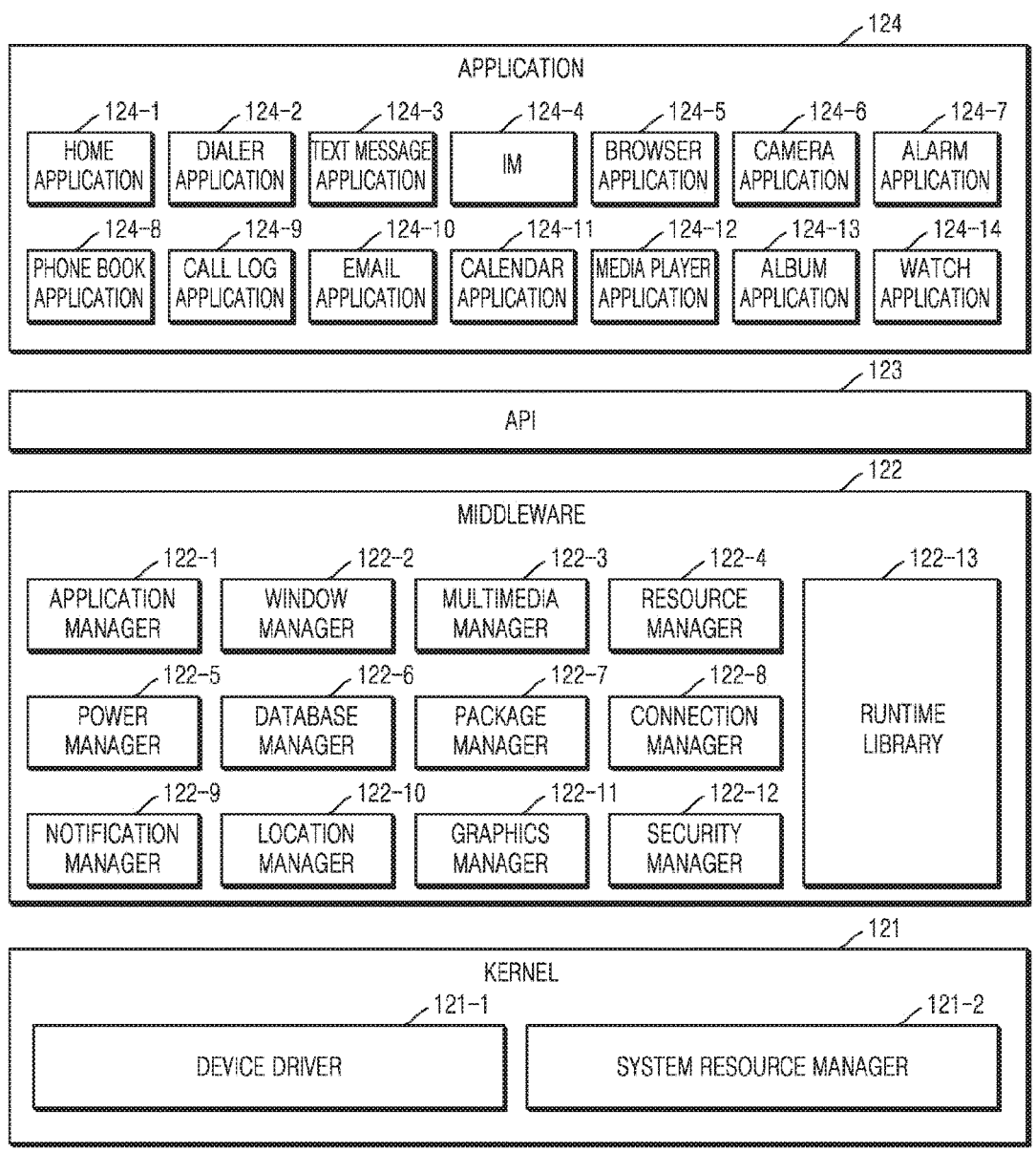
FIG. 43 is a block diagram illustrating software of a device according to an embodiment of the present disclosure.

FIG. 43 is a block diagram illustrating software of a device according to an embodiment of the present disclosure.

Referring to FIG. 43, the memory 120 of FIG. 42 may store an OS controlling resources of the device 1000 and an application program for operating an application. The OS may include a kernel 121, middleware 122, an API 123, and the like. The OS may include, for example, Android, iOS, Windows, Symbian, Tizen, or Bada, and the like.

The kernel 121 may include at least one of a device driver 121-1 or a system resource manager 121-2 capable of managing resources. The device driver 121-1 may access and control hardware components of the device 1000 in a software way to control the hardware. To this end, the device driver 121-1 may be identified as an interface and an individual driver module providing each hardware provider. The device driver 121-1 may include at least one of, for example, a display driver, a camera driver, a Wi-Fi driver, an audio driver, and an inter-process communication (IPC) driver. The system resource manager 121-2 may include at least one of a process managing unit, a memory managing unit, and a file system managing unit. The system resource manager 121-2 may perform functions of controlling, allocating, or recovering system resources.

The middleware 122 may include a plurality of previously implemented modules for providing a commonly required function in various applications. The middleware 122 may provide a function through the API 123 to allow applications 124 to efficiently use resources included in the device 1000. The middleware 122 may include at least one of a plurality of modules, for example, an application manager 122-1, a window manager 122-2, a multimedia manager 122-3, a resource manager 122-4, a power manager 122-5, a database manager 122-6, a package manager 122-7, a connection manager 122-8, a notification manager 122-9, a location manager 122-10, a graphics manager 122-11, and a security manager 122-12.

The application manager 122-1 may manage a life cycle of at least one of the applications 124. The window manager 122-2 may manage a graphical UI (GUI) resource used on a screen. The multimedia manager 122-3 may determine a format to reproduce various media files and perform encoding or decoding on media files by using a codec in accordance with the corresponding format. The resource manager 122-4 may manage resources, such as a source code, a memory, a storage space, and the like, of at least one of the applications 124. The power manager 122-5 may operate with basic input/output system (BIOS) to manage a battery or power and provide power information regarding an operation. The database manager 122-6 may generate, search, or change a database that is to be used in at least one of the applications 124. The package manager 122-7 may install or update an application distributed in a package file. The connection manager 122-8 may manage a wireless connection, for example, Wi-Fi or Bluetooth. The notification manager 122-9 may display or notify an event, such as a receipt message, a promise, a proximity alarm, and the like, in a way that a user is not interfered. The location manager 122-10 may mange location information of the device 1000. The graphics manager 122-11 may manage a graphics effect that is to be provided to the user and a user interface related to the graphics effect. The security manager 122-12 may provide a general security function required for a system security or a user authentication. When the device 1000 includes a call function, the middleware 122 may further include a call manager (not shown) for managing a user voice call function or a conference call function.

The middleware 122 may further include a runtime library 122-13 or other library modules (not shown). The runtime library 122-13 is a library module used by a compiler so as to track a new function through a programming language during an execution of an application. For example, the runtime library 122-13 may perform a function regarding input/output, a memory function, or an arithmetic function, and the like. The middleware 122 may generate and use a new middleware module through various function combinations of element modules described above. The middleware 122 may provide a specialized module for each type of an OS to provide a distinguished function. The middleware 122 may dynamically delete a part of given elements or add new elements. The elements described in the present embodiment of the present disclosure may be partially omitted, may further include another element, or may be replaced with elements having other titles and performing similar functions.

The API 123 is a set of API programming functions and may be provided as another element according to an OS. In Android or iOS, for example, one API set may be provided according to platforms. In Tizen, for example, two or more API sets may be provided.

The applications 124 may include a preload application installed as default or a third party application that the user may install and use during a use process. The applications 124 may include at least one of, for example, a home application 124-1 for returning to a home screen, a dialer application 124-2 for a phone call with a correspondent, a text message application 124-3 for receiving a message from the correspondent identified by a phone number, an instant message (IM) application 124-4, a browser application 124-5, a camera application 124-6, an alarm application 124-7, a phone book application 124-8 managing a phone number of the correspondent or an address, a call log application 124-9 managing a call log of the user, a transmitting/receiving log of a text message, or a an unanswered call log, and the like, an email application 124-10 receiving a message from the correspondent identified by an email, a calendar application 124-11, a media player application 124-12, an album application 124-13, and a watch application 124-14. Titles of elements of the software of the present embodiment described above may be changed according to a type of an OS. The software of the present embodiment may include at least one of the elements, may omit some of the elements, or may include additional elements.

Figure 44:
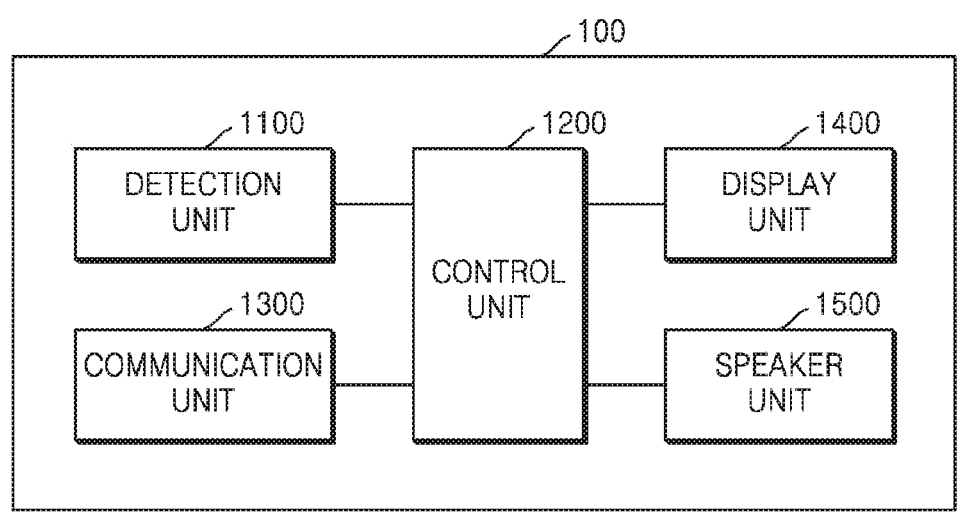
FIG. 44 is a block diagram illustrating a first device according to an embodiment of the present disclosure.

FIG. 44 is a block diagram illustrating a first device according to an embodiment of the present disclosure.

Referring to FIG. 44, a configuration of the first device 100 according to the present embodiment may apply to the first device 100 of FIG. 1. The first device 10 may include a detection unit 1100, a control unit 1200, a communication unit 1300, a display unit 1400, and a speaker unit 1500.

The detection unit 1100 may detect driving conditions of a vehicle. In this regard, the driving conditions may include at least one of outer conditions of the vehicle, inner conditions of the vehicle, conditions of the vehicle itself, and conditions of a driver.

Figure 45:
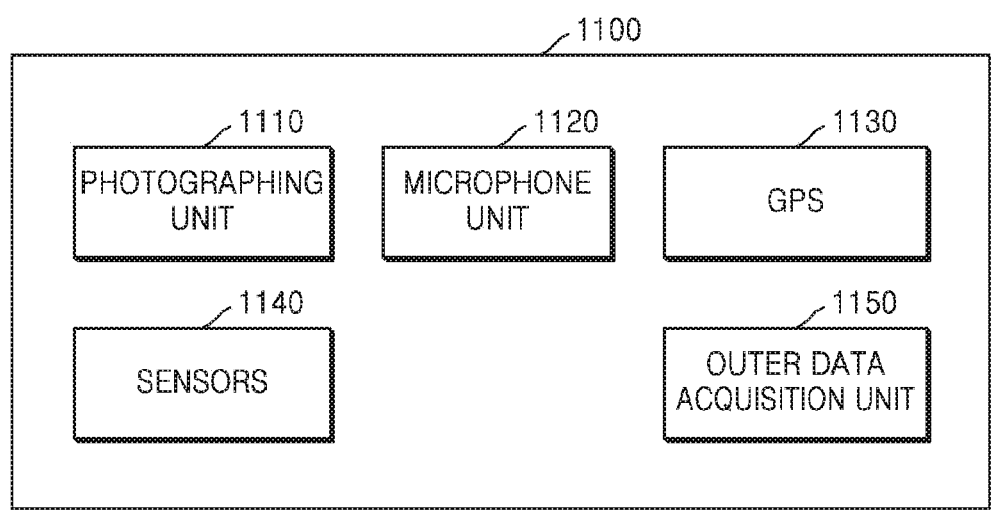
FIG. 45 is a block diagram illustrating a detection unit according to an embodiment of the present disclosure.

FIG. 45 is a block diagram illustrating a detection unit according to an embodiment of the present disclosure.

Referring to FIG. 45, the detection unit 1100 may detect driving conditions of a vehicle and may include a photographing unit 1110, a microphone unit 1120, a GPS 1130, sensors 1140, and an outer data acquisition unit 1150.

The photographing unit 1110 may acquire an outer image of the vehicle and an inner image of the vehicle. In more detail, the photographing unit 1110 may include a rear photographing unit that detects road conditions, such as vehicles, pedestrians, lanes, and the like, or a front photographing unit that recognizes a position of an iris or a head of a user and detects driver conditions, such as fatigue of the user, attention, a driving concentration, and the like.

The microphone unit 1120 may acquire inner sound of the vehicle and thus detect inner noise of the vehicle or user's voice. The GPS 1130 may calculate a current position or speed of the vehicle. The sensors 1140 may include various sensors, such as an acceleration sensor, a magnetic sensor, a gyro sensor, and the like, and calculate the current speed of the vehicle.

The outer data acquisition unit 1150 may acquire outer data from an application that is being executed or has been executed. For example, the outer data acquisition unit 1150 may acquire information, such as the current position of the vehicle, current traffic, accident black spots, and the like, by using a map application or a navigation application. For another example, the outer data acquisition unit 1150 may acquire information, such as current weather or future weather through a weather application. For another example, outer data acquisition unit 1150 may acquire information relating to the driving conditions of the vehicle through a news application, an e-mail application, an SNS, and the like.

Referring to FIG. 44, the control unit 1200 may determine a threat level according to the detected driving conditions. In more detail, the control unit 1200 may analyze outer conditions of the vehicle, inner conditions of the vehicle, conditions of the vehicle itself, or conditions of a driver based on the detected driving conditions and may determine the threat level according to a result of analysis. In an embodiment of the present disclosure, the control unit 1200 may classify the threat level as the high treat level HL, the middle threat level ML, and the low threat level LL.

The control unit 1200 may determine a section in real time based on the determined threat level and control to limit notifications with respect to events that occur in the first device 100 during the section. If the driving conditions are changed, i.e., if the threat level is changed, the control unit 1200 may control to provide the limited notifications at a time during the section. In an embodiment of the present disclosure, the control unit 1200 may control to provide the notifications as a notification packet. In an embodiment of the present disclosure, the control unit 1200 may control to limit or provide the notifications adaptively to the determined threat level, an occurrence frequency of the events, or a counterpart.

The control unit 1200 may control to provide a state change guide regarding a condition for changing the driving conditions to the user. In more detail, the control unit 1200 may determine the condition for changing the driving conditions based on the detected driving conditions and application information and may control to provide the state change guide including the determined condition to the user.

The control unit 1200 may automatically generate a response message including a current status of the user or a future status based on the detected driving conditions and the application information and may control to automatically transmit the generated response message to the counterpart. Furthermore, the control unit 1200 may automatically generate an automatic message indicating that a state of the user has been changed if the driving conditions are changed and may control to automatically transmit the generated automatic message to the counterpart.

In a case where the user attempts to transmit a phone call or a message at the high threat level HL or at the middle threat level ML, the control unit 1200 may control to provide a current threat level or a transmission available time according to the detected driving conditions. Furthermore, in a case where the user attempts to transmit the phone call or the message at the high threat level HL or at the middle threat level ML, the control unit 1200 may control to provide the state change guide regarding the condition for changing the driving conditions. Furthermore, the control unit 1200 may control to provide a notification informing a transmission available state to the user if the driving conditions are changed.

The control unit 1200 may control to provide a reminder with respect to events included in the limited notifications to the user if an operation of the first vehicle C1 ends. The control unit 1200 may control a speaker closer to a threat element among a plurality of speakers installed in the vehicle to output the notifications according to a position of the threat element.

The communication unit 1300 may communicate with an external device, and in more detail, communicate data, a control signal, a status signal, and the like, with the external device. The communication unit 1300 may provide a plurality of communication methods of which types may be changed according to embodiments.

In an embodiment of the present disclosure, the communication unit 1300 may receive a phone call or a message from the second device 200. In an embodiment of the present disclosure, the communication unit 1300 may transmit the response message or the automatic message to the second device 200. In an embodiment of the present disclosure, the communication unit 1300 may be connected to the first vehicle C1 by wired or wirelessly, receive detection information regarding the driving conditions from the first vehicle C1, and provide notifications to the first vehicle C1.

The display unit 1400 may display notifications with respect to the events that occur in the first device 100. In more detail, the display unit 1400 may display the notifications with respect to communication events received from the first device 100 or notification events that occur in an application of the first device 100.

The speaker unit 1500 may output the notifications of the first device 100 in voice. Therefore, even when the user is unable to see the first device 100, an information exchange between the user and the first device 100 may be smoothly made. Accordingly, the user may see a driving direction of the vehicle without having to see the first device 100 while driving, thereby promoting safe driving.

Figure 46:
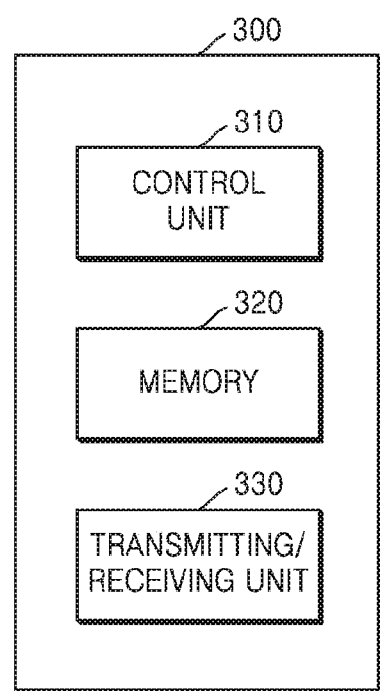
FIG. 46 is a block diagram illustrating a server according to an embodiment of the present disclosure.

FIG. 46 is a block diagram illustrating a server according to an embodiment of the present disclosure.

Referring to FIG. 46, the server 300 may include a control unit 310, a memory 320, and a transmitting/receiving unit 330. However, not all of the components shown in FIG. 46 are necessary components. The server 300 may be embodied with more or less components than those shown in FIG. 46. Detailed descriptions of the components will be given below.

The control unit 310 may control the overall operations of the server 300. For example, the control unit 310 may execute programs (or modules) stored in the memory 320, thereby limiting or providing notifications to a device and generating a response message, an automatic message, a state change message, and the like, that are output by the device.

In an embodiment of the present disclosure, the control unit 310 may determine a threat level according to detected driving conditions. In more detail, the control unit 310 may analyze outer conditions of the vehicle, inner conditions of the vehicle, conditions of the vehicle itself, or conditions of a driver based on the detected driving conditions and may determine the threat level according to a result of analysis. In an embodiment of the present disclosure, the control unit 310 may classify the threat level as the high treat level HL, the middle threat level ML, and the low threat level LL.

The control unit 310 may determine a section in real time based on the determined threat level and control to limit notifications with respect to events that occur in the device during the section. If the driving conditions are changed, i.e., if the threat level is changed, the control unit 310 may control to provide the limited notifications at a time during the section. In an embodiment of the present disclosure, the control unit 310 may control to provide the notifications as a notification packet. In an embodiment of the present disclosure, the control unit 310 may control to limit or provide the notifications adaptively to the determined threat level, an occurrence frequency of the events, or a counterpart.

The control unit 310 may control to provide a state change guide regarding a condition for changing the driving conditions to the user. In more detail, the control unit 310 may determine the condition for changing the driving conditions based on the detected driving conditions and application information and may control to provide the state change guide including the determined condition to the user.

The control unit 310 may automatically generate a response message including a current status of the user or a future status based on the detected driving conditions and the application information and may control to automatically transmit the generated response message to the counterpart. Furthermore, the control unit 1200 may automatically generate an automatic message indicating that a state of the user has been changed if the driving conditions are changed and may control to automatically transmit the generated automatic message to the counterpart.

In a case where the user attempts to transmit a phone call or a message at the high threat level HL or at the middle threat level ML, the control unit 310 may control to provide a current threat level or a transmission available time according to the detected driving conditions. Furthermore, in a case where the user attempts to transmit the phone call or the message at the high threat level HL or at the middle threat level ML, the control unit 310 may control to provide the state change guide regarding the condition for changing the driving conditions. Furthermore, the control unit 310 may control to provide a notification informing a transmission available state to the user if the driving conditions are changed.

The control unit 310 may control to provide a reminder with respect to events included in the limited notifications to the user if an operation of the first vehicle C1 ends. The control unit 310 may control a speaker closer to a threat element among a plurality of speakers installed in the vehicle to output the notifications according to a position of the threat element.

The memory 320 may store programs for processing operations and controlling operations of the control unit 310 and may also store input/output data (e.g., detection information, driving conditions information, settings particulars of the user, a call history, and the like). Furthermore, programs stored in the memory 320 may be categorized into a plurality of modules based on functions thereof.

The transmitting/receiving unit 330 may include one or more components that enable communication between the server 300 and a device. According to an embodiment of the present disclosure, the transmitting/receiving unit 330 may receive the detection information, the driving conditions information, the setting particulars of the user, the call history, and the like, from the device.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

According to an embodiment of the present disclosure, notifications of a device may not be provided during a section according to driving conditions of a vehicle, and, if the driving conditions are changed, the notifications may be provided at a time, thereby reducing driving interruption of a driver caused by the notifications of the device. Accordingly, safe driving may be promoted while using a communication service of the device while driving.

According to an embodiment of the present disclosure, a threat level may be divided into at least a high threat level, a middle threat level, and a low threat level according to driving conditions of a vehicle, and notifications of a device may be selectively provided according to frequency of received events and counterparts at the middle threat level. Accordingly, the notifications may be provided with respect to important calls or messages, thereby promoting user convenience.

It should be understood that the various embodiments described herein should be considered in a descriptive sense only and not for purposes of limitation. Descriptions of features or aspects within each embodiment of the present disclosure should typically be considered as available for other similar features or aspects in other embodiments of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A device comprising:
   a detector configured to detect current driving conditions of a vehicle or a user;
   a communicator configured to receive a phone call or a message from a counterpart; and
   at least one processor configured to:
   limit notifications with respect to events that occur in the device based on the current driving conditions,
   when the phone call or the message is received, determine a condition among a plurality of conditions for changing the current driving conditions, the condition being determined based on the current driving conditions detected by the detector and destination information configured by the user, the destination information corresponding to information regarding a predetermined location of an end of travel, acquired from an application installed in the device, the vehicle, or a wearable device connected to the device, and provide a state change guide corresponding to the condition for changing the current driving conditions, the state change guide comprising at least one of information informing the user of the current driving conditions or an action for the user to perform to change the current driving conditions,
   limit a receiving notification with respect to the phone call or the message based on the current driving conditions,
   predict a future situation based on the current driving conditions,
   control the communicator to provide a response message, including a current situation based on the current driving conditions, and the predicted future situation, to the counterpart, and
   when the current driving conditions change, provide the limited notifications.

2. The device of claim 1, wherein the at least one processor is further configured to:
   determine a threat level according to the current driving conditions, and
   limit or provide the notifications adaptively based on at least one of the determined threat level, an occurrence frequency of the events, or the counterpart.

3. The device of claim 1, wherein the at least one processor is further configured to, when the current driving conditions change, control the communicator to provide an automatic message including state change information of the user to the counterpart.

4. The device of claim 1, wherein the communicator is further configured to receive information regarding the current driving conditions from at least one of a camera, a microphone, or a navigation that is installed in the vehicle.

5. The device of claim 1, wherein the current driving conditions of the vehicle include at least one of outer conditions of the vehicle, inner conditions of the vehicle, or conditions of the vehicle itself.

6. The device of claim 1, wherein, in a case where the user attempts to transmit a phone call or a message, the at least one processor is further configured to provide a current threat level or a transmission available time according to the current driving conditions.

7. The device of claim 6, wherein, in a case where the user attempts to transmit the phone call or the message, the at least one processor is further configured to provide the state change guide regarding the condition for changing the driving conditions.

8. The device of claim 6, wherein, when the current driving conditions change, the at least one processor is further configured to provide a notification informing a transmission available state to the user.

9. The device of claim 1, wherein, when an operation of the vehicle ends, the at least one processor is further configured to provide a reminder with respect to the events.

10. The device of claim 1,
    wherein the communicator is further configured to communicate with the vehicle, and
    wherein the at least one processor is further configured to control a speaker closer to a threat element to output the notifications, the speaker being selected among at least two speakers installed in the vehicle according to a position of the threat element.

11. The device of claim 1, wherein the current driving conditions include at least one of inner conditions of the vehicle or conditions of the user.

12. A method of controlling a device, the device including a detector, the method comprising:
    detecting, by the detector, current driving conditions of a vehicle or a user;
    limiting notifications with respect to events that occur in the device based on the current driving conditions detected by the detector;
    receiving a phone call or a message from a counterpart;
    when the phone call or the message is received, determining a condition among a plurality of conditions for changing the current driving conditions, the condition being determined based on the current driving conditions detected by the detector and destination information configured by the user, the destination information corresponding to information regarding a predetermined location of an end of travel, acquired from an application installed in the device, the vehicle, or a wearable device connected to the device, and providing a state change guide corresponding to the condition for changing the current driving conditions, the state change guide comprising at least one of information informing the user of the current driving conditions or an action for the user to perform to change the current driving conditions;

limiting a receiving notification with respect to the phone call or the message based on the current driving conditions;

predicting a future situation based on the current driving conditions;

providing a response message, including a current situation based on the current driving conditions, and the predicted future situation, to the counterpart; and when the current driving conditions change, providing the limited notifications.

13. The method of claim 12, wherein the limiting of the notifications comprises:

determining a threat level according to the current driving conditions; and limiting the notifications adaptively based on at least one of the determined threat level, an occurrence frequency of the events, or the counterpart.

14. The method of claim 12, further comprising, when the current driving conditions change, providing an automatic message including state change information of the user to the counterpart.

15. The method of claim 12, further comprising, in a case where the user attempts to transmit a phone call or a message, providing a current threat level or a transmission available time according to the current driving conditions.

16. The method of claim 15, further comprising, in a case where the user attempts to transmit the phone call or the message, providing the state change guide regarding the condition for changing the driving conditions.

17. The method of claim 15, further comprising, when the current driving conditions change, providing a notification informing a transmission available state to the user.

18. The method of claim 12, further comprising, when an operation of the vehicle ends, providing a reminder with respect to the events.

19. The method of claim 12, wherein the current driving conditions include at least one of inner conditions of the vehicle or conditions of the user.

20. At least one non-transitory computer readable recording medium for storing one or more programs comprising commands for executing a method of controlling a device, the device including a detector, the method comprising:

detecting, by the detector, current driving conditions of a vehicle or a user;

limiting notifications with respect to events that occur in the device based on the current driving conditions;

receiving a phone call or a message from a counterpart;

when the phone call or the message is received, determining a condition among a plurality of conditions for changing the current driving conditions, the condition being determined based on the current driving conditions and destination information configured by the user, the destination information corresponding to information regarding a predetermined location of an end of travel, acquired from an application installed in the device, the vehicle, or a wearable device connected to the device, and providing a state change guide corresponding to the condition for changing the current driving conditions, the state change guide comprising at least one of information informing the user of the current driving conditions or an action for the user to perform to change the current driving conditions;

limiting a receiving notification with respect to the phone call or the message based on the current driving conditions;

predicting a future situation based on the current driving conditions;

providing a response message, including a current situation based on the current driving conditions, and the predicted future situation, to the counterpart; and when the current driving conditions change, providing the limited notifications.

21. The at least one non-transitory computer readable recording medium of claim 20, wherein the current driving conditions include at least one of inner conditions of the vehicle or conditions of the user.

* * * * *